(12) United States Patent
Tseng et al.

(10) Patent No.: US 12,730,281 B2
(45) Date of Patent: Sep. 8, 2026

(54) PHOTOGRAPHING SYSTEM LENS ASSEMBLY, IMAGE CAPTURING UNIT AND ELECTRONIC DEVICE

(71) Applicant: LARGAN PRECISION CO., LTD., Taichung City (TW)

(72) Inventors: Yu-Tai Tseng, Taichung City (TW); Po-Wei Chen, Taichung City (TW); I-Hsuan Chen, Taichung City (TW); Hsin-Hsuan Huang, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 566 days.

(21) Appl. No.: 18/120,340

(22) Filed: Mar. 10, 2023

(65) Prior Publication Data

US 2024/0168261 A1 May 23, 2024

(30) Foreign Application Priority Data

Nov. 18, 2022 (TW) ................................. 111144189

(51) Int. Cl.
*G02B 13/00* (2006.01)
*G02B 9/44* (2006.01)

(52) U.S. Cl.
CPC ............. *G02B 13/004* (2013.01); *G02B 9/44* (2013.01); *G02B 13/0065* (2013.01)

(58) Field of Classification Search
CPC .............. G02B 13/004; G02B 9/36–48; G02B 9/52–56; G02B 13/0065
See application file for complete search history.

(56) References Cited

U.S. PATENT DOCUMENTS

| | | | |
|---|---|---|---|
| 1,108,307 | A | 8/1914 | Zschokke |
| 1,361,207 | A | 12/1920 | Warmisham |
| 1,565,205 | A | 12/1925 | Rudolph |

(Continued)

FOREIGN PATENT DOCUMENTS

| | | | |
|---|---|---|---|
| CN | 111190285 | A | 5/2020 |
| CN | 216485950 | U | 5/2022 |

(Continued)

OTHER PUBLICATIONS

Extended European Search Report dated Jan. 4, 2024 as received in Application No. 23164339.6.

(Continued)

*Primary Examiner* — Wen Huang
(74) *Attorney, Agent, or Firm* — Maschoff Brennan

(57) ABSTRACT

A photographing system lens assembly includes, in order from an object side to an image side: a first lens element, a second lens element, a third lens element and a fourth lens element. Each of the four lens elements has an object-side surface facing toward the object side and an image-side surface facing toward the image side. At least one surface of at least one lens element in the photographing system lens assembly has at least one inflection point. The first lens element has positive refractive power, the object-side surface of the first lens element is convex in a paraxial region thereof, and the image-side surface of the first lens element is convex in a paraxial region thereof. The object-side surface of the second lens element is concave in a paraxial region thereof. The image-side surface of the third lens element is concave in a paraxial region thereof.

8 Claims, 53 Drawing Sheets

(56) References Cited

U.S. PATENT DOCUMENTS

| | | | |
|---|---|---|---|
| 1,937,168 | A | 11/1933 | Repp |
| 2,288,502 | A | 6/1942 | Warmisham |
| 2,418,001 | A | 3/1947 | Warmisham et al. |
| 2,854,889 | A | 10/1958 | Brendel |
| 3,262,363 | A | 7/1966 | Ziegler |
| 5,493,449 | A | 2/1996 | Yamakawa |
| 5,739,957 | A | 4/1998 | Konishi |
| 9,989,741 | B1 | 6/2018 | Hsueh et al. |
| 2017/0219800 | A1 | 8/2017 | Hsieh et al. |
| 2021/0048630 | A1 | 2/2021 | Liao et al. |
| 2021/0063701 | A1 | 3/2021 | Son et al. |
| 2021/0389560 | A1 | 12/2021 | Hsueh et al. |
| 2022/0326480 | A1 | 10/2022 | Kim et al. |
| 2023/0384566 | A1 | 11/2023 | Lee |

FOREIGN PATENT DOCUMENTS

| | | | |
|---|---|---|---|
| CN | 216646941 | U | 5/2022 |
| CN | 113341539 | B | 8/2022 |
| JP | 101-167716 | A | 7/1989 |
| JP | H01-183613 | A | 7/1989 |
| JP | 2582144 | B2 | 2/1997 |
| JP | H10-301039 | A | 11/1998 |
| JP | 3181944 | B2 | 7/2001 |
| JP | 2003-255223 | A | 9/2003 |

OTHER PUBLICATIONS

IN Examination Report dated Feb. 4, 2026 in application No. 202334076425.

IN Examination Report dated Feb. 4, 2026 in application No. 202234076425.

PHOTOGRAPHING SYSTEM LENS ASSEMBLY, IMAGE CAPTURING UNIT AND ELECTRONIC DEVICE

RELATED APPLICATIONS

This application claims priority to Taiwan Application 111144189, filed on Nov. 18, 2022, which is incorporated by reference herein in its entirety.

BACKGROUND

Technical Field

The present disclosure relates to a photographing system lens assembly, an image capturing unit and an electronic device, more particularly to a photographing system lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

Preferably, at least one surface of at least one lens element in the photographing system lens assembly has at least one inflection point. Preferably, the first lens element has positive refractive power. Preferably, the object-side surface of the first lens element is convex in a paraxial region thereof. Preferably, the image-side surface of the first lens element is convex in a paraxial region thereof. Preferably, the object-side surface of the second lens element is concave in a paraxial region thereof. Preferably, the image-side surface of the third lens element is concave in a paraxial region thereof.

When an axial distance between the image-side surface of the fourth lens element and an image surface is BL, an axial distance between the object-side surface of the first lens element and the image-side surface of the fourth lens element is TD, a curvature radius of the object-side surface of the third lens element is R5, a curvature radius of the image-side surface of the third lens element is R6, an axial distance between the first lens element and the second lens element is T12, an axial distance between the third lens element and the fourth lens element is T34, an f-number of the photographing system lens assembly is Fno, and half of a maximum field of view of the photographing system lens assembly is HFOV, the following conditions are preferably satisfied:

$$2.00<BL/TD<12.00;$$

$$0.05<(R5+R6)/(R5-R6)<12.00;$$

$$0.03<T12/T34<15.00;$$

$$1.00<Fno<4.20; \text{ and}$$

$$6.0 \text{ degrees}<\text{HFOV}<22.0 \text{ degrees}.$$

According to another aspect of the present disclosure, a photographing system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

Preferably, the first lens element has positive refractive power. Preferably, the object-side surface of the first lens element is convex in a paraxial region thereof. Preferably, the image-side surface of the first lens element is convex in a paraxial region thereof.

When an axial distance between the image-side surface of the fourth lens element and an image surface is BL, an axial distance between the object-side surface of the first lens element and the image-side surface of the fourth lens element is TD, a central thickness of the first lens element is CT1, an axial distance between the second lens element and the third lens element is T23, a focal length of the first lens element is f1, a composite focal length of the third lens element and the fourth lens element is f34, an Abbe number of the third lens element is V3, and an Abbe number of the fourth lens element is V4, the following conditions are preferably satisfied:

$$1.35<BL/TD<15.00;$$

$$4.20<CT1/T23<95.00;$$

$$-1.20<f1/f34<0.03; \text{ and}$$

$$1.55<V4/V3<5.00.$$

According to another aspect of the present disclosure, a photographing system lens assembly includes four lens elements. The four lens elements are, in order from an object side to an image side along an optical path, a first lens element, a second lens element, a third lens element and a fourth lens element. Each of the four lens elements has an object-side surface facing toward the object side and an image-side surface facing toward the image side.

Preferably, an air gap is in a paraxial region between each of all adjacent lens elements of the photographing system lens assembly. Preferably, the first lens element has positive refractive power. Preferably, the object-side surface of the first lens element is convex in a paraxial region thereof. Preferably, the image-side surface of the first lens element is convex in a paraxial region thereof. Preferably, the object-side surface of the second lens element is concave in a paraxial region thereof. Preferably, the third lens element has negative refractive power.

When an axial distance between the image-side surface of the fourth lens element and an image surface is BL, an axial distance between the object-side surface of the first lens element and the image-side surface of the fourth lens element is TD, a focal length of the first lens element is f1, a curvature radius of the image-side surface of the first lens element is R2, a curvature radius of the object-side surface of the third lens element is R5, a curvature radius of the image-side surface of the third lens element is R6, an Abbe number of the first lens element is V1, an Abbe number of the second lens element is V2, an Abbe number of the third lens element is V3, an Abbe number of the fourth lens element is V4, an Abbe number of the i-th lens element is Vi, a refractive index of the first lens element is N1, a refractive index of the second lens element is N2, a refractive index of the third lens element is N3, a refractive index of the fourth lens element is N4, a refractive index of the i-th lens element is Ni, and a minimum value of Vi/Ni is (Vi/Ni)min, the following conditions are preferably satisfied:

$$2.20<BL/TD<10.00;$$

$$-20.00<R2/f1<-0.01;$$

$$1.25<|R5/R6|<100.00;$$

$$7.00<(Vi/Ni)\min<20.00, \text{ wherein } i=1,2,3 \text{ or } 4; \text{ and}$$

$$1.420<N4<1.710.$$

According to another aspect of the present disclosure, an image capturing unit includes one of the aforementioned photographing system lens assemblies and an image sensor, wherein the image sensor is disposed on the image surface of the photographing system lens assembly. Preferably, the photographing system lens assembly further includes at least one reflective element.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
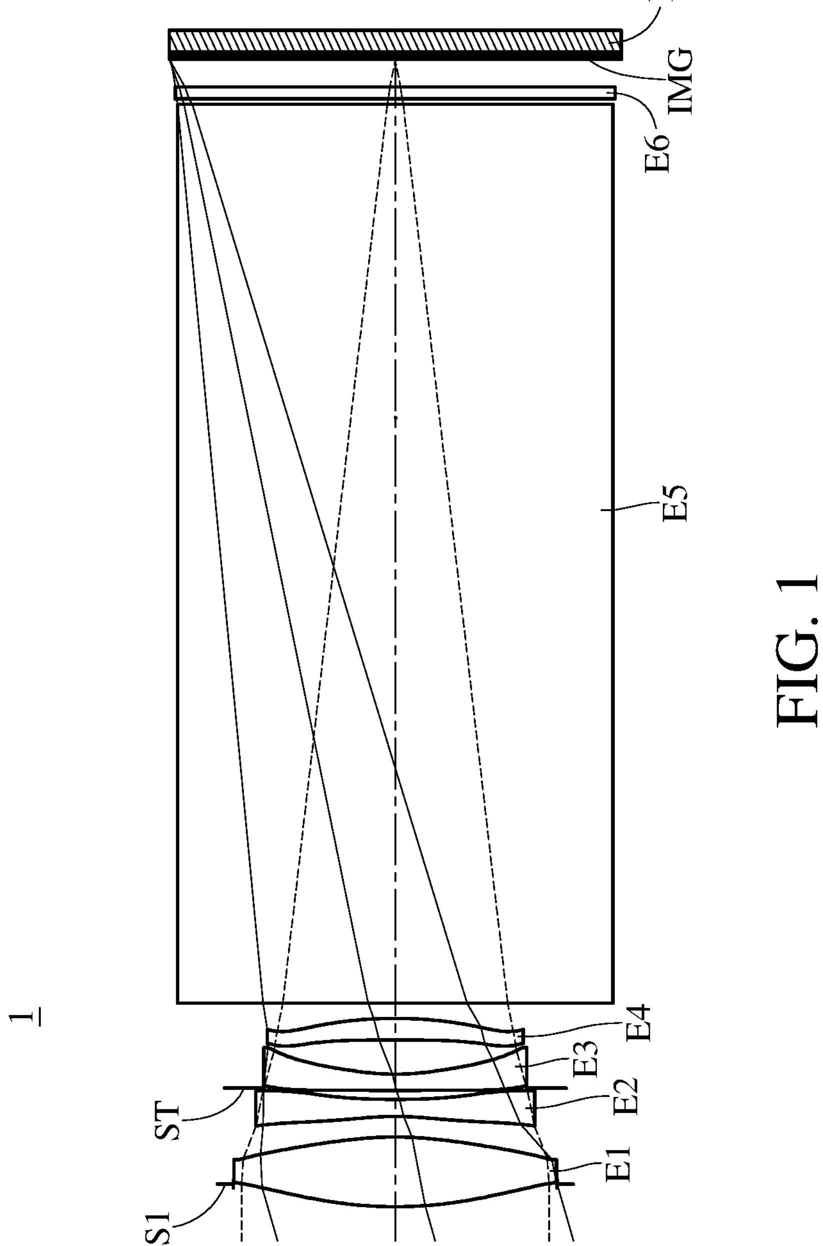
FIG. 1 is a schematic view of an image capturing unit according to the 1st embodiment of the present disclosure.

A photographing system lens assembly includes four lens elements. The four lens elements are, in order from an object side to an image side along an optical path, a first lens element, a second lens element, a third lens element and a fourth lens element. Each of the four lens elements of the photographing system lens assembly has an object-side surface facing toward the object side and an image-side surface facing toward the image side.

There can be an air gap in a paraxial region between each of all adjacent lens elements of the photographing system lens assembly; that is, each of the first through the fourth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between each of all adjacent lens elements of the photographing system lens assembly in the present disclosure is favorable for avoiding the problem associated with the cemented lens elements while improving the yield rate.

The first lens element has positive refractive power. Therefore, it is favorable for reducing the optical path along an optical axis at the object side of the photographing system lens assembly so as to reduce the total device thickness in the optical axis direction at the object side. The object-side surface of the first lens element is convex in a paraxial region thereof. Therefore, it is favorable for adjusting the shape of the object-side surface of the first lens element so as to enhance the capability of controlling the optical path of the light-entering surface of the first lens element. The image-side surface of the first lens element is convex in a paraxial region thereof. Therefore, it is favorable for adjusting the shape of the image-side surface of the first lens element so as to correct aberrations, such as astigmatism.

The second lens element can have negative refractive power. Therefore, it is favorable for correcting aberrations generated due to size reduction of the photographing system lens assembly. The object-side surface of the second lens element can be concave in a paraxial region thereof. Therefore, it is favorable for adjusting the travelling direction of light so as to balance the size arrangement at the object side of the photographing system lens assembly.

The third lens element can have negative refractive power. Therefore, it is favorable for collaborating with the lens elements at the object side so as to reduce coma at the peripheral field. The image-side surface of the third lens element can be concave in a paraxial region thereof. Therefore, it is favorable for adjusting the shape of the image-side surface of the third lens element so as to adjust the travelling direction of light, thereby enlarging the image surface.

The image-side surface of the fourth lens element can be convex in a paraxial region thereof. Therefore, it is favorable for adjusting the shape of the image-side surface of the fourth lens element so as to improve the light gathering quality in the paraxial region.

Figure 37:
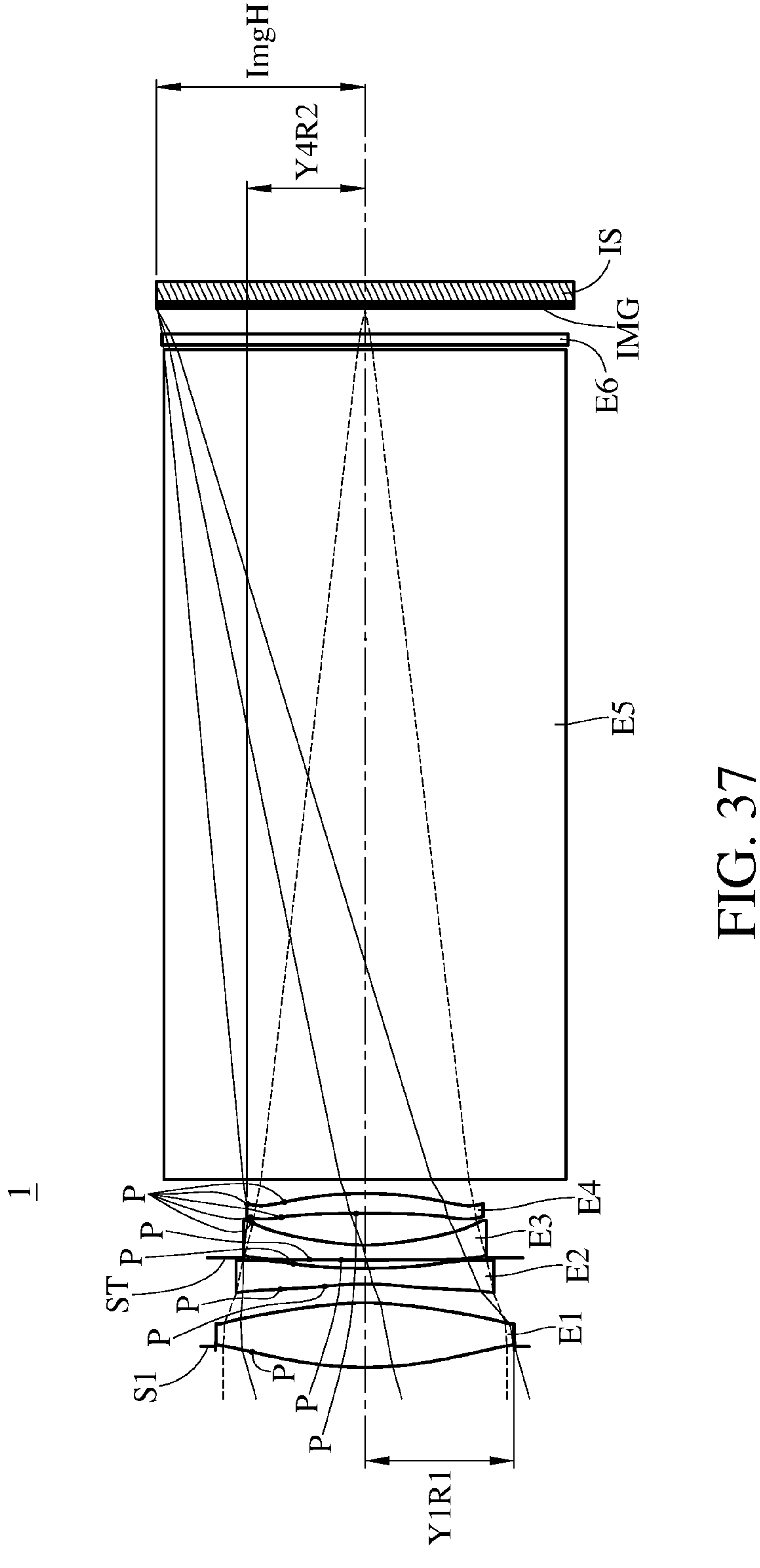
FIG. 37 shows a schematic view of Y1R1, Y4R2 and ImgH, and inflection points of each of the lens elements according to the 1st embodiment of the present disclosure.

Among the four lens elements of the photographing system lens assembly, there can be at least one lens element having at least one inflection point. In detail, among the first through the fourth lens elements, there can be one or more lens elements each having at least one inflection point, and said one lens element having at least one inflection point refers to a lens element in which at least one of the object-side surface and the image-side surface has at least one inflection point. Therefore, it is favorable for increasing design flexibility so as to improve image quality. Please refer to FIG. 37, which shows a schematic view of inflection points P of the first lens element E1, the second lens element E2, the third lens element E3 and the fourth lens element E4 according to the 1st embodiment of the present disclosure. The 1st embodiment of the present disclosure shown in FIG. 37 is only exemplary. Each of the lens elements in various embodiments of the present disclosure can have one or more inflection points.

Among the four lens elements of the photographing system lens assembly, there can be at least one lens element being made of plastic material. Therefore, it is favorable for reducing the manufacturing costs so as to facilitate mass production.

According to the present disclosure, the photographing system lens assembly can further include at least one reflective element. The reflective element can include a prism or a reflective mirror, and the optical path can be deflected at least two times by the reflective element. The reflective element can be disposed between an imaged object and an image surface. Therefore, the photographing system lens assembly can have a folded optical path and can be more flexible in space arrangement, thereby reducing mechanical limitation and miniaturizing the photographing system lens assembly. Moreover, the reflective element can be disposed at an object side of the object-side surface of the first lens element or an image side of the image-side surface of the fourth lens element. Moreover, the reflective element can be disposed between the fourth lens element and the image surface.

Figure 49:
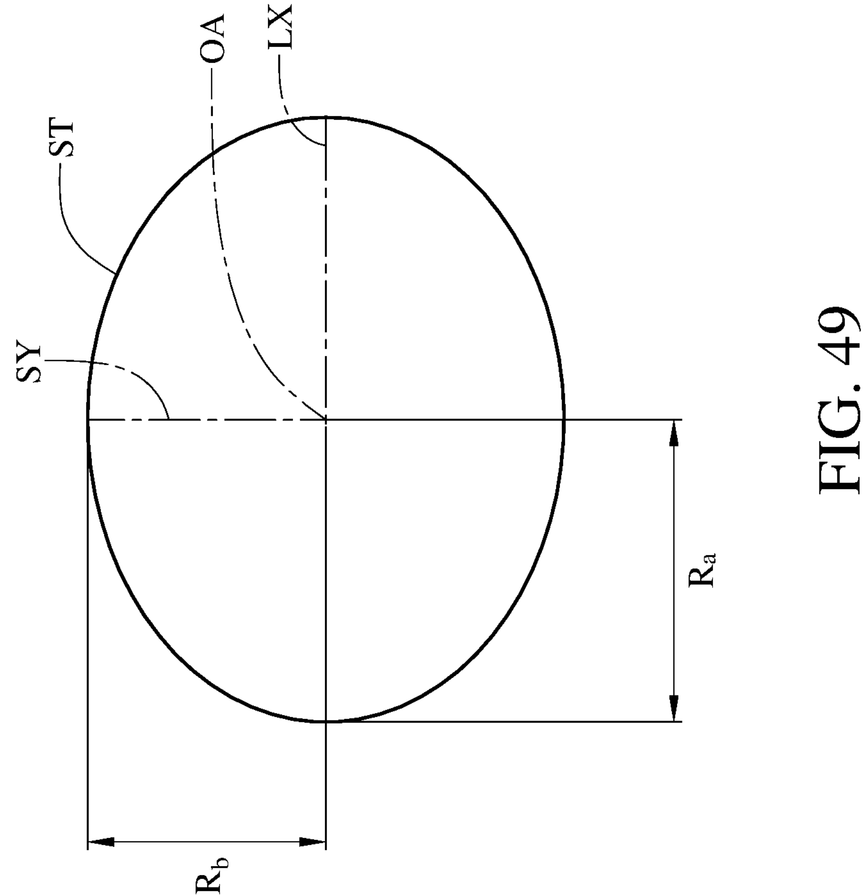
FIG. 49 shows a schematic view of a shape of an aperture stop according to the present disclosure.
Figure 50:
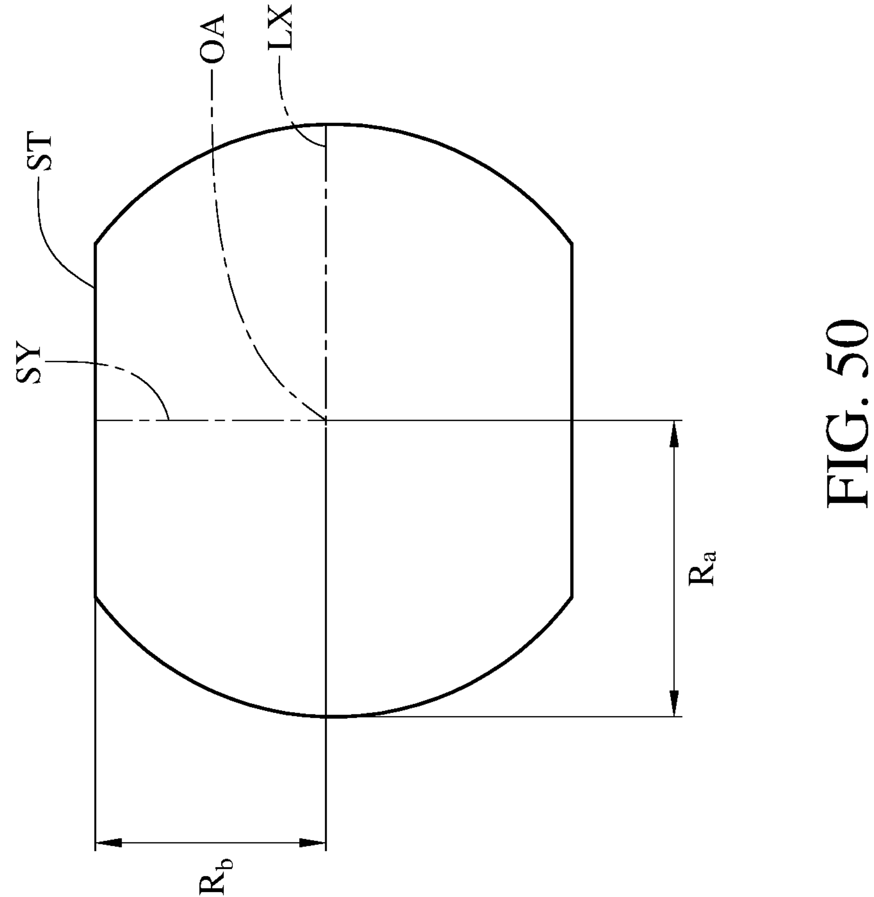
FIG. 50 shows a schematic view of another shape of an aperture stop according to the present disclosure.

According to the present disclosure, the photographing system lens assembly can further include an aperture stop disposed between the imaged object and the third lens element. Therefore, it is favorable for ensuring the photographing system lens assembly having a proper entrance pupil and controlling the field of view so as to achieve a telephoto photography effect. Moreover, the aperture stop can have a major axis direction and a minor axis direction which are perpendicular to the optical axis and different from each other, and an effective radius of the aperture stop in the major axis direction is different from an effective radius of the aperture stop in the minor axis direction. Therefore, it is favorable for adjusting the shape of the aperture stop so as to reduce stray light. For example, please refer to FIG. 49 and FIG. 50, which show schematic views of non-circular aperture stops according to the present disclosure, where FIG. 49 shows a schematic view of a shape of an aperture stop according to the present disclosure, and FIG. 50 shows a schematic view of another shape of an aperture stop according to the present disclosure. As shown in FIG. 49, in some configurations of the present disclosure, a shape of an aperture stop ST is elliptical, and the aperture stop ST has a major axis direction LX and a minor axis direction SY perpendicular to an optical axis OA. The major axis direction LX and the minor axis direction SY are two different directions, and an effective radius Ra of the aperture stop ST in the major axis direction LX is larger than an effective radius Rb of the aperture stop ST in the minor axis direction SY. As shown in FIG. 50, in some configurations of the present disclosure, an aperture stop ST is shaped to have trimmed edges at an outer periphery thereof, and the aperture stop ST has a major axis direction LX and a minor axis direction SY perpendicular to an optical axis OA. The major axis direction LX and the minor axis direction SY are two different directions, and an effective radius Ra of the aperture stop ST in the major axis direction LX is larger than an effective radius Rb of the aperture stop ST in the minor axis direction SY.

When an axial distance between the image-side surface of the fourth lens element and the image surface is BL, and an axial distance between the object-side surface of the first lens element and the image-side surface of the fourth lens element is TD, the following condition is satisfied: $1.35<BL/TD<15.00$. Therefore, it is favorable for properly adjusting the back focal length so as to enable optical path folding. Moreover, the following condition can also be satisfied: $2.00<BL/TD<12.00$. Moreover, the following condition can also be satisfied: $2.20<BL/TD<10.00$. Moreover, the following condition can also be satisfied: $2.80<BL/TD<9.50$. Moreover, the following condition can also be satisfied: $2.80<BL/TD<8.50$. Moreover, the following condition can also be satisfied: $3.50<BL/TD<7.00$.

When a curvature radius of the object-side surface of the third lens element is R5, and a curvature radius of the image-side surface of the third lens element is R6, the following condition can be satisfied: $0.05<(R5+R6)/(R5-R6)<12.00$. Therefore, it is favorable for adjusting the curvature radii of the two surfaces of the third lens element so as to correct aberrations at the peripheral field, such as astigmatism at the peripheral field. Moreover, the following condition can also be satisfied: $0.15<(R5+R6)/(R5-R6)<9.00$. Moreover, the following condition can also be satisfied: $0.40<(R5+R6)/(R5-R6)<7.00$.

When an axial distance between the first lens element and the second lens element is T12, and an axial distance between the third lens element and the fourth lens element is T34, the following condition can be satisfied: $0.03<T12/T34<15.00$. Therefore, it is favorable for balancing the distribution of the axial distances between adjacent lens elements so as to increase the symmetry of the photographing system lens assembly and reduce the size of light spot at the central field. Moreover, the following condition can also be satisfied: $0.08<T12/T34<12.00$. Moreover, the following condition can also be satisfied: $0.10<T12/T34<8.00$.

When an f-number of the photographing system lens assembly is Fno, the following condition can be satisfied: $1.00<Fno<4.20$. Therefore, it is favorable for obtaining a balance between illuminance and depth of field and increasing the amount of incident light so as to improve image quality. Moreover, the following condition can also be satisfied: $1.20<Fno<3.80$. Moreover, the following condition can also be satisfied: $1.80<Fno<3.50$. Moreover, the following condition can also be satisfied: $2.20<Fno<3.20$.

When half of a maximum field of view of the photographing system lens assembly is HFOV, the following condition can be satisfied: 6.0 degrees<HFOV<22.0 degrees. Therefore, it is favorable for the photographing system lens assembly to have a proper field of view for telephoto application. Moreover, the following condition can also be satisfied: 8.0 degrees<HFOV<20.0 degrees. Moreover, the following condition can also be satisfied: 11.0 degrees<HFOV<19.0 degrees.

When a central thickness of the first lens element is CT1, and an axial distance between the second lens element and the third lens element is T23, the following condition can be satisfied: $4.20<CT1/T23<95.00$. Therefore, it is favorable for balancing the central thickness of the first lens element and the axial distance between the second lens element and the third lens element so as to increase the systematic stability for various application designs. Moreover, the following condition can also be satisfied: $5.00<CT1/T23<80.00$. Moreover, the following condition can also be satisfied: $6.00<CT1/T23<60.00$.

When a focal length of the first lens element is f1, and a composite focal length of the third lens element and the fourth lens element is f34, the following condition can be satisfied: $-5.00<f1/f34<0.30$. Therefore, it is favorable for the lens elements at the front side and that at the rear side of the photographing system lens assembly to work with each other so as to balance the back focal length and correct aberrations. Moreover, the following condition can also be satisfied: $-3.00<f1/f34<0.20$. Moreover, the following condition can also be satisfied: $-1.50<f1/f34<0.10$. Moreover, the following condition can also be satisfied: $-1.20<f1/f34<0.03$.

When an Abbe number of the third lens element is V3, and an Abbe number of the fourth lens element is V4, the following condition can be satisfied: $1.55<V4/V3<5.00$. Therefore, it is favorable for adjusting the material arrangement of the third and fourth lens elements so as to balance chromatic aberration and astigmatism. Moreover, the following condition can also be satisfied: $1.65<V4/V3<4.00$. Moreover, the following condition can also be satisfied: $1.90<V4/V3<3.50$.

When a curvature radius of the image-side surface of the first lens element is R2, and the focal length of the first lens element is f1, the following condition can be satisfied: $-20.00<R2/f1<-0.01$. Therefore, it is favorable for maintaining the refractive power of the first lens element while preventing excessive aberrations generated due to overly large curvature radius of lens surface. Moreover, the following condition can also be satisfied: $-13.00<R2/f1<-0.10$. Moreover, the following condition can also be satisfied: $-9.00<R2/f1<-0.30$.

When the curvature radius of the object-side surface of the third lens element is R5, and the curvature radius of the image-side surface of the third lens element is R6, the following condition can be satisfied: $1.25<|R5/R6|<100.00$. Therefore, it is favorable for adjusting the ratio between curvature radii of the object-side surface and the image-side surface of the third lens element so as to reduce paraxial spherical aberration. Moreover, the following condition can also be satisfied: $1.30<|R5/R6|<75.00$. Moreover, the following condition can also be satisfied: $1.45<|R5/R6|<50.00$.

When an Abbe number of the first lens element is V1, an Abbe number of the second lens element is V2, the Abbe number of the third lens element is V3, the Abbe number of the fourth lens element is V4, an Abbe number of the i-th lens element is Vi, a refractive index of the first lens element is N1, a refractive index of the second lens element is N2, a refractive index of the third lens element is N3, a refractive index of the fourth lens element is N4, a refractive index of the i-th lens element is Ni, and a minimum value of Vi/Ni is (Vi/Ni)min, the following condition can be satisfied: $7.00<(Vi/Ni)min<20.00$, wherein i=1, 2, 3 or 4. Therefore, it is favorable for adjusting the material arrangement of lens elements so as to obtain a balance between chromatic aberration and astigmatism and increase light refractive capability, thereby obtaining compact product size. Moreover, the following condition can also be satisfied: $9.00<(Vi/Ni)min<18.00$, wherein i=1, 2, 3 or 4. Moreover, the following condition can also be satisfied: $10.00<(Vi/Ni)min<17.00$, wherein i=1, 2, 3 or 4.

When the refractive index of the fourth lens element is N4, the following condition can be satisfied: $1.420<N4<1.710$. Therefore, it is favorable for adjusting the material of the fourth lens element so as to balance the refractive power distribution of lens elements for preventing excessive image corrections caused by overly large refractive power of any single lens element. Moreover, the following condition can also be satisfied: $1.500<N4<1.650$. Moreover, the following condition can also be satisfied: $1.530<N4<1.590$.

When a curvature radius of the object-side surface of the second lens element is R3, and a curvature radius of the image-side surface of the second lens element is R4, the following condition can be satisfied: $-30.00<(R3+R4)/(R3-R4)<0.10$. Therefore, it is favorable for the object-side surface of the second lens element to have sufficient light refractive capability so as to control travelling direction of light. Moreover, the following condition can also be satisfied: $-15.00<(R3+R4)/(R3-R4)<0.00$.

When an axial distance between the object-side surface of the first lens element and the image surface is TL, and a focal length of the photographing system lens assembly is f, the following condition can be satisfied: $1.20<TL/f<2.00$. Therefore, it is favorable for balancing the ratio between the total track length and the focal length of the photographing system lens assembly for various application requirements. Moreover, the following condition can also be satisfied: $1.25<TL/f<1.70$.

When the axial distance between the second lens element and the third lens element is T23, and the curvature radius of the image-side surface of the second lens element is R4, the following condition can be satisfied: $0.01<T23\times100/|R4|<10.00$. Therefore, it is favorable for adjusting the surface shape of an air lens between the second lens element and the third lens element so as to increase the structural strength at the middle part of the photographing system lens assembly and reduce sensitivity. Moreover, the following condition can also be satisfied: $0.08<T23\times100/|R4|<6.00$. Moreover, the following condition can also be satisfied: $0.10<T23\times100/|R4|<3.40$. It is noted that an air lens is provided in a space between two adjacent physical lens elements, the air between the two adjacent physical lens elements acts as the transmission medium, and two adjacent lens surfaces of the two adjacent physical lens elements act as refractive interfaces to refract light and correct periphery image.

Figure 38:
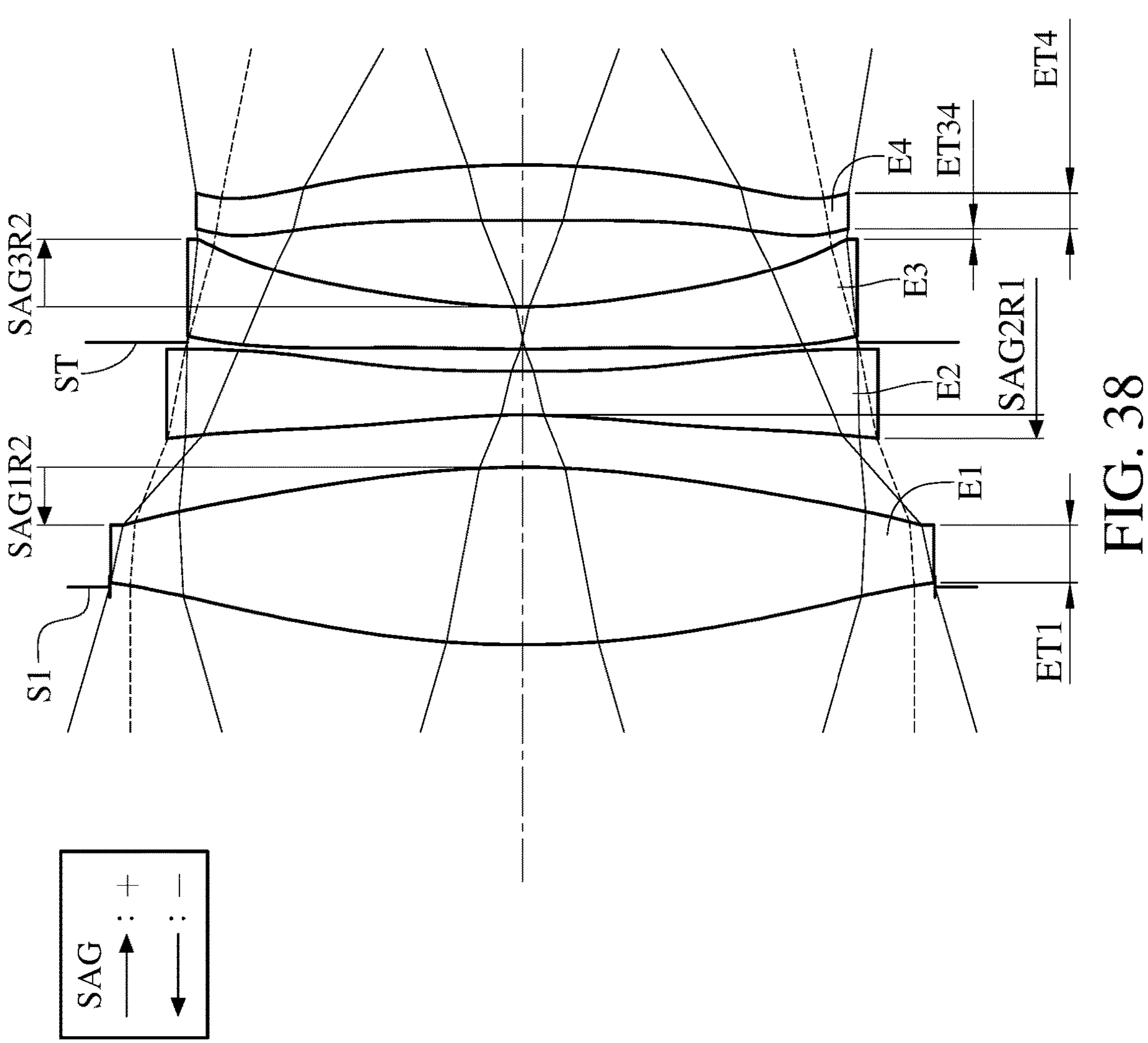
FIG. 38 shows a schematic view of SAG1R2, SAG2R1, SAG3R2, ET1, ET4 and ET34 according to the 1st embodiment of the present disclosure.

When a distance in parallel with the optical axis between a maximum effective radius position of the object-side surface of the first lens element and a maximum effective radius position of the image-side surface of the first lens element is ET1, a distance in parallel with the optical axis between a maximum effective radius position of the object-side surface of the fourth lens element and a maximum effective radius position of the image-side surface of the fourth lens element is ET4, the central thickness of the first lens element is CT1, and a central thickness of the fourth lens element is CT4, the following condition can be satisfied: $0.20<(ET1+ET4)/(CT1+CT4)<0.80$. Therefore, it is favorable for adjusting the ratios between the peripheral thickness and the central thickness of the first lens element and the fourth lens element so as to reduce the difficulty of mechanical design. Please refer to FIG. 38, which shows a schematic view of ET1 and ET4 according to the 1st embodiment of the present disclosure.

When a curvature radius of the object-side surface of the fourth lens element is R7, and a curvature radius of the image-side surface of the fourth lens element is R8, the following condition can be satisfied: $-1.00<(R7+R8)/(R7-R8)<30.00$. Therefore, it is favorable for adjusting the surface shape of the fourth lens element so as to improve the light gathering quality in the paraxial region. Moreover, the following condition can also be satisfied: $0.03<(R7+R8)/(R7-R8)<20.00$.

When a maximum effective radius of the object-side surface of the first lens element is Y1R1, and a maximum image height of the photographing system lens assembly (which can be half of a diagonal length of an effective photosensitive area of an image sensor) is ImgH, the following condition can be satisfied: $0.40<Y1R1/ImgH<1.50$. Therefore, it is favorable for adjusting travelling direction of light so as to balance the field of view, size distribution and the image quality. Moreover, the following condition can also be satisfied: $0.50<Y1R1/ImgH<1.20$. Please refer to FIG. 37, which shows a schematic view of Y1R1 and ImgH according to the 1st embodiment of the present disclosure.

When the maximum image height of the photographing system lens assembly is ImgH, the following condition can be satisfied: $1.00\ mm<ImgH<10.00\ mm$. Therefore, it is favorable for the photographing system lens assembly to have a suitable image surface area for various application requirements. Moreover, the following condition can also be satisfied: $3.00\ mm<ImgH<7.00\ mm$.

When a distance in parallel with the optical axis between a maximum effective radius position of the image-side surface of the third lens element and the maximum effective radius position of the object-side surface of the fourth lens element is ET34, and the axial distance between the third lens element and the fourth lens element is T34, the following condition can be satisfied: $0.01<ET34/T34<0.50$. Therefore, it is favorable for adjusting the distance between the third lens element and the fourth lens element so as to obtain a balance between reducing assembling difficulty and reducing stray light in the lens elements. Moreover, the following condition can also be satisfied: 0.03<ET34/T34<0.35. Please refer to FIG. 38, which shows a schematic view of ET34 according to the 1st embodiment of the present disclosure.

When a displacement in parallel with the optical axis from an axial vertex of the object-side surface of the second lens element to a maximum effective radius position of the object-side surface of the second lens element is SAG2R1, a displacement in parallel with the optical axis from an axial vertex of the image-side surface of the third lens element to the maximum effective radius position of the image-side surface of the third lens element is SAG3R2, a central thickness of the second lens element is CT2, and a central thickness of the third lens element is CT3, the following condition can be satisfied: 0.40<(|SAG2R1|+|SAG3R2|)/(CT2+CT3)<2.50. Therefore, it is favorable for adjusting the curvature degree at the periphery of the second lens element and the third lens element for controlling the travelling direction of peripheral light rays. Please refer to FIG. 38, which shows a schematic view of SAG2R1 and SAG3R2 according to the 1st embodiment of the present disclosure. When the direction from the axial vertex of one surface to the maximum effective radius position of the same surface is facing towards the image side of the photographing system lens assembly, the value of displacement is positive; when the direction from the axial vertex of the surface to the maximum effective radius position of the same surface is facing towards the object side of the photographing system lens assembly, the value of displacement is negative.

Figure 39:
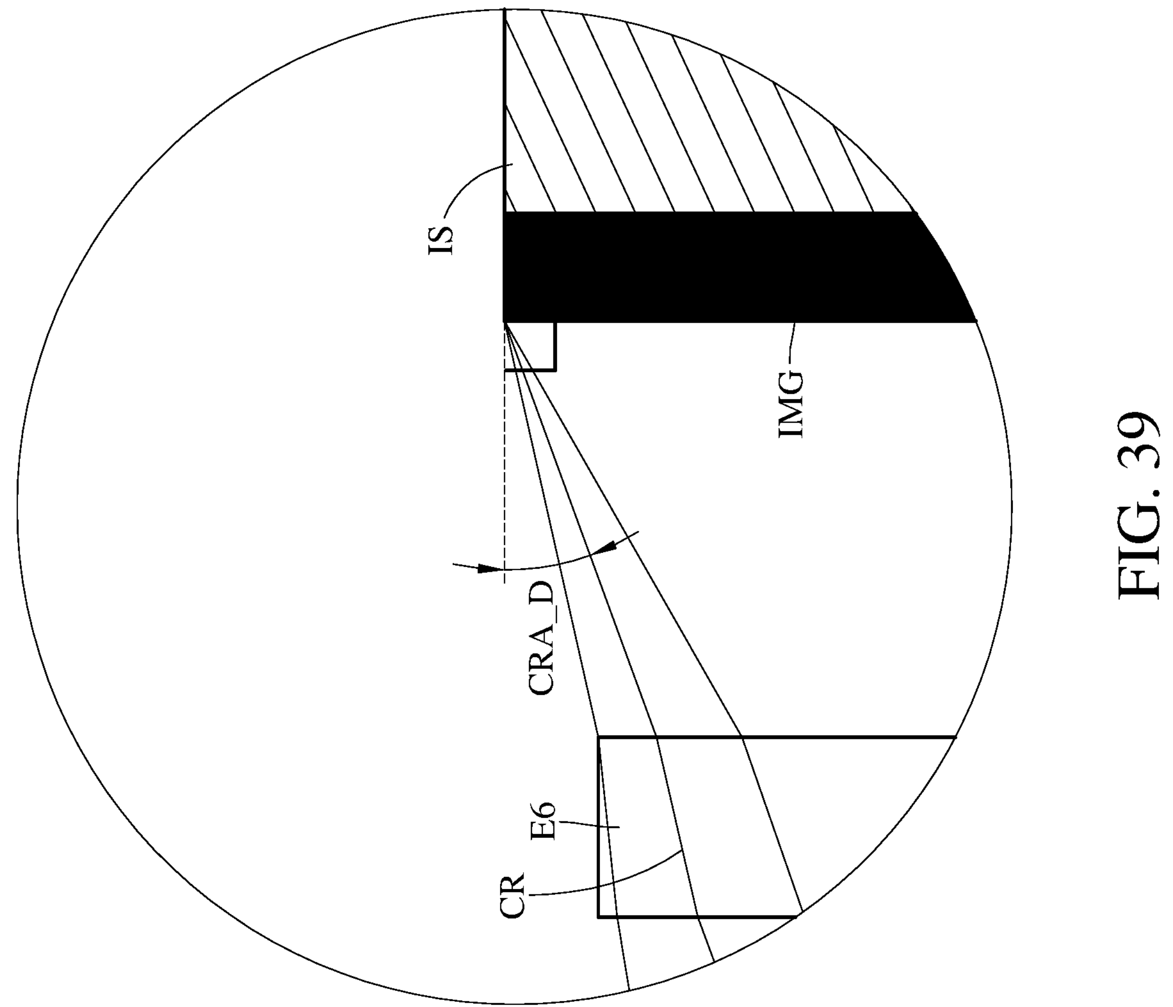
FIG. 39 shows a schematic view of CRA_D according to the present disclosure.

When a chief ray angle of the maximum field of view on the image surface of the photographing system lens assembly is CRA_D, the following condition can be satisfied: 5.0 degrees<CRA_D<35.0 degrees. Therefore, it is favorable for adjusting light rays to have a desired incident angle on the image surface for optical path folding and telephoto applications. Moreover, the following condition can also be satisfied: 10.0 degrees<CRA_D<25.0 degrees. Please refer to FIG. 39, which shows a schematic view of a chief ray angle CRA_D according to the present disclosure. In FIG. 39, a chief ray CR of the maximum field of view is incident on the image surface IMG at an image position, and the angle between a normal line of the image surface IMG and the chief ray CR of the maximum field of view is the chief ray angle of the maximum field of view CRA_D.

When a minimum value among Abbe numbers of all lens elements of the photographing system lens assembly is Vmin, the following condition can be satisfied: 6.0<Vmin<29.0. Therefore, it is favorable for correcting chromatic aberration generated by the photographing system lens assembly as well as bringing out the telephoto characteristics such as a long focal length and a small field of view. Moreover, the following condition can also be satisfied: 10.0<Vmin<26.0.

When the maximum effective radius of the object-side surface of the first lens element is Y1R1, and a maximum effective radius of the image-side surface of the fourth lens element is Y4R2, the following condition can be satisfied: 1.10<Y1R1/Y4R2<1.60. Therefore, it is favorable for adjusting the ratio between the effective radii of the first lens element and the fourth lens element so as to control the beam size and thus, ensure a desired incident angle of light on the reflective element. Please refer to FIG. 37, which shows a schematic view of Y1R1 and Y4R2 according to the 1st embodiment of the present disclosure.

When a displacement in parallel with the optical axis from an axial vertex of the image-side surface of the first lens element to the maximum effective radius position of the image-side surface of the first lens element is SAG1R2, and the central thickness of the fourth lens element is CT4, the following condition can be satisfied: −2.50<SAG1R2/CT4<−0.10. Therefore, it is favorable for adjusting the ratio between the peripheral surface shape of the image-side surface of the first lens element and the central thickness of the fourth lens element so as to control the peripheral shape of lens element for off-axis aberration corrections. Moreover, the following condition can also be satisfied: −2.00<SAG1R2/CT4<−0.25. Please refer to FIG. 38, which shows a schematic view of SAG1R2 according to the 1st embodiment of the present disclosure.

When the axial distance between the object-side surface of the first lens element and the image-side surface of the fourth lens element is TD, and the axial distance between the first lens element and the second lens element is T12, the following condition can be satisfied: 2.00<TD/T12<80.00. Therefore, it is favorable for adjusting the axial distance between the first lens element and the second lens element so as to obtain a balance between the space utilization and assembly yield rate of the photographing system lens assembly. Moreover, the following condition can also be satisfied: 3.50<TD/T12<50.00.

According to the present disclosure, the aforementioned features and conditions can be utilized in numerous combinations so as to achieve corresponding effects.

According to the present disclosure, the lens elements of the photographing system lens assembly can be made of either glass or plastic material. When the lens elements are made of glass material, the refractive power distribution of the photographing system lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photographing system lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the photographing system lens assembly, based on the corresponding image sensor, can be flat or curved, especially a curved surface being concave facing towards the object side of the photographing system lens assembly.

According to the present disclosure, an image correction unit, such as a field flattener, can be optionally disposed between the lens element closest to the image side of the photographing system lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, at least one reflective element, such as a prism or a mirror, can be optionally provided, and the surface shape of the prism or mirror can be planar, spherical, aspheric or freeform surface, such that the photographing system lens assembly can be more flexible in space arrangement. The reflective element can be disposed between the imaged object and the image surface so as to reduce the size of the photographing system lens assembly. The optical path can be deflected at least one time by the reflective element. An angle between the optical axis and a normal direction of a reflective surface of the reflective element is not limited to 45 degrees, but can be other angles depending on the space arrangement. The optical path along an optical axis at the object side can be redirected to an optical axis at the image side by the reflective element. An angle between a vector of the optical axis at the object side and that at the image side can be any angle, not limited to 0, 90 or 180 degrees. The surface shape of the reflective element (e.g., the surface shape of the prism or the mirror) can be planar, spherical, aspheric or freeform surface according to the optical design requirements, but the present disclosure is not limited thereto. The reflective element can consist of more than one prism depending on the design requirements. The prism can be made of glass material or plastic material depending on the design requirements. In addition, the prism with optical path folding function is not one of the lens elements; that is, the prism with optical path folding function is not included in the four lens elements of the photographing system lens assembly.

Figure 40:
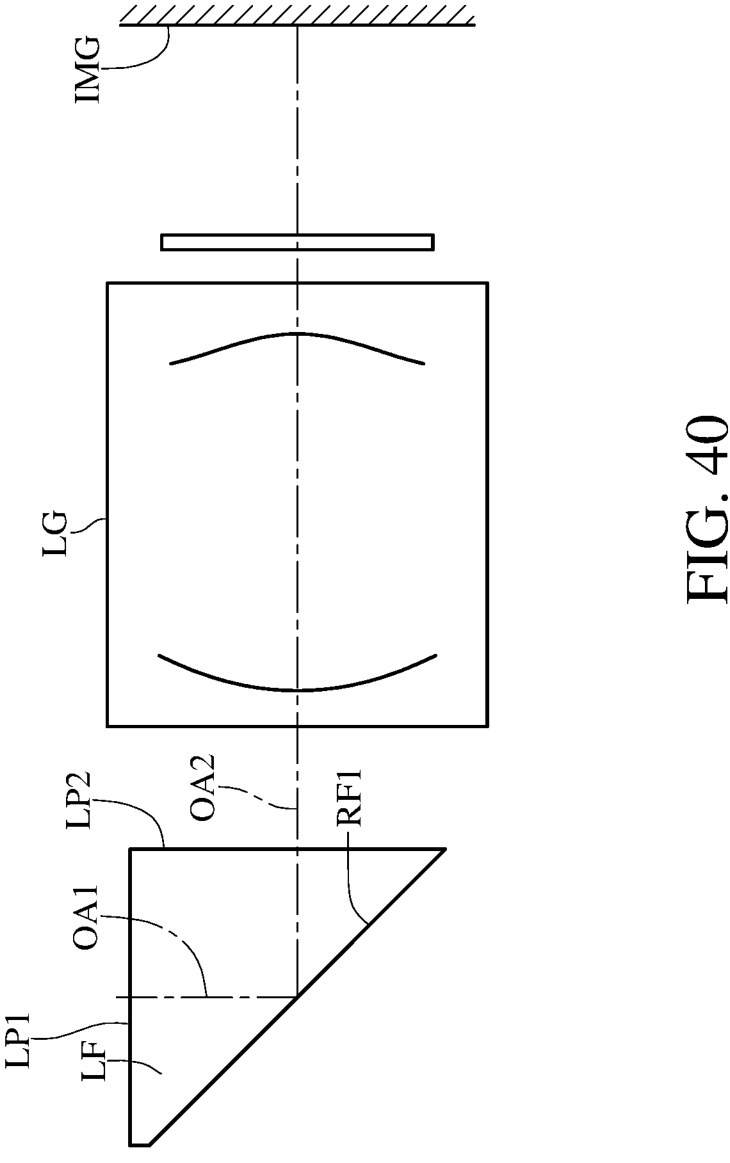
FIG. 40 and FIG. 41 each show a schematic view of a configuration of one reflective element in a photographing system lens assembly according to one embodiment of the present disclosure.
Figure 41:
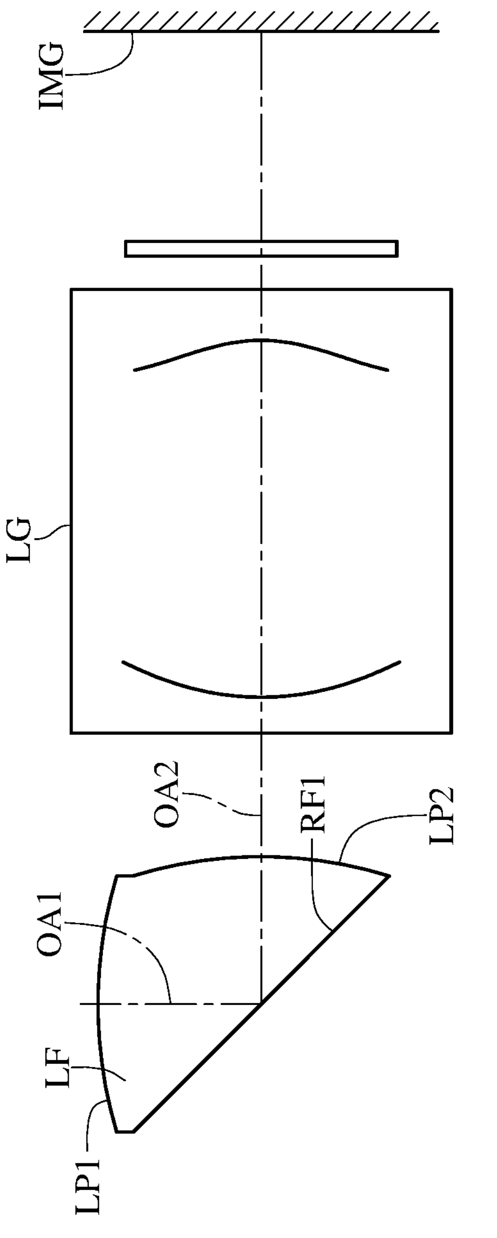

FIG. 40 and FIG. 41 each show a schematic view of a configuration of one reflective element in a photographing system lens assembly according to one embodiment of the present disclosure. In FIG. 40 and FIG. 41, the photographing system lens assembly can include, in order from an imaged object (not shown in the figures) to an image surface IMG along an optical path, a reflective element LF, a lens group LG and the image surface IMG. The reflective element LF can be disposed between the imaged object and the lens group LG. The reflective element LF has a transmissive surface LP1, a reflective surface RF1 and a transmissive surface LP2 sequentially along the travelling direction of light on the optical path. The optical path can enter the reflective element LF through the transmissive surface LP1, reach the reflective surface RF1 along a first optical axis OA1, be deflected off by the reflective surface RF1, pass through the transmissive surface LP2, and then enter the lens group LG along a second optical axis OA2. In FIG. 40, the transmissive surfaces LP1 and LP2 can be both planar. In FIG. 41, the transmissive surfaces LP1 and LP2 can be both curved.

Figure 42:
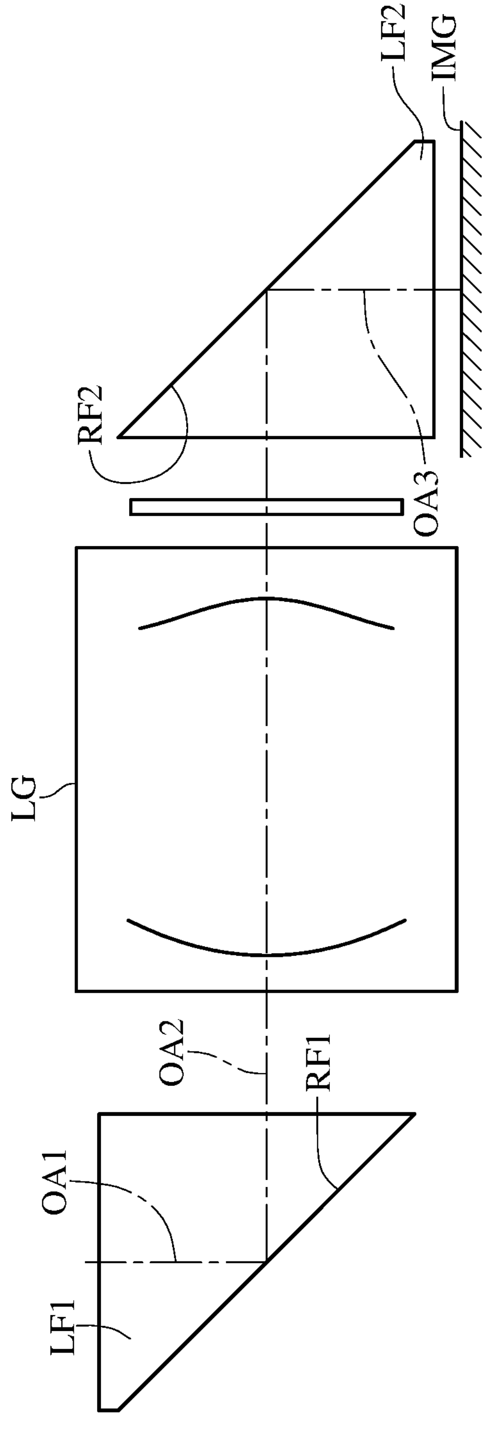
FIG. 42 and FIG. 43 each show a schematic view of a configuration of two reflective elements in a photographing system lens assembly according to one embodiment of the present disclosure.
Figure 43:
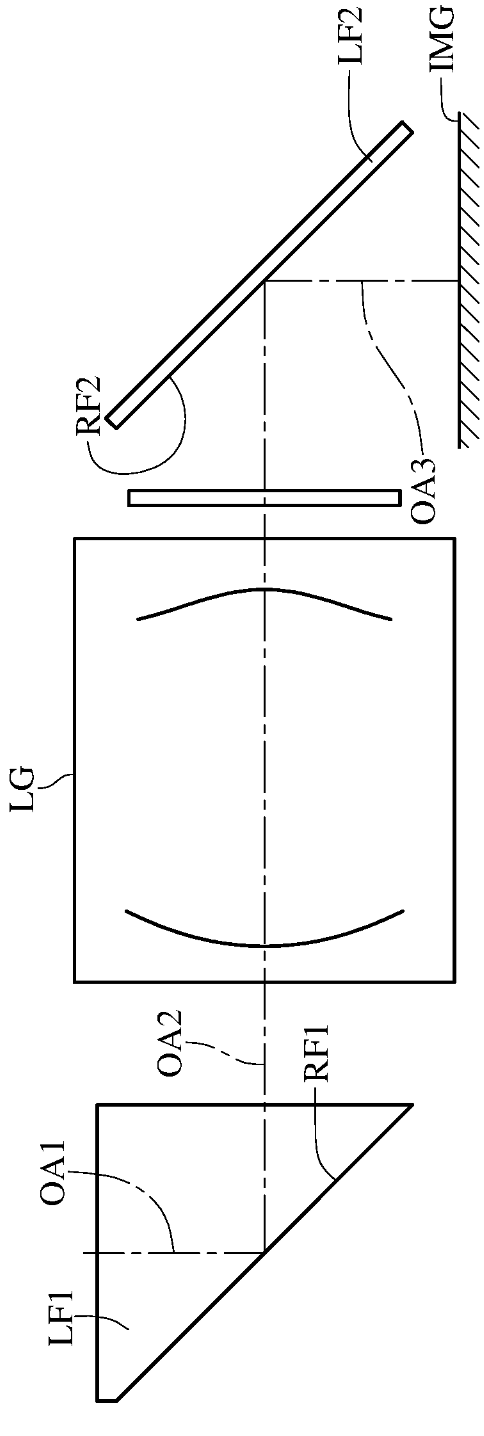

FIG. 42 and FIG. 43 each show a schematic view of a configuration of two reflective elements in a photographing system lens assembly according to one embodiment of the present disclosure. In FIG. 42 and FIG. 43, the photographing system lens assembly can include, in order from an imaged object (not shown in the figures) to an image surface IMG along an optical path, a reflective element LF1, a lens group LG, a reflective element LF2 and the image surface IMG. The reflective element LF1 can be disposed between the imaged object and the lens group LG, and the reflective element LF2 can be disposed between the lens group LG and the image surface IMG. The optical path can enter the reflective element LF1, reach a reflective surface RF1 along a first optical axis OA1, be deflected off by the reflective surface RF1 of the reflective element LF1, pass through the lens group LG and enter the reflective element LF2, reach a reflective surface RF2 along a second optical axis OA2, be deflected off by the reflective surface RF2 of the reflective element LF2, and then extend onto the image surface IMG along a third optical axis OA3. In FIG. 42, each of the reflective elements LF1 and LF2 can be a prism. In FIG. 43, the reflective elements LF1 and LF2 can be a prism and a reflective mirror, respectively.

Figure 44:
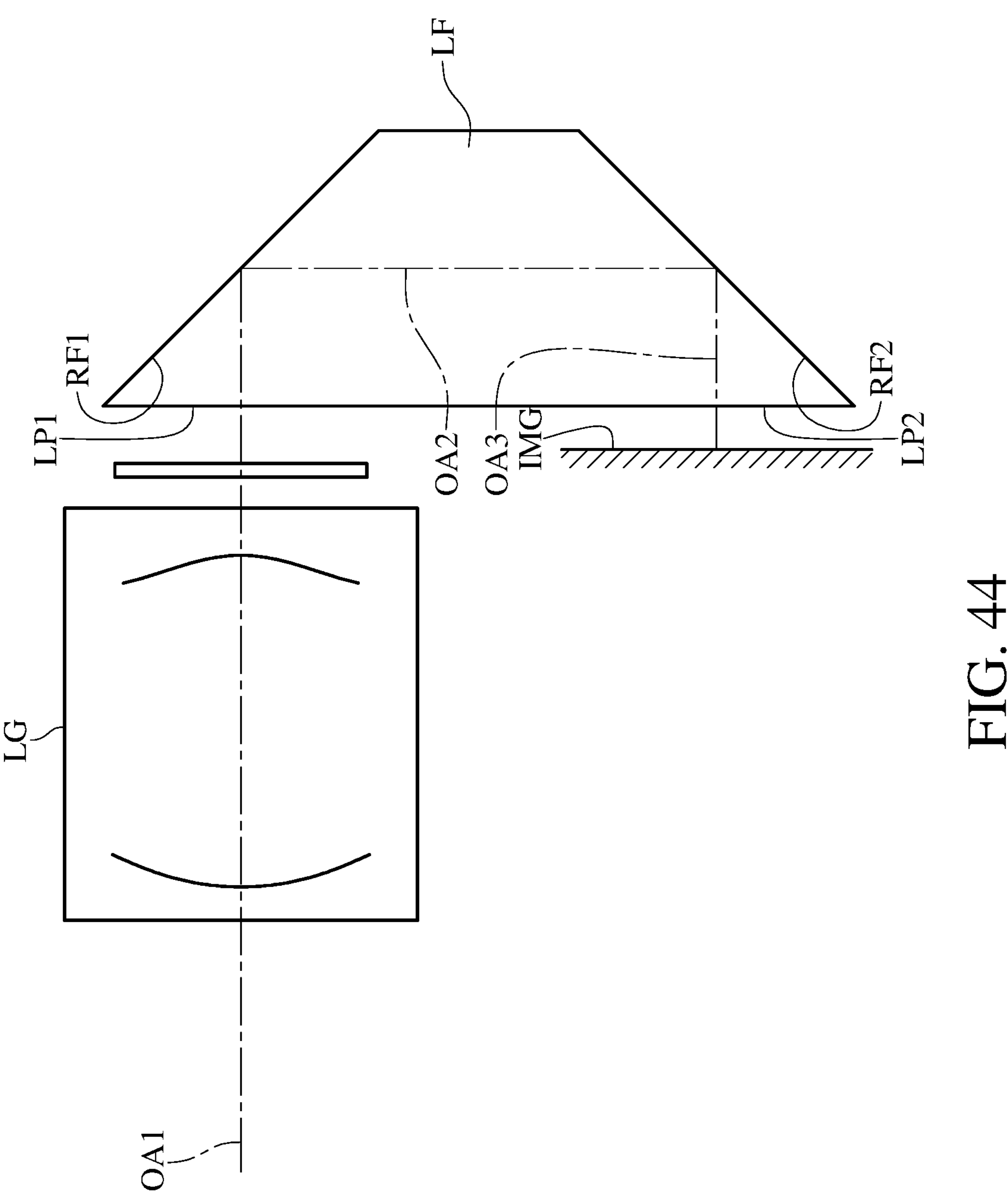
FIG. 44 to FIG. 46 each show a schematic view of another configuration of one reflective element in a photographing system lens assembly according to one embodiment of the present disclosure.
Figure 45:
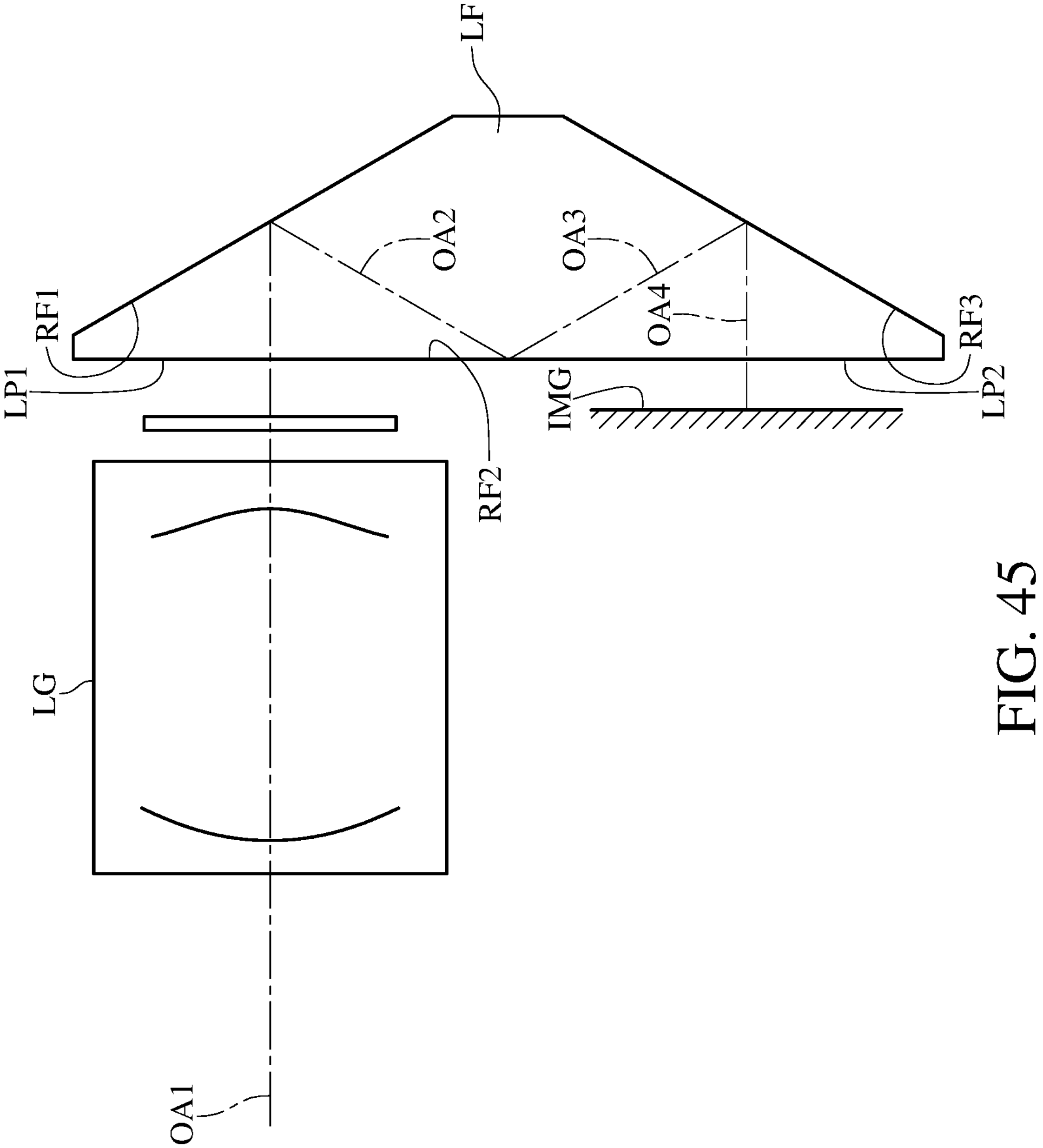
Figure 46:
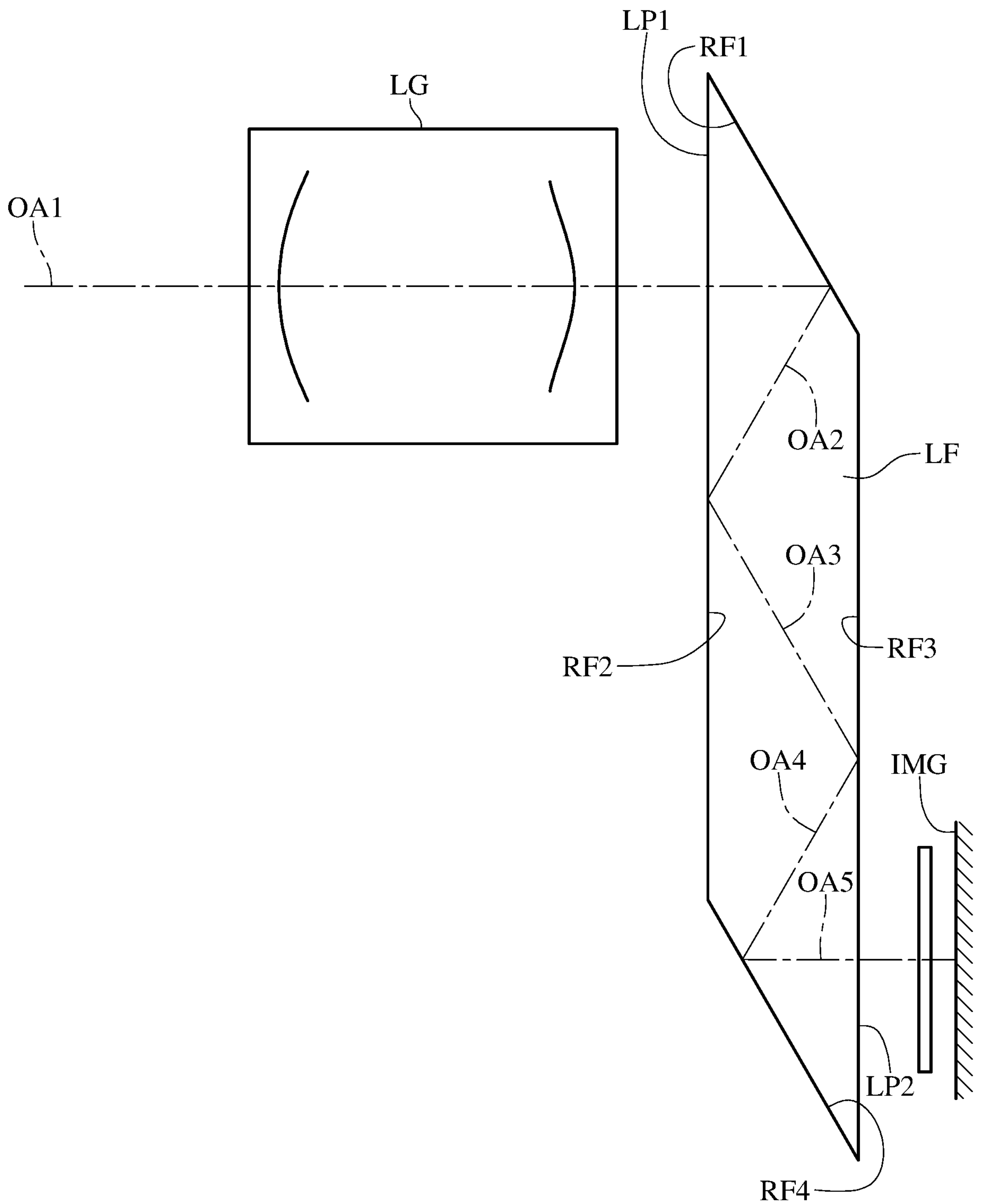

FIG. 44 to FIG. 46 each show a schematic view of another configuration of one reflective element in a photographing system lens assembly according to one embodiment of the present disclosure. In FIG. 44, the photographing system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF can be a prism and the reflective element LF has a transmissive surface LP1, a reflective surface RF1, a reflective surface RF2 and a transmissive surface LP2 sequentially along the travelling direction of light on the optical path. The optical path can enter the reflective element LF through the transmissive surface LP1, reach the reflective surface RF1 along a first optical axis OA1, be deflected off by the reflective surface RF1, reach the reflective surface RF2 along a second optical axis OA2, be deflected off by the reflective surface RF2, pass through the transmissive surface LP2, and then extend onto the image surface IMG along a third optical axis OA3.

In FIG. 45, the photographing system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF can be a prism and the reflective element LF has a transmissive surface LP1, a reflective surface RF1, a reflective surface RF2, a reflective surface RF3 and a transmissive surface LP2 sequentially along the travelling direction of light on the optical path. The optical path can enter the reflective element LF through the transmissive surface LP1, reach the reflective surface RF1 along a first optical axis OA1, be deflected off by the reflective surface RF1, reach the reflective surface RF2 along a second optical axis OA2, be deflected off by the reflective surface RF2, reach the reflective surface RF3 along a third optical axis OA3, be deflected off by the reflective surface RF3, pass through the transmissive surface LP2, and then extend onto the image surface IMG along a fourth optical axis OA4.

In FIG. 46, the photographing system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF can be a prism and the reflective element LF has a transmissive surface LP1, a reflective surface RF1, a reflective surface RF2, a reflective surface RF3, a reflective surface RF4 and a transmissive surface LP2 sequentially along the travelling direction of light on the optical path. The optical path can enter the reflective element LF through the transmissive surface LP1, reach the reflective surface RF1 along a first optical axis OA1, be deflected off by the reflective surface RF1, reach the reflective surface RF2 along a second optical axis OA2, be deflected off by the reflective surface RF2, reach the reflective surface RF3 along a third optical axis OA3, be deflected off by the reflective surface RF3, reach the reflective surface RF4 along a fourth optical axis OA4, be deflected off by the reflective surface RF4, pass through the transmissive surface LP2, and then extend onto the image surface IMG along a fifth optical axis OA5.

Figure 47:
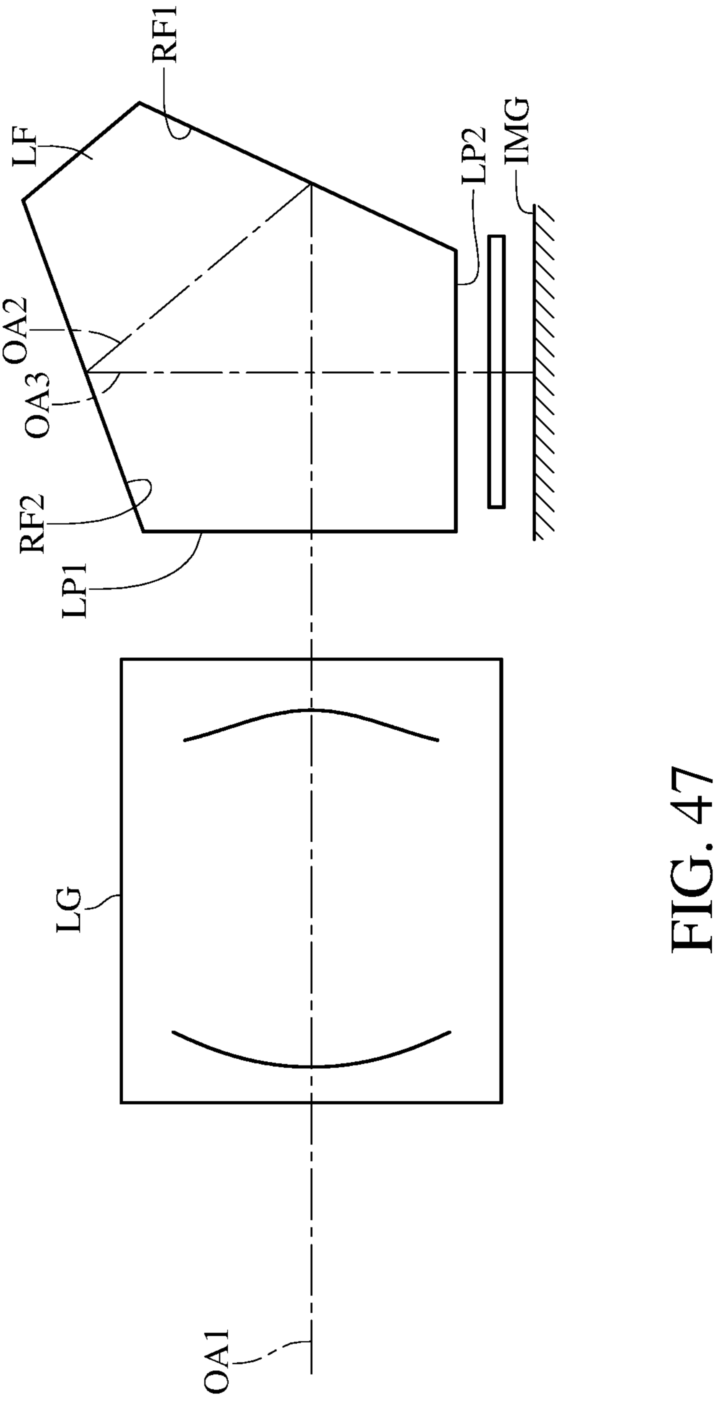
FIG. 47 and FIG. 48 each show a schematic view of still another configuration of one reflective element in a photographing system lens assembly according to one embodiment of the present disclosure.
Figure 48:
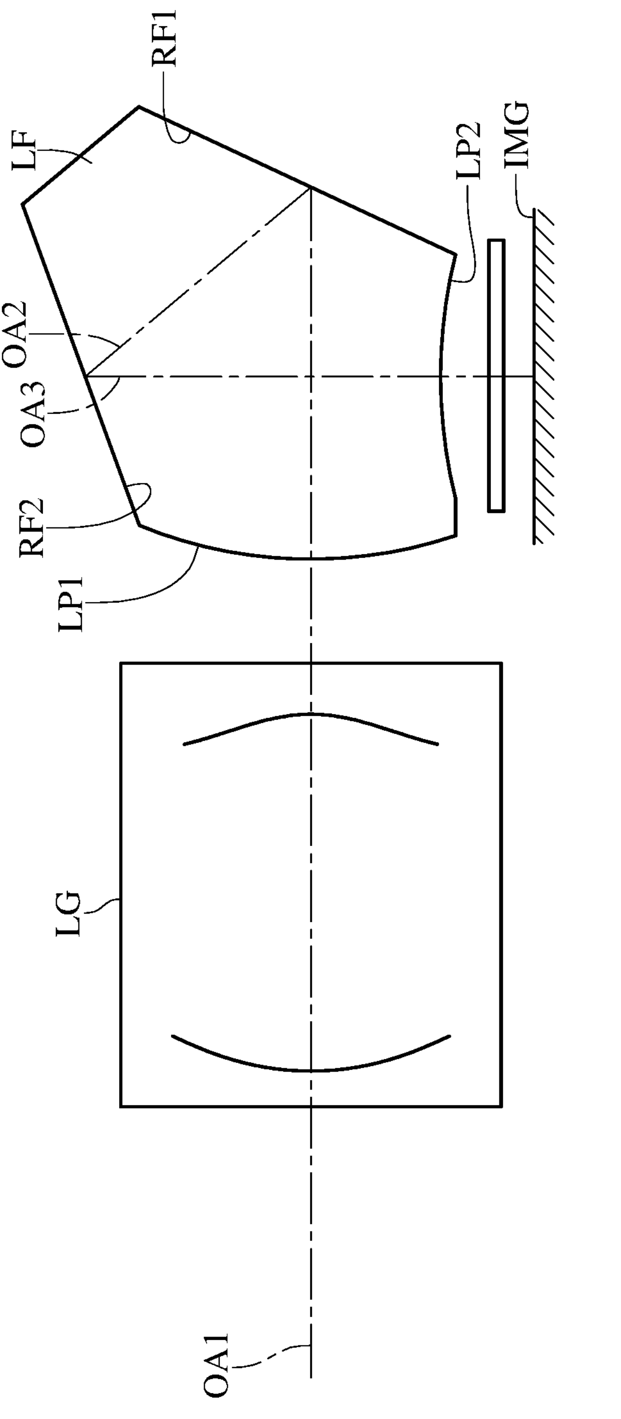

FIG. 47 and FIG. 48 each show a schematic view of still another configuration of one reflective element in a photographing system lens assembly according to one embodiment of the present disclosure. In FIG. 47 and FIG. 48, the photographing system lens assembly can include, in order from an imaged object (not shown in the figures) to an image surface IMG along an optical path, a lens group LG, a reflective element LF and the image surface IMG. The reflective element LF can be disposed between the lens group LG and the image surface IMG along the optical path. The reflective element LF can be a pentaprism and the reflective element LF has a transmissive surface LP1, a reflective surface RF1, a reflective surface RF2 and a transmissive surface LP2 sequentially along the travelling direction of light on the optical path. The optical path can enter the reflective element LF through the transmissive surface LP1, reach the reflective surface RF1 along a first optical axis OA1, be deflected off by the reflective surface RF1, reach the reflective surface RF2 along a second optical axis OA2, be deflected off by the reflective surface RF2, pass through the transmissive surface LP2, and then extend onto the image surface IMG along a third optical axis OA3. In FIG. 47, the transmissive surfaces LP1 and LP2 can be both planar. In FIG. 48, the transmissive surfaces LP1 and LP2 can be both curved.

Figure 51:
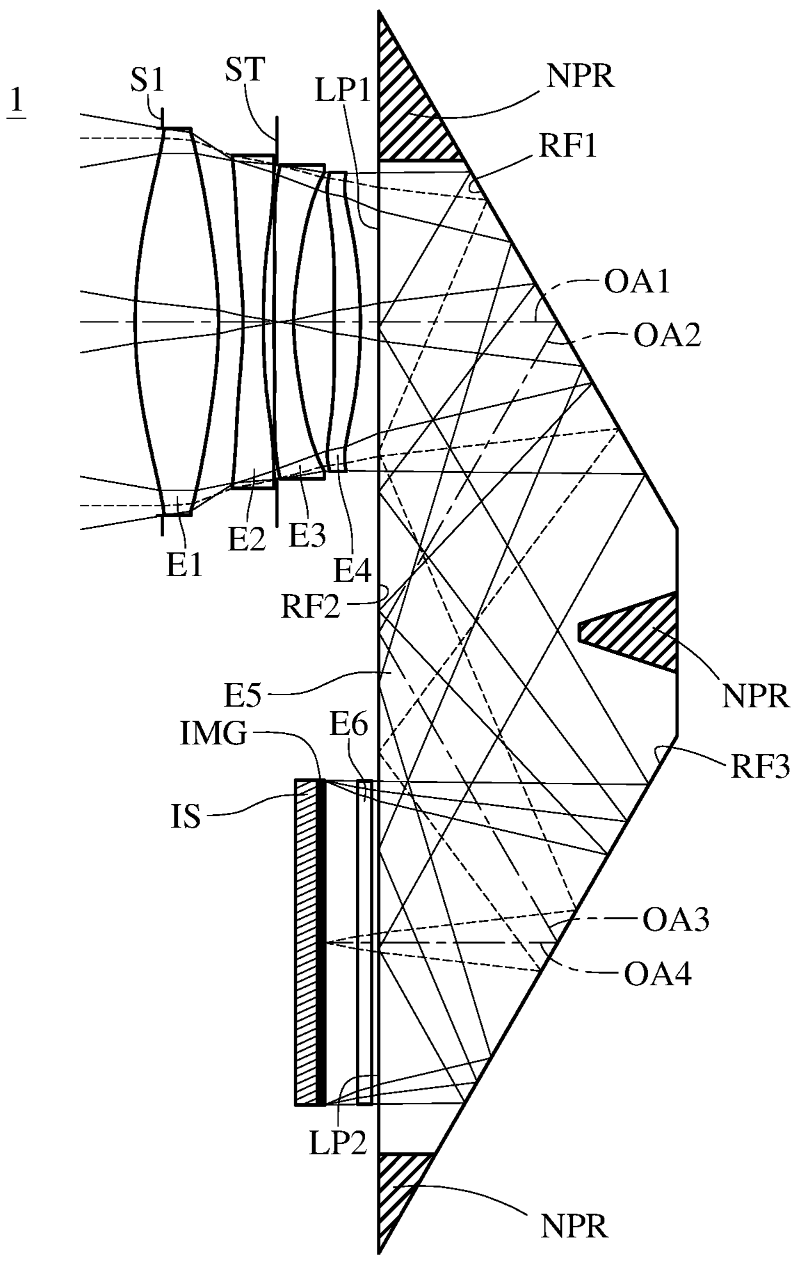
FIG. 51 shows a schematic view of a configuration of a reflective element in the photographing system lens assembly of the image capturing unit according to the 1st embodiment.
Figure 52:
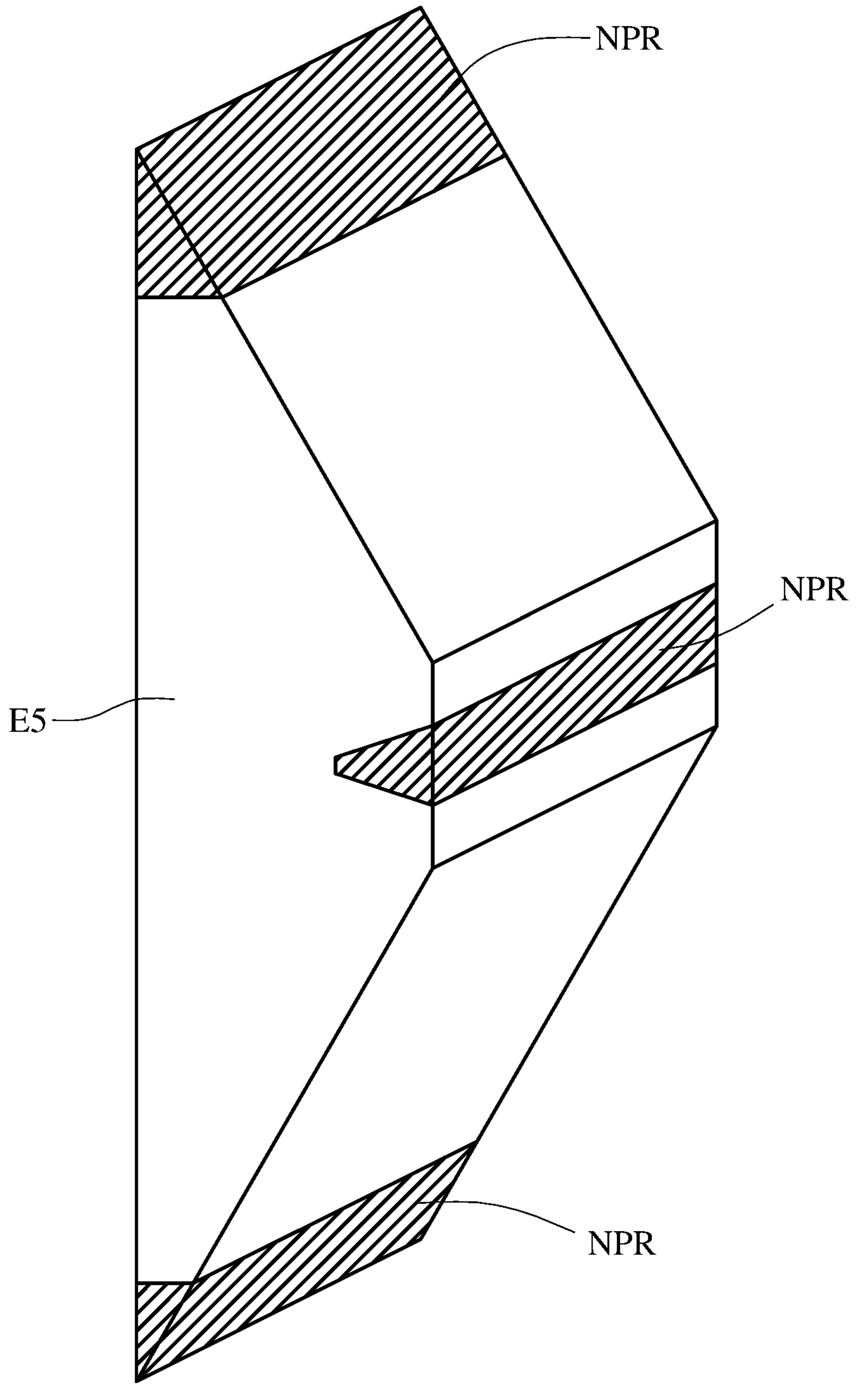
FIG. 52 shows a perspective view of the reflective element in FIG. 51 without trimmed edges and recess.
Figure 53:
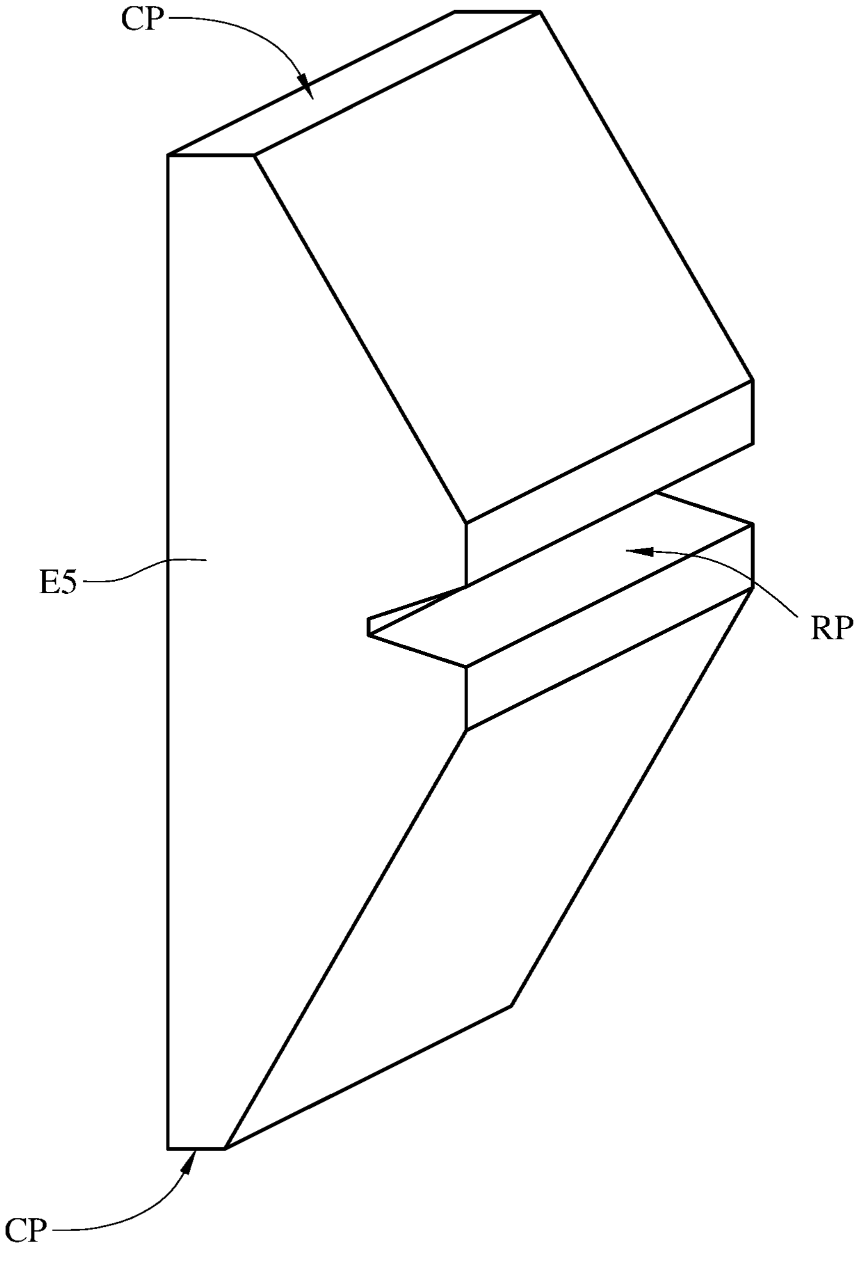
FIG. 53 shows a perspective view of the reflective element in FIG. 51.

Furthermore, in order to reduce the space for accommodating the photographing system lens assembly, the length and the width of the lens element may be unequal to each other, and the length, the width and the height of the prism may be unequal to one another. In addition, the prism can have at least one trimmed edge or at least one recess at its optically non-effective area so as to reduce the weight and size thereof and to be configured in accordance with other components in the electronic device. Moreover, a light absorbing layer can be coated on the surface in the recess so as to prevent light reflection and block stray light. Please refer to FIG. 51 to FIG. 53, where FIG. 51 shows a schematic view of a configuration of a reflective element in the photographing system lens assembly of the image capturing unit according to the 1st embodiment, FIG. 52 shows a perspective view of the reflective element in FIG. 51 without trimmed edges and recess, and FIG. 53 shows a perspective view of the reflective element in FIG. 51. As shown in FIG. 51, a reflective element E5 has several optically non-effective areas NPR; that is, imaging light does not pass through the optically non-effective areas NPR in the reflective element E5. Therefore, the optically non-effective areas NPR of the reflective element E5 as shown in FIG. 52 can be removed, and thus, the reflective element E5 can be formed with two trimmed edges CP and a recess RP (as shown in FIG. 53).

The photographing system lens assembly can be optionally provided with three or more reflective elements, and the present disclosure is not limited to the type, number and position of the reflective elements of the embodiments as disclosed in the aforementioned figures.

According to the present disclosure, the photographing system lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing system lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing system lens assembly and thereby provides a wider field of view for the same.

According to the present disclosure, the photographing system lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photographing system lens assembly can include one or more optical elements for limiting the form of light passing through the photographing system lens assembly. Each optical element can be, but not limited to, a filter, a polarizer, etc., and each optical element can be, but not limited to, a single-piece element, a composite component, a thin film, etc. The optical element can be located at the object side or the image side of the photographing system lens assembly or between any two adjacent lens elements so as to allow light in a specific form to pass through, thereby meeting application requirements.

According to the present disclosure, the photographing system lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the photographing system lens assembly can further include a light-blocking element. The light-blocking element can have a non-circular opening, and the non-circular opening can have different effective radii in different directions which are perpendicular to the optical axis. Therefore, it is favorable for the light-blocking element to coordinate with the shape of non-circular lens elements or aperture stop so as to reduce the size of the photographing system lens assembly and make full use of the light passing through said non-circular lens elements or aperture stop, thereby reducing stray light. Moreover, the light-blocking element can be provided with a wavy structure or a jagged structure at a periphery of an inner hole portion thereof.

According to the present disclosure, the object side and image side are defined in accordance with the direction of the optical axis, and the axial optical data are calculated along the optical axis. Furthermore, if the optical axis is deflected by a reflective element, the axial optical data are also calculated along the deflected optical axis.

According to the above description of the present disclosure, the following specific embodiments are provided for further explanation.

1st Embodiment

Figure 2:
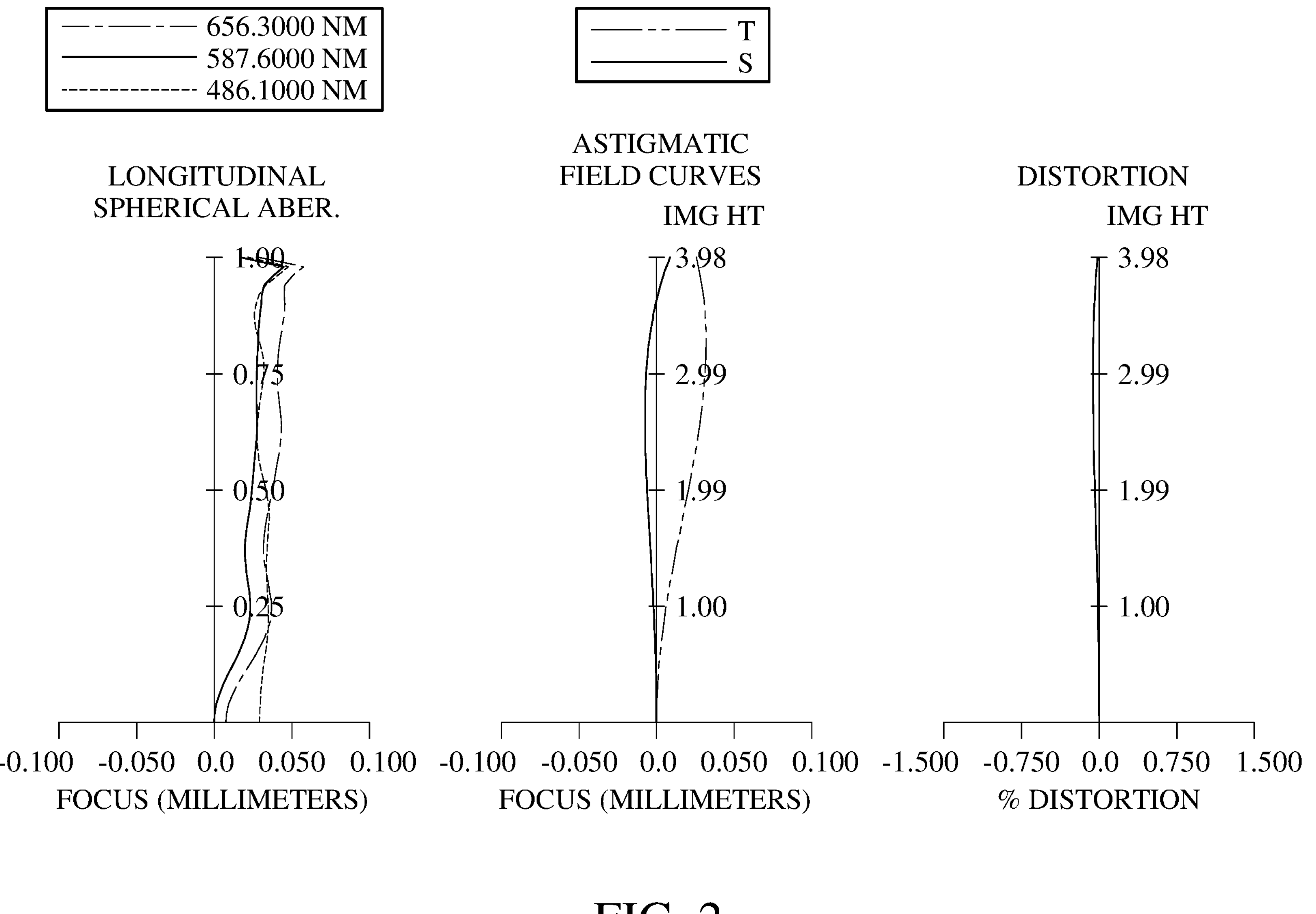
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photographing system lens assembly (its reference numeral is omitted) of the present disclosure and an image sensor IS. The photographing system lens assembly includes, in order from an object side to an image side along an optical axis, a stop S1, a first lens element E1, a second lens element E2, an aperture stop ST, a third lens element E3, a fourth lens element E4, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has two inflection points.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 1.

Figure 3:
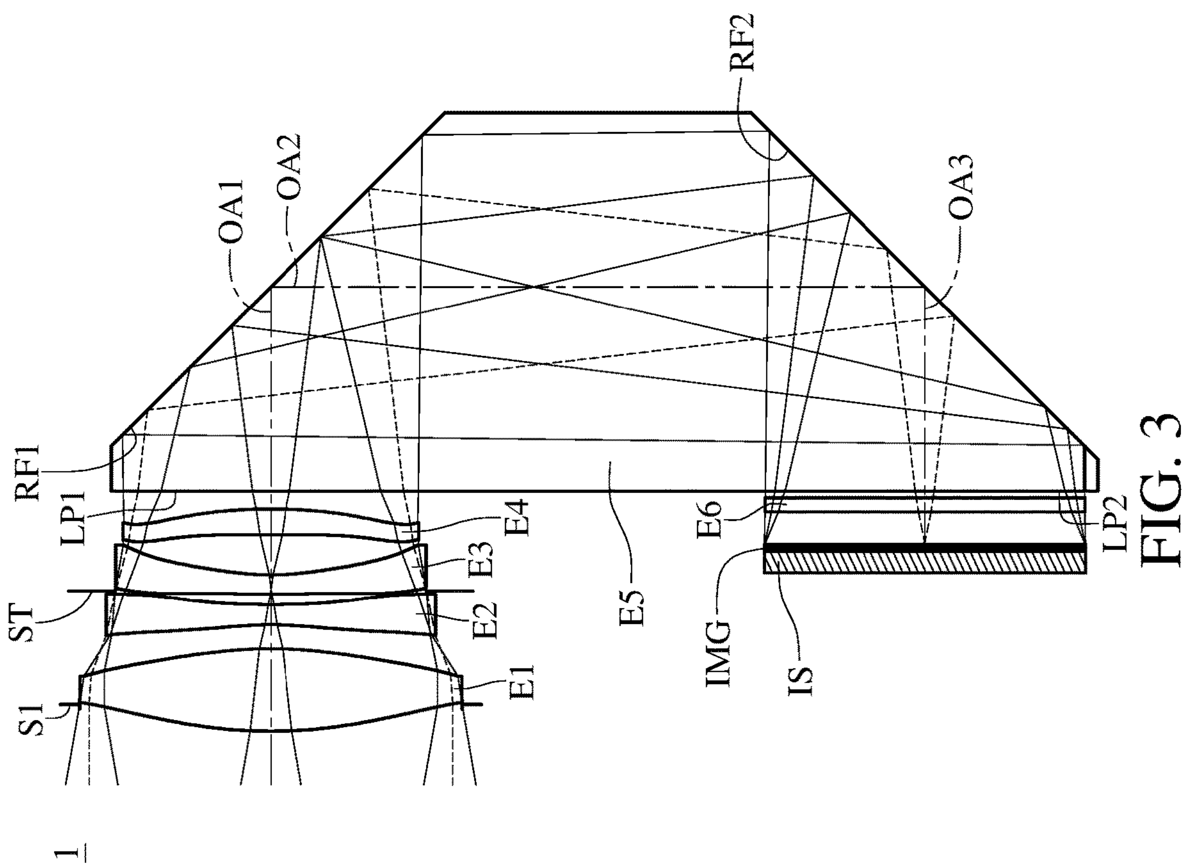
FIG. 3 is a schematic view of a configuration including a reflective element in the photographing system lens assembly of FIG. 1.
Figure 4:
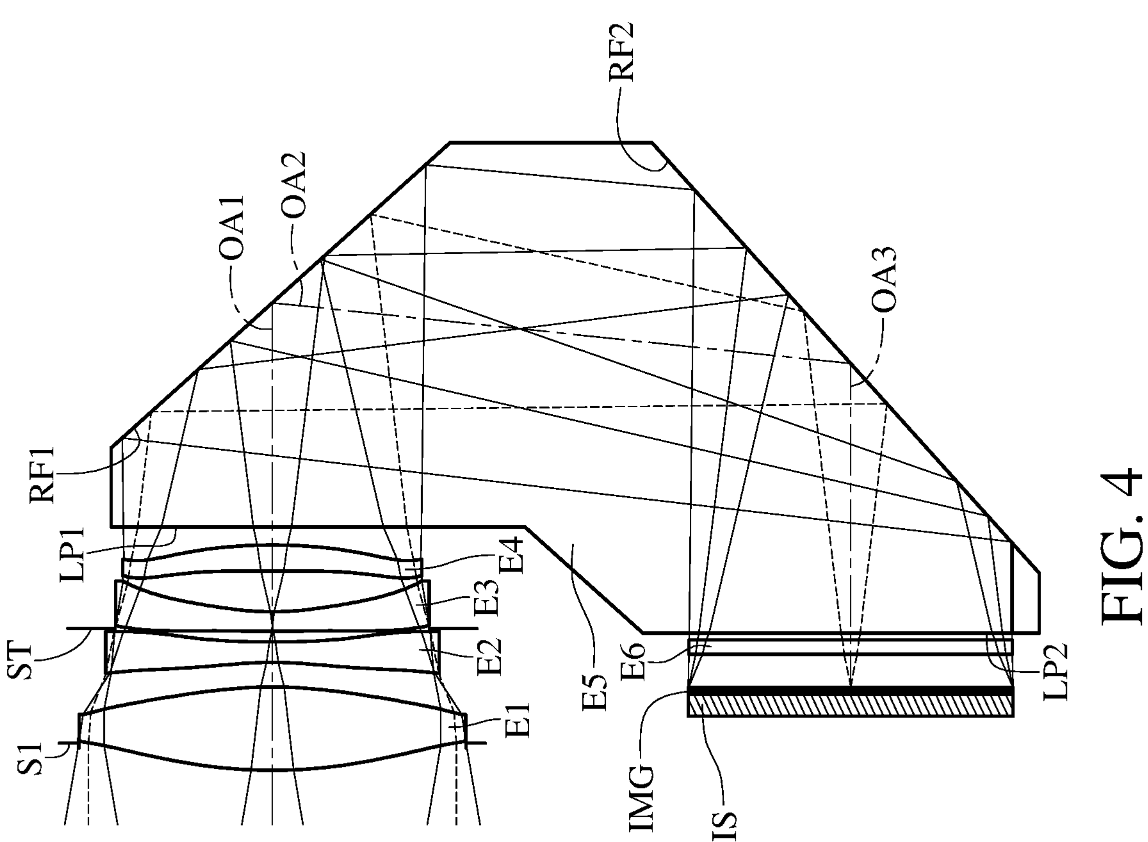
FIG. 4 is a schematic view of a configuration including another reflective element in the photographing system lens assembly of FIG. 1.
Figure 5:
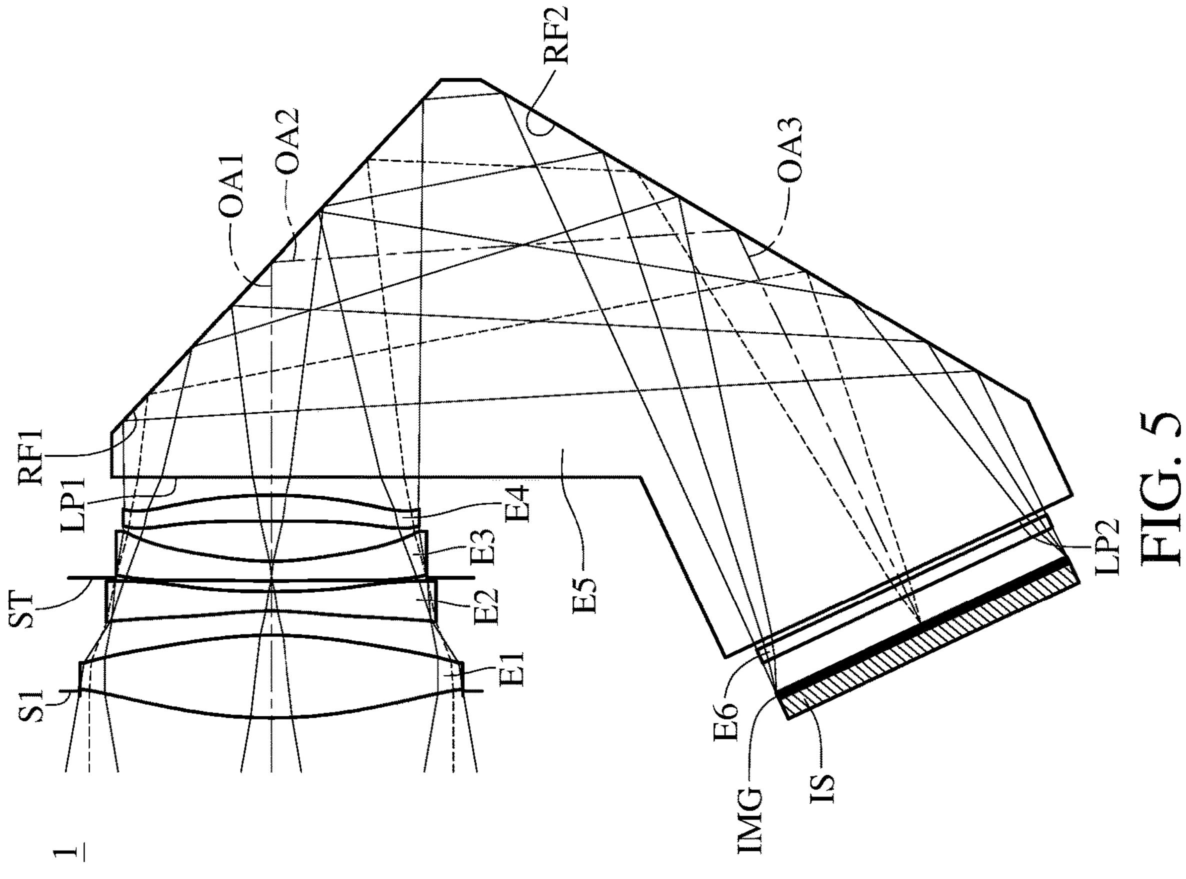
FIG. 5 is a schematic view of a configuration including another reflective element in the photographing system lens assembly of FIG. 1.

FIG. 3 is a schematic view of a configuration including a reflective element in the photographing system lens assembly of FIG. 1, and FIG. 4 to FIG. 9 each is a schematic view of a configuration including another reflective element in the photographing system lens assembly of FIG. 1. In FIG. 3 to FIG. 5, the reflective element E5 has a transmissive surface LP1, two reflective surfaces RF1 and RF2 and a transmissive surface LP2 along the travelling direction of light on the optical path. An optical path can enter the reflective element E5 and reach the reflective surface RF1 along a first optical axis OA1, be deflected off by the reflective surface RF1, reach the reflective surface RF2 along a second optical axis OA2, be deflected off by the reflective surface RF2, and then extend onto the image surface IMG along a third optical axis OA3. In FIG. 3 to FIG. 5, the optical path is deflected two times by the reflective element E5. Moreover, FIG. 3 shows a configuration where the transmissive surfaces LP1 and LP2 are parallel to each other and coplanar, a normal direction of the reflective surface RF1 is at an angle of 45.0 degrees to both the first optical axis OA1 and the second optical axis OA2, and a normal direction of the reflective surface RF2 is at an angle of 45.0 degrees to both the second optical axis OA2 and the third optical axis OA3. FIG. 4 shows a configuration where the transmissive surfaces LP1 and LP2 are parallel to each other and non-coplanar, a normal direction of the reflective surface RF1 is at an angle of 42.0 degrees to both the first optical axis OA1 and the second optical axis OA2, and a normal direction of the reflective surface RF2 is at an angle of 48.0 degrees to both the second optical axis OA2 and the third optical axis OA3. FIG. 5 shows a configuration where the transmissive surfaces LP1 and LP2 are non-parallel to each other and non-coplanar, a normal direction of the reflective surface RF1 is at an angle of 47.0 degrees to both the first optical axis OA1 and the second optical axis OA2, and a normal direction of the reflective surface RF2 is at an angle of 55.6 degrees to both the second optical axis OA2 and the third optical axis OA3.

Figure 6:
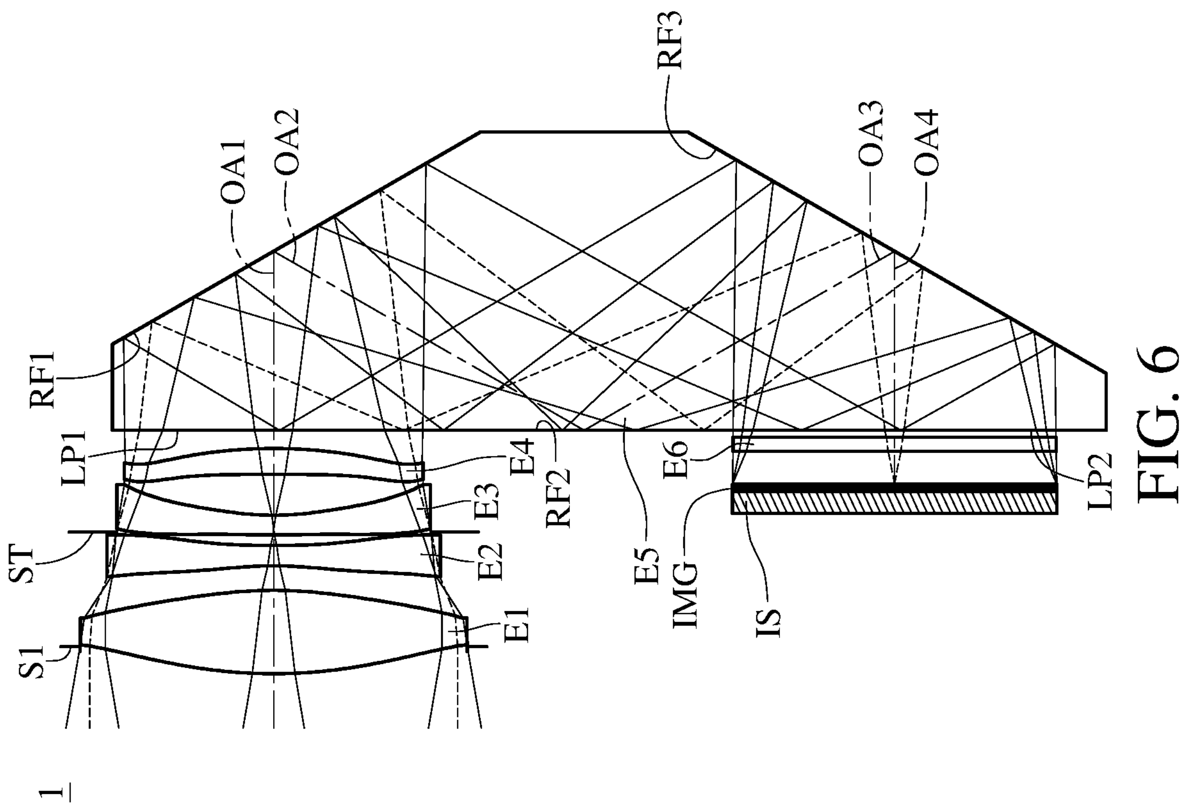
FIG. 6 is a schematic view of a configuration including another reflective element in the photographing system lens assembly of FIG. 1.
Figure 7:
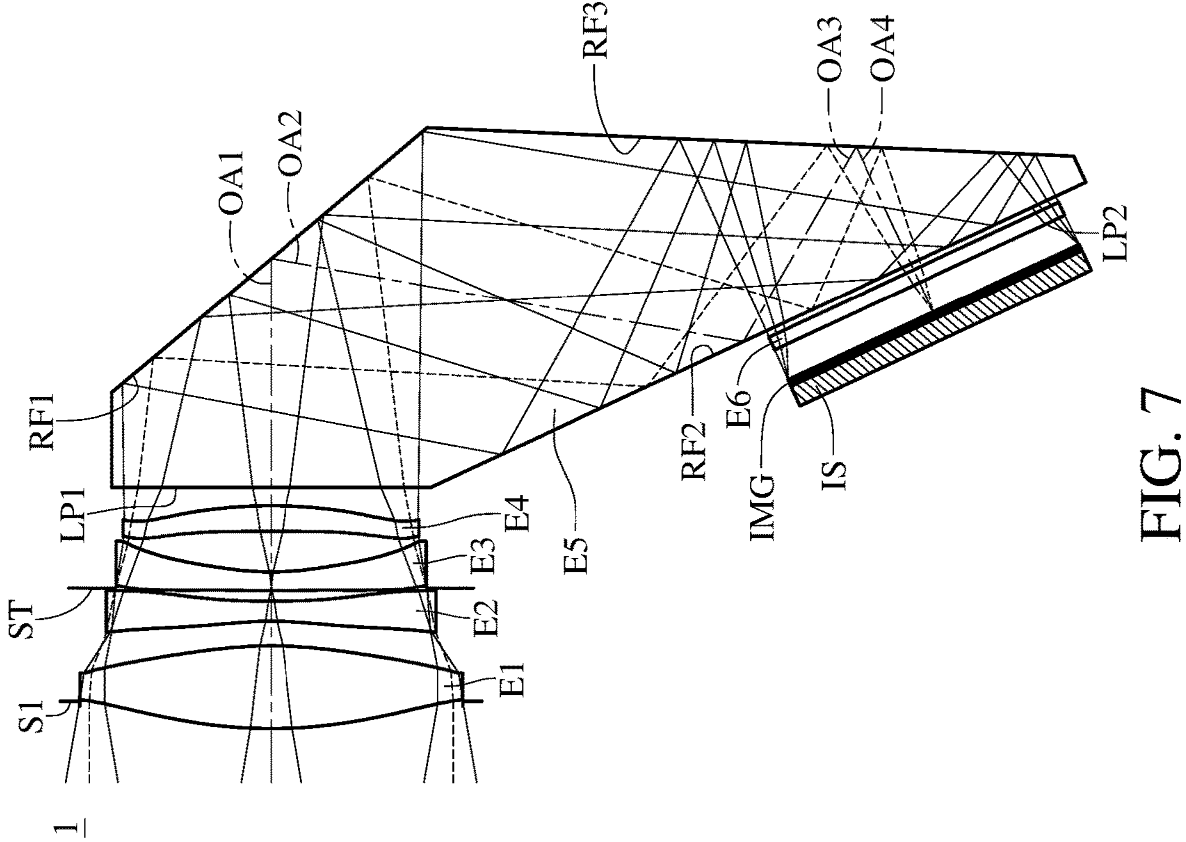
FIG. 7 is a schematic view of a configuration including another reflective element in the photographing system lens assembly of FIG. 1.

In FIG. 6 and FIG. 7, the reflective element E5 has a transmissive surface LP1, three reflective surfaces RF1, RF2 and RF3 and a transmissive surface LP2 along the travelling direction of light on the optical path. An optical path can enter the reflective element E5 and reach the reflective surface RF1 along a first optical axis OA1, be deflected off by the reflective surface RF1, reach the reflective surface RF2 along a second optical axis OA2, be deflected off by the reflective surface RF2, reach the reflective surface RF3 along a third optical axis OA3, be deflected off by the reflective surface RF3, and then extend onto the image surface IMG along a fourth optical axis OA4. In FIG. 6 and FIG. 7, the optical path is deflected three times by the reflective element E5. Moreover, FIG. 6 shows a configuration where the transmissive surfaces LP1 and LP2 are parallel to each other and coplanar, a normal direction of the reflective surface RF1 is at an angle of 30.0 degrees to both the first optical axis OA1 and the second optical axis OA2, a normal direction of the reflective surface RF2 is at an angle of 60.0 degrees to both the second optical axis OA2 and the third optical axis OA3, and a normal direction of the reflective surface RF3 is at an angle of 30.0 degrees to both the third optical axis OA3 and the fourth optical axis OA4. FIG. 7 shows a configuration where the transmissive surfaces LP1 and LP2 are non-parallel to each other and non-coplanar, a normal direction of the reflective surface RF1 is at an angle of 40.0 degrees to both the first optical axis OA1 and the second optical axis OA2, a normal direction of the reflective surface RF2 is at an angle of 55.0 degrees to both the second optical axis OA2 and the third optical axis OA3, and a normal direction of the reflective surface RF3 is at an angle of 27.5 degrees to both the third optical axis OA3 and the fourth optical axis OA4.

Figure 8:
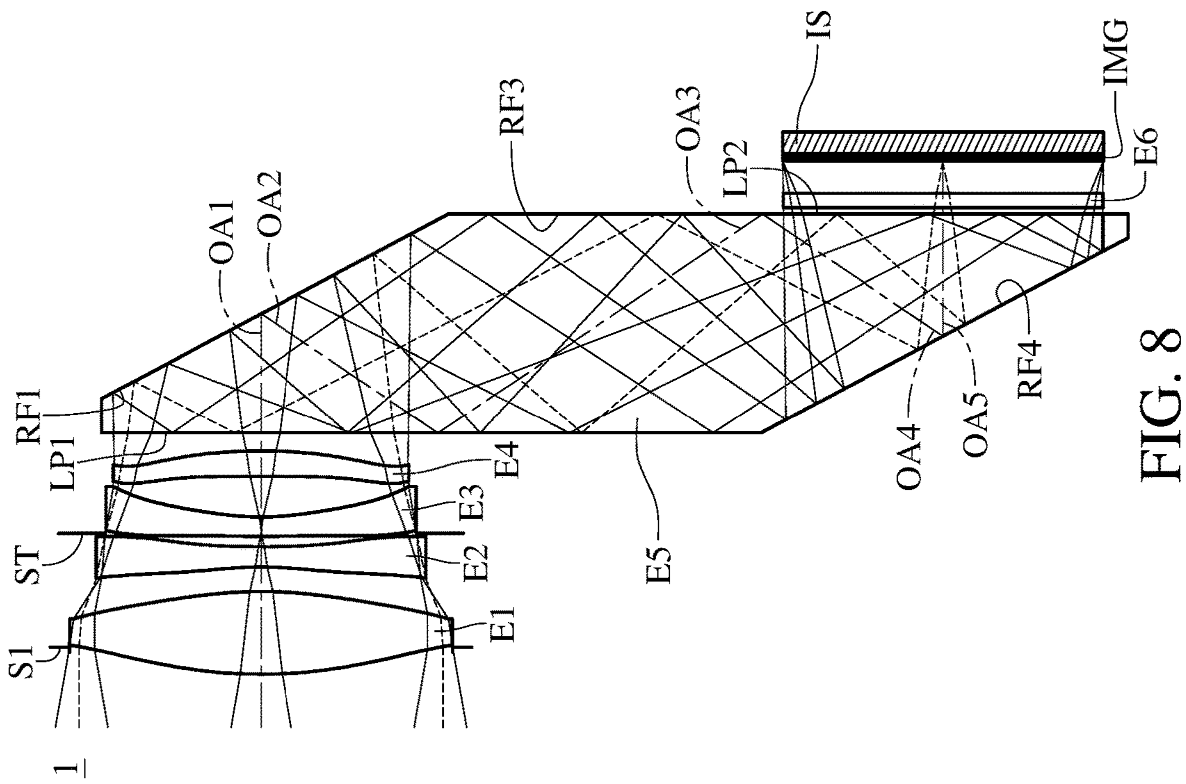
FIG. 8 is a schematic view of a configuration including another reflective element in the photographing system lens assembly of FIG. 1.

In FIG. 8, the reflective element E5 has a transmissive surface LP1, four reflective surfaces RF1, RF2, RF3 and RF4 and a transmissive surface LP2 along the travelling direction of light on the optical path. An optical path can enter the reflective element E5 and reach the reflective surface RF1 along a first optical axis OA1, be deflected off by the reflective surface RF1, reach the reflective surface RF2 along a second optical axis OA2, be deflected off by the reflective surface RF2, reach the reflective surface RF3 along a third optical axis OA3, be deflected off by the reflective surface RF3, reach the reflective surface RF4 along a fourth optical axis OA4, be deflected off by the reflective surface RF4, and then extend onto the image surface IMG along a fifth optical axis OA5. In FIG. 8, the optical path is deflected four times by the reflective element E5. Moreover, a normal direction of the reflective surface RF1 is at an angle of 28.0 degrees to both the first optical axis OA1 and the second optical axis OA2, a normal direction of the reflective surface RF2 is at an angle of 56.0 degrees to both the second optical axis OA2 and the third optical axis OA3, a normal direction of the reflective surface RF3 is at an angle of 56.0 degrees to both the third optical axis OA3 and the fourth optical axis OA4, and a normal direction of the reflective surface RF4 is at an angle of 28.0 degrees to both the fourth optical axis OA4 and the fifth optical axis OA5.

Figure 9:
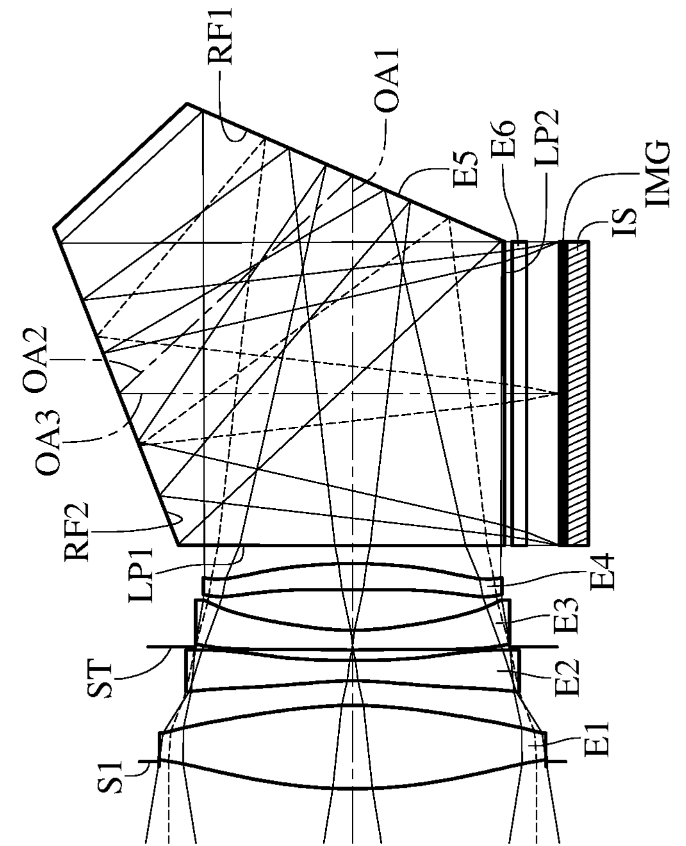
FIG. 9 is a schematic view of a configuration including another reflective element in the photographing system lens assembly of FIG. 1.

In FIG. 9, the reflective element E5 is a pentaprism, and the reflective element E5 has a transmissive surface LP1, two reflective surfaces RF1 and RF2 and a transmissive surface LP2 along the travelling direction of light on the optical path. An optical path can enter the reflective element E5 and reach the reflective surface RF1 along a first optical axis OA1, be deflected off by the reflective surface RF1, reach the reflective surface RF2 along a second optical axis OA2, be deflected off by the reflective surface RF2, and then extend onto the image surface IMG along a third optical axis OA3. In FIG. 9, the optical path is deflected two times by the reflective element E5. Moreover, a normal direction of the reflective surface RF1 is at an angle of 23.5 degrees to both the first optical axis OA1 and the second optical axis OA2, and a normal direction of the reflective surface RF2 is at an angle of 21.5 degrees to both the second optical axis OA2 and the third optical axis OA3.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The equation of the aspheric surface profiles of the aforementioned lens elements of the 1st embodiment is expressed as follows:

$$X(Y) = (Y^2/R)/(1 + sqrt(1 - (1 + k)\times(Y/R)^2)) + \sum_i (Ai)\times(Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, and 24.

In the photographing system lens assembly of the image capturing unit 1 according to the 1st embodiment, when a focal length of the photographing system lens assembly is f, an f-number of the photographing system lens assembly is Fno, and half of a maximum field of view of the photographing system lens assembly is HFOV, these parameters have the following values: f=13.81 millimeters (mm), Fno=2.55, and HFOV=16.0 degrees (deg.).

When an axial distance between the image-side surface of the fourth lens element E4 and the image surface IMG is BL, and an axial distance between the object-side surface of the first lens element E1 and the image-side surface of the fourth lens element E4 is TD, the following condition is satisfied: BL/TD=5.09.

When an axial distance between the object-side surface of the first lens element E1 and the image surface IMG is TL, and the focal length of the photographing system lens assembly is f, the following condition is satisfied: TL/f=1.46.

When a maximum image height of the photographing system lens assembly is ImgH, the following condition is satisfied: ImgH=3.98 mm.

When a focal length of the first lens element E1 is f1, and a composite focal length of the third lens element E3 and the fourth lens element E4 is f34, the following condition is satisfied: $f1/f34=-0.27$.

When a curvature radius of the image-side surface of the first lens element E1 is R2, and the focal length of the first lens element E1 is f1, the following condition is satisfied: $R2/f1=-1.46$.

When the curvature radius of the image-side surface of the first lens element E1 is R2, and an axial distance between the third lens element E3 and the fourth lens element E4 is T34, the following condition is satisfied: $R2/T34=-10.44$. In this embodiment, an axial distance between two adjacent lens elements is a distance in a paraxial region between two adjacent lens surfaces of the two adjacent lens elements.

When an axial distance between the second lens element E2 and the third lens element E3 is T23, and a curvature radius of the image-side surface of the second lens element E2 is R4, the following condition is satisfied: $T23\times100/|R4|=0.51$.

When a central thickness of the first lens element E1 is CT1, and the axial distance between the second lens element E2 and the third lens element E3 is T23, the following condition is satisfied: $CT1/T23=7.97$.

When an axial distance between the first lens element E1 and the second lens element E2 is T12, and the axial distance between the third lens element E3 and the fourth lens element E4 is T34, the following condition is satisfied: $T12/T34=0.60$.

When the axial distance between the object-side surface of the first lens element E1 and the image-side surface of the fourth lens element E4 is TD, and the axial distance between the first lens element E1 and the second lens element E2 is T12, the following condition is satisfied: $TD/T12=9.16$.

When a distance in parallel with the optical axis between a maximum effective radius position of the object-side surface of the first lens element E1 and a maximum effective radius position of the image-side surface of the first lens element E1 is ET1, a distance in parallel with the optical axis between a maximum effective radius position of the object-side surface of the fourth lens element E4 and a maximum effective radius position of the image-side surface of the fourth lens element E4 is ET4, the central thickness of the first lens element E1 is CT1, and a central thickness of the fourth lens element E4 is CT4, the following condition is satisfied: $(ET1+ET4)/(CT1+CT4)=0.40$.

When a distance in parallel with the optical axis between a maximum effective radius position of the image-side surface of the third lens element E3 and the maximum effective radius position of the object-side surface of the fourth lens element E4 is ET34, and the axial distance between the third lens element E3 and the fourth lens element E4 is T34, the following condition is satisfied: $ET34/T34=0.12$.

When a displacement in parallel with the optical axis from an axial vertex of the image-side surface of the first lens element E1 to the maximum effective radius position of the image-side surface of the first lens element E1 is SAG1R2, and the central thickness of the fourth lens element E4 is CT4, the following condition is satisfied: $SAG1R2/CT4=-1.04$. In this embodiment, the direction of SAG1R2 faces towards the object side of the photographing system lens assembly, and the value of SAG1R2 is negative.

When a displacement in parallel with the optical axis from an axial vertex of the object-side surface of the second lens element E2 to a maximum effective radius position of the object-side surface of the second lens element E2 is SAG2R1, a displacement in parallel with the optical axis from an axial vertex of the image-side surface of the third lens element E3 to the maximum effective radius position of the image-side surface of the third lens element E3 is SAG3R2, a central thickness of the second lens element E2 is CT2, and a central thickness of the third lens element E3 is CT3, the following condition is satisfied: $(|SAG2R1|+|SAG3R2|)/(CT2+CT3)=1.07$. In this embodiment, the direction of SAG2R1 faces towards the object side of the photographing system lens assembly, and the value of SAG2R1 is negative. The direction of SAG3R2 faces towards the image side of the photographing system lens assembly, and the value of SAG3R2 is positive.

When a curvature radius of the object-side surface of the second lens element E2 is R3, and the curvature radius of the image-side surface of the second lens element E2 is R4, the following condition is satisfied: $(R3+R4)/(R3-R4)=-0.71$.

When a curvature radius of the object-side surface of the third lens element E3 is R5, and a curvature radius of the image-side surface of the third lens element E3 is R6, the following condition is satisfied: $(R5+R6)/(R5-R6)=1.50$.

When a curvature radius of the object-side surface of the fourth lens element E4 is R7, and a curvature radius of the image-side surface of the fourth lens element E4 is R8, the following condition is satisfied: $(R7+R8)/(R7-R8)=0.93$.

When the curvature radius of the object-side surface of the third lens element E3 is R5, and the curvature radius of the image-side surface of the third lens element E3 is R6, the following condition is satisfied: $|R5/R6|=4.97$.

When a maximum effective radius of the object-side surface of the first lens element E1 is Y1R1, and a maximum effective radius of the image-side surface of the fourth lens element E4 is Y4R2, the following condition is satisfied: Y1R1N4R2=1.26.

When the maximum effective radius of the object-side surface of the first lens element E1 is Y1R1, and the maximum image height of the photographing system lens assembly is ImgH, the following condition is satisfied: $Y1R1/ImgH=0.71$.

When a chief ray angle of the maximum field of view on the image surface IMG of the photographing system lens assembly is CRA_D, the following condition is satisfied: CRA_D=19.9 degrees.

When a minimum value among Abbe numbers of all lens elements of the photographing system lens assembly is Vmin, the following condition is satisfied: $Vmin=19.5$. In this embodiment, among the first lens element E1 to the fourth lens element E4, an Abbe number of the third lens element E3 is smaller than Abbe numbers of the other lens elements, and Vmin is equal to the be number of the third lens element E3.

When an Abbe number of the first lens element E1 is V1, an Abbe number of the second lens element E2 is V2, the Abbe number of the third lens element E3 is V3, an Abbe number of the fourth lens element E4 is V4, an Abbe number of the i-th lens element is Vi, a refractive index of the first lens element E1 is N1, a refractive index of the second lens element E2 is N2, a refractive index of the third lens element E3 is N3, a refractive index of the fourth lens element E4 is N4, a refractive index of the i-th lens element is Ni, and a minimum value of Vi/Ni is (Vi/Ni)min, the following condition is satisfied: $(Vi/Ni)min=11.68$, wherein i=1, 2, 3 or 4. In this embodiment, among the first lens element E1 to the fourth lens element E4, a ratio (V3/N3) of Abbe number to refractive index of the third lens element E3 is smaller than those of the other lens elements in the photographing system lens assembly, and (Vi/Ni)min is equal to the ratio of Abbe number to refractive index of the third lens element E3.

When the Abbe number of the third lens element E3 is V3, and the Abbe number of the fourth lens element E4 is V4, the following condition is satisfied: $V4/V3=2.87$.

When the refractive index of the fourth lens element E4 is N4, the following condition is satisfied: $N4=1.534$.

The detailed optical data of the 1st embodiment are shown in Table 1A and the aspheric surface data are shown in Table 1B below.

TABLE 1A

| 1st Embodiment<br>f = 13.81 mm, Fno = 2.55, HFOV = 16.0 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Stop | Plano | | −0.400 | | | | |
| 2 | Lens 1 | 7.0103 | (ASP) | 1.228 | Glass | 1.806 | 40.7 | 4.28 |
| 3 | | −6.2637 | (ASP) | 0.362 | | | | |
| 4 | Lens 2 | −4.9935 | (ASP) | 0.300 | Plastic | 1.544 | 56.0 | −7.84 |
| 5 | | 29.9160 | (ASP) | 0.199 | | | | |
| 6 | Ape. Stop | Plano | | −0.045 | | | | |
| 7 | Lens 3 | 18.6735 | (ASP) | 0.290 | Plastic | 1.669 | 19.5 | −7.09 |
| 8 | | 3.7598 | (ASP) | 0.600 | | | | |
| 9 | Lens 4 | 204.6246 | (ASP) | 0.383 | Plastic | 1.534 | 56.0 | 14.29 |
| 10 | | −7.9276 | (ASP) | 0.268 | | | | |
| 11 | Prism | Plano | | 15.832 | Glass | 1.697 | 55.5 | — |
| 12 | | Plano | | 0.100 | | | | |
| 13 | Filter | Plano | | 0.210 | Glass | 1.517 | 64.2 | — |
| 14 | | Plano | | 0.485 | | | | |
| 15 | Image | Plano | | — | | | | |

Note:
Reference wavelength is 587.6 nm (d-line).
An effective radius of the stop S1 (Surface 1) is 2.850 mm.

TABLE 1B

| Aspheric Coefficients | | | | |
|---|---|---|---|---|
| Surface # | 2 | 3 | 4 | 5 |
| k= | −4.35589E+00 | −3.68744E−02 | −3.56796E+01 | 8.13082E+01 |
| A4= | −2.6524050E−04 | 9.9293651E−03 | 2.9750659E−02 | 7.2630774E−02 |
| A6= | 1.6113259E−05 | −1.4028009E−03 | −2.9030899E−02 | −1.0780374E−01 |
| A8= | −9.5950369E−05 | 7.8049987E−05 | 2.6429145E−02 | 1.0515097E−01 |
| A10= | 3.2308574E−05 | 4.3483635E−05 | −1.6840590E−02 | −6.6108788E−02 |
| A12= | −4.7244191E−06 | −1.7368608E−05 | 7.2183118E−03 | 2.7538506E−02 |
| A14= | 1.3495235E−07 | 3.0042081E−06 | −2.1188860E−03 | −7.9470025E−03 |
| A16= | 3.4038227E−08 | −2.7792819E−07 | 4.2710083E−04 | 1.6300342E−03 |
| A18= | −3.2133944E−09 | 1.3394433E−08 | −5.8015729E−05 | −2.3674892E−04 |
| A20= | 7.1134565E−11 | −2.7121642E−10 | 5.0648713E−06 | 2.3300619E−05 |
| A22= | — | — | −2.5620993E−07 | −1.3920114E−06 |
| A24= | — | — | 5.6995751E−09 | 3.7888844E−08 |
| Surface # | 7 | 8 | 9 | 10 |
| k= | 2.83431E+01 | −4.74840E+00 | 9.69125E+01 | 2.38362E+00 |
| A4= | −6.2932714E−03 | −3.1388162E−02 | −1.4161964E−02 | −1.7417218E−03 |
| A6= | −5.7794766E−02 | −1.0020397E−02 | −4.1837686E−03 | −4.3471931E−03 |
| A8= | 9.0710202E−02 | 4.3223590E−02 | 6.3650063E−03 | 5.9006929E−03 |
| A10= | −7.0315991E−02 | −4.3415959E−02 | −3.9978395E−03 | −4.2588406E−03 |
| A12= | 3.4407192E−02 | 2.5690503E−02 | 1.5092315E−03 | 1.9948431E−03 |
| A14= | −1.1471479E−02 | −1.0146111E−02 | −3.2014462E−04 | −5.7939437E−04 |
| A16= | 2.6719196E−03 | 2.7772316E−03 | 3.3257042E−05 | 1.0186401E−04 |
| A18= | −4.3068284E−04 | −5.2545597E−04 | −5.6779975E−07 | −9.7918281E−06 |
| A20= | 4.5865999E−05 | 6.5817040E−05 | −1.1608561E−07 | 3.8700799E−07 |
| A22= | −2.8991875E−06 | −4.9001736E−06 | — | — |
| A24= | 8.2144899E−08 | 1.6316551E−07 | — | — |

In Table 1A, the curvature radius, the thickness and the focal length are shown in millimeters (mm). Surface numbers 0-15 represent the surfaces sequentially arranged from the object side to the image side along the optical axis. In Table 1B, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 10:
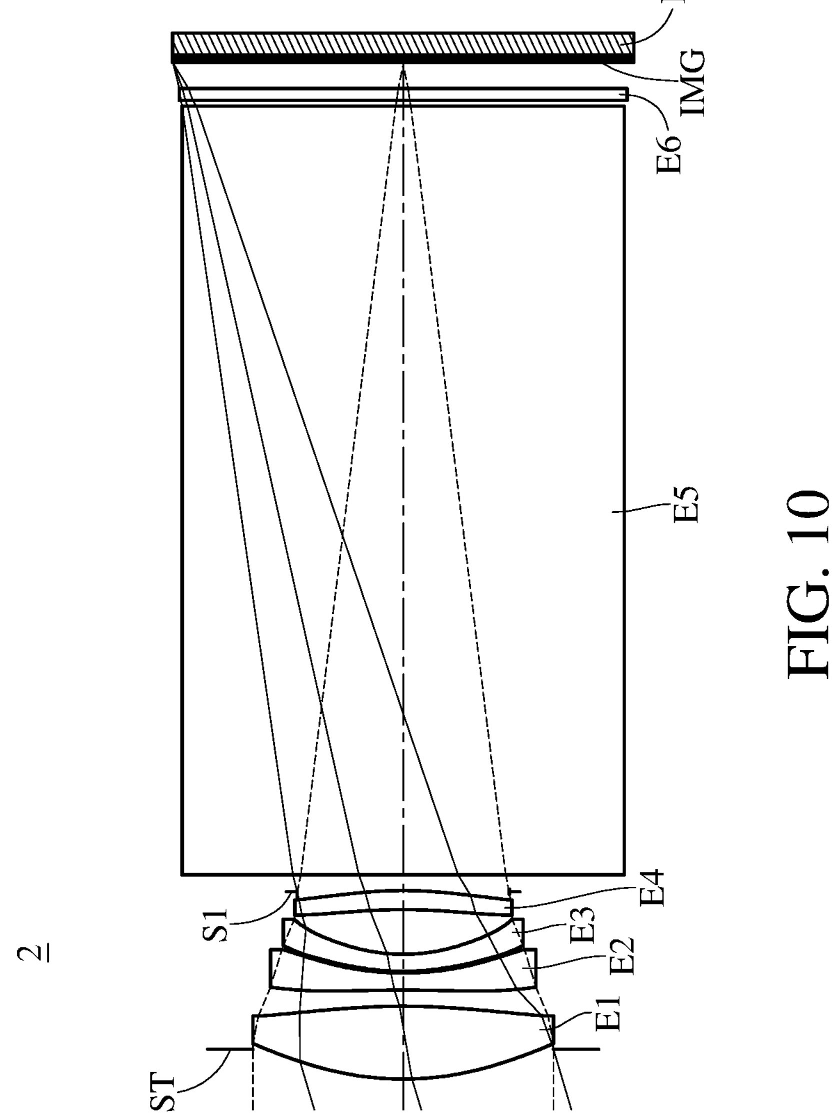
FIG. 10 is a schematic view of an image capturing unit according to the 2nd embodiment of the present disclosure.
Figure 11:
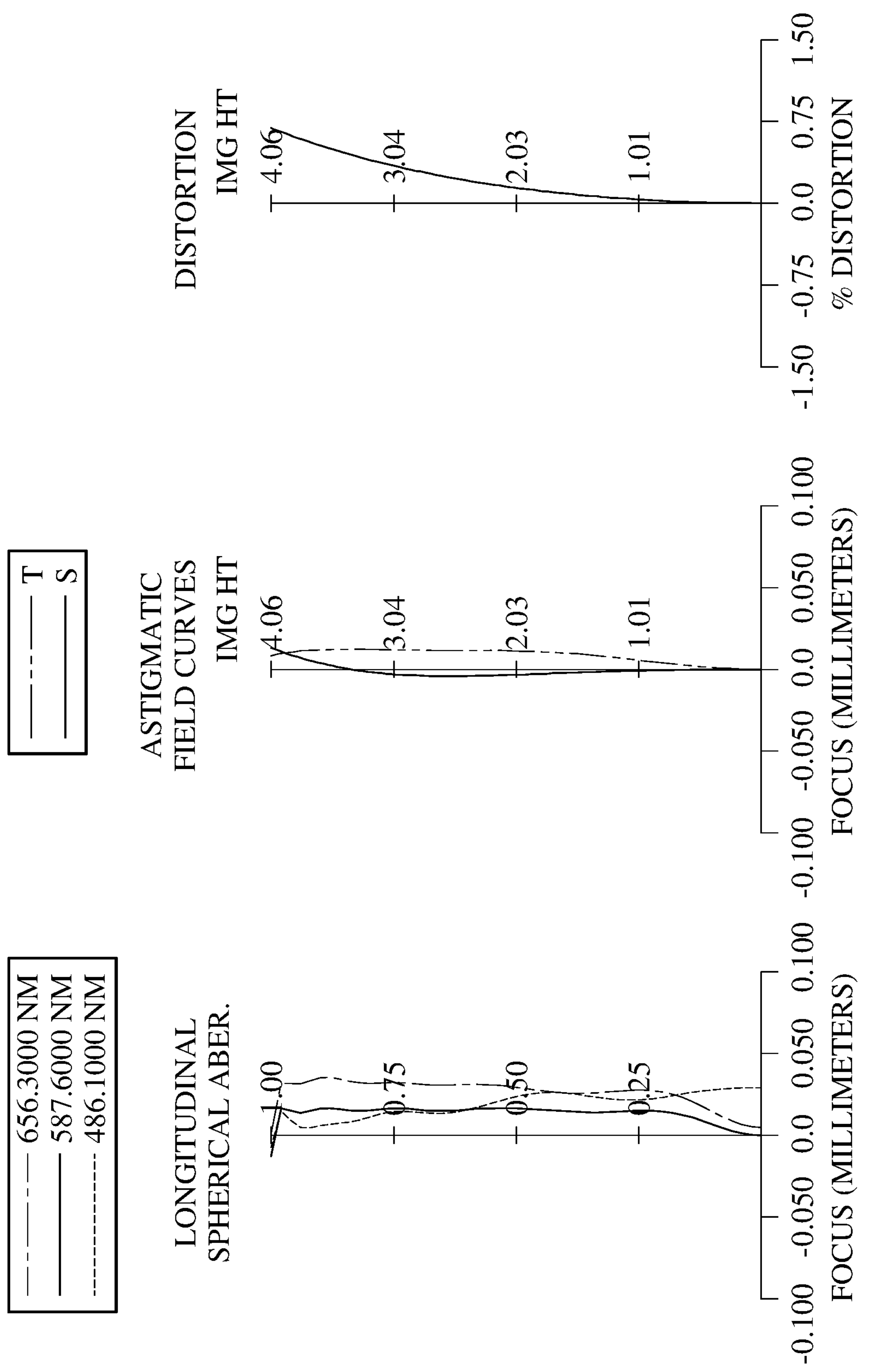
FIG. 11 shows spherical aberration curves, astigmatic field curves and a distortion curve of the image capturing unit according to the 2nd embodiment.

FIG. 10 is a schematic view of an image capturing unit according to the 2nd embodiment of the present disclosure. FIG. 11 shows, in order from left to right, spherical aberration curves, astigmatic field curves and a distortion curve of the image capturing unit according to the 2nd embodiment. In FIG. 10, the image capturing unit 2 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The image-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 10. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 2nd embodiment are shown in Table 2A and the aspheric surface data are shown in Table 2B below.

TABLE 2A

| 2nd Embodiment<br>f = 13.49 mm, Fno = 2.55, HFOV = 16.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.527 | | | | |
| 2 | Lens 1 | 5.2683 | (ASP) | 1.284 | Glass | 1.806 | 40.7 | 4.57 |
| 3 | | −10.8850 | (ASP) | 0.284 | | | | |
| 4 | Lens 2 | −16.4537 | (ASP) | 0.300 | Plastic | 1.587 | 28.3 | −7.28 |
| 5 | | 5.8103 | (ASP) | 0.030 | | | | |
| 6 | Lens 3 | 4.5998 | (ASP) | 0.300 | Plastic | 1.669 | 19.5 | −14.86 |
| 7 | | 3.0624 | (ASP) | 0.786 | | | | |
| 8 | Lens 4 | −10.2918 | (ASP) | 0.336 | Plastic | 1.544 | 56.0 | 47.82 |
| 9 | | −7.4591 | (ASP) | −0.020 | | | | |
| 10 | Stop | Plano | | 0.300 | | | | |
| 11 | Prism | Plano | | 13.540 | Glass | 1.603 | 60.6 | — |
| 12 | | Plano | | 0.100 | | | | |
| 13 | Filter | Plano | | 0.210 | Glass | 1.517 | 64.2 | — |
| 14 | | Plano | | 0.462 | | | | |
| 15 | Image | Plano | | — | | | | |

Note:
Reference wavelength is 587.6 nm (d-line).
An effective radius of the stop S1 (Surface 10) is 1.870 mm.

TABLE 2B

| Aspheric Coefficients | | | | |
|---|---|---|---|---|
| Surface # | 2 | 3 | 4 | 5 |
| k= | −1.94901E+00 | 3.64126E+00 | −8.50808E+01 | 0.00000E+00 |
| A4= | 1.0000037E−03 | 1.0359189E−02 | 3.4756916E−02 | 8.3761026E−02 |
| A6= | −5.2683894E−05 | −4.7317847E−03 | −4.0860619E−02 | −1.8862353E−01 |
| A8= | −5.3585380E−05 | 1.6470842E−03 | 2.9411527E−02 | 2.0554632E−01 |
| A10= | −2.1599944E−06 | −3.4816739E−04 | −1.2969369E−02 | −1.2793526E−01 |
| A12= | 4.0524932E−06 | 4.4519129E−05 | 3.7735439E−03 | 4.8674384E−02 |
| A14= | −6.8314988E−07 | −3.2751717E−06 | −7.3361875E−04 | −1.1432186E−02 |
| A16= | 3.7725917E−08 | 1.1216001E−07 | 9.1251133E−05 | 1.5656690E−03 |
| A18= | — | — | −6.5091117E−06 | −1.0002720E−04 |
| A20= | — | — | 2.0094446E−07 | −4.7650004E−07 |
| A22= | — | — | — | 2.8310346E−07 |

TABLE 2B-continued

| Aspheric Coefficients | | | | |
|---|---|---|---|---|
| Surface # | 6 | 7 | 8 | 9 |
| k= | 0.00000E+00 | −8.50910E−01 | −9.84510E+01 | −1.46970E+01 |
| A4= | 4.4169779E−02 | −7.3846313E−03 | −5.9581728E−03 | 1.6529366E−03 |
| A6= | −1.4138589E−01 | −1.1731983E−02 | 2.2104767E−03 | −2.0878077E−03 |
| A8= | 1.7699427E−01 | 3.2125449E−02 | 4.2841271E−03 | 5.9154850E−03 |
| A10= | −1.2216928E−01 | −3.2426262E−02 | −5.2519118E−03 | −6.0573100E−03 |
| A12= | 5.0635179E−02 | 1.7525979E−02 | 2.8475004E−03 | 3.5549038E−03 |
| A14= | −1.2967731E−02 | −5.5893087E−03 | −8.6491068E−04 | −1.2743196E−03 |
| A16= | 2.0180446E−03 | 1.0747945E−03 | 1.4849990E−04 | 2.7556887E−04 |
| A18= | −1.7525787E−04 | −1.1618442E−04 | −1.2410187E−05 | −3.3043465E−05 |
| A20= | 6.5099320E−06 | 5.4213406E−06 | 2.6307596E−07 | 1.6631930E−06 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Conditional Expressions | | | |
|---|---|---|---|
| f [mm] | 13.49 | ET34/T34 | 0.09 |
| Fno | 2.55 | SAG1R2/CT4 | −0.51 |
| HFOV [deg.] | 16.6 | (\|SAG2R1\| + \|SAG3R2\|)/(CT2 + CT3) | 1.12 |
| BL/TD | 4.40 | (R3 + R4)/(R3 − R4) | 0.48 |
| TL/f | 1.33 | (R5 + R6)/(R5 − R6) | 4.98 |
| ImgH [mm] | 4.06 | (R7 + R8)/(R7 − R8) | 6.27 |
| f1/f34 | −0.20 | \|R5/R6\| | 1.50 |
| R2/f1 | −2.38 | Y1R1/Y4R2 | 1.40 |
| R2/T34 | −13.85 | Y1R1/ImgH | 0.65 |
| T23 × 100/\|R4\| | 0.52 | CRA_D [deg.] | 20.4 |
| CT1/T23 | 42.80 | Vmin | 19.5 |
| T12/T34 | 0.36 | (Vi/Ni)min | 11.68 |
| TD/T12 | 11.69 | V4/V3 | 2.87 |
| (ET1 + ET4)/(CT1 + CT4) | 0.46 | N4 | 1.544 |

3rd Embodiment

Figure 12:
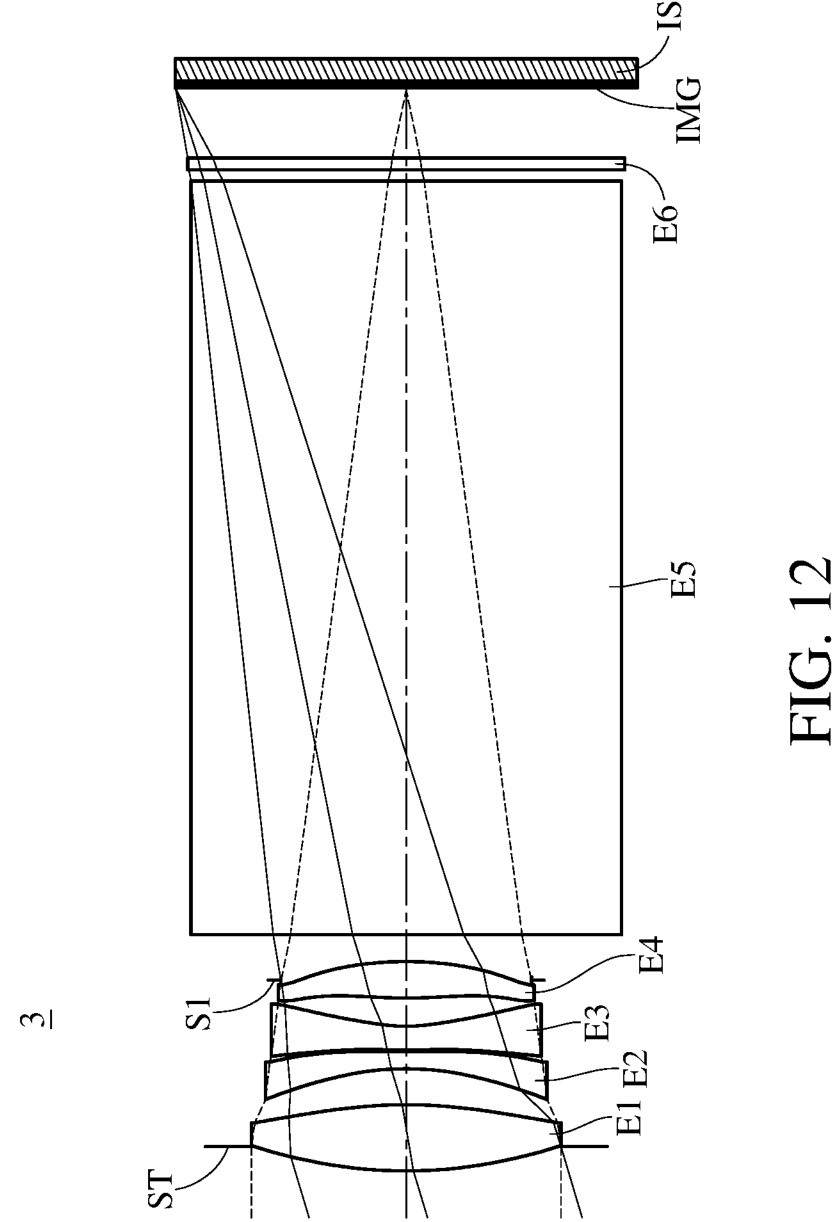
FIG. 12 is a schematic view of an image capturing unit according to the 3rd embodiment of the present disclosure.
Figure 13:
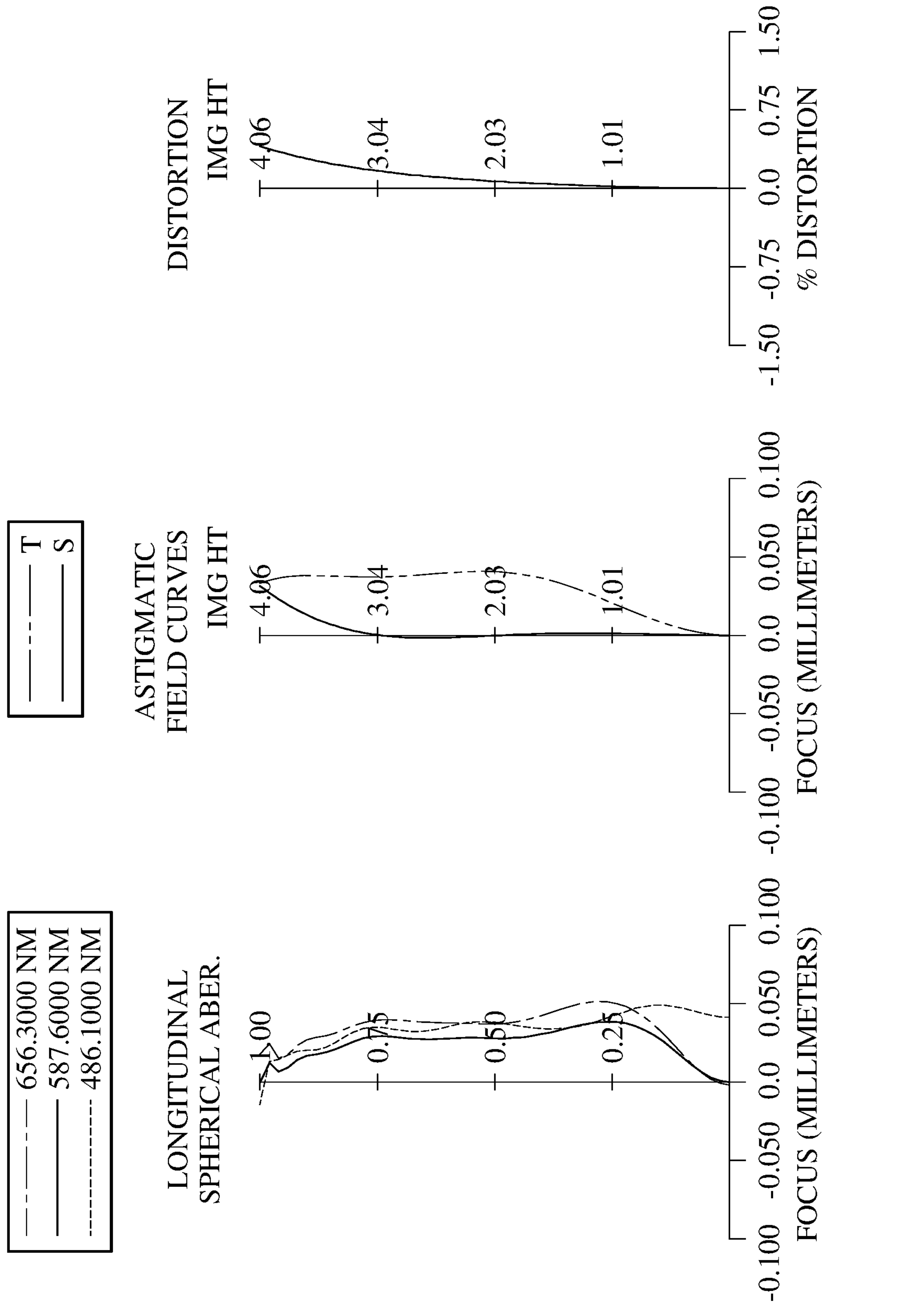
FIG. 13 shows spherical aberration curves, astigmatic field curves and a distortion curve of the image capturing unit according to the 3rd embodiment.

FIG. 12 is a schematic view of an image capturing unit according to the 3rd embodiment of the present disclosure. FIG. 13 shows, in order from left to right, spherical aberration curves, astigmatic field curves and a distortion curve of the image capturing unit according to the 3rd embodiment. In FIG. 12, the image capturing unit 3 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point. The image-side surface of the first lens element E1 has two inflection points.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has two inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 12. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 3rd embodiment are shown in Table 3A and the aspheric surface data are shown in Table 3B below.

TABLE 3A

| 3rd Embodiment<br>f = 13.49 mm, Fno = 2.48, HFOV = 16.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.430 | | | | |
| 2 | Lens 1 | 7.8861 | (ASP) | 1.166 | Glass | 1.806 | 40.7 | 5.45 |
| 3 | | −9.2633 | (ASP) | 0.632 | | | | |
| 4 | Lens 2 | −6.8379 | (ASP) | 0.300 | Plastic | 1.544 | 56.0 | −9.49 |
| 5 | | 21.3657 | (ASP) | 0.034 | | | | |
| 6 | Lens 3 | 15.8240 | (ASP) | 0.418 | Plastic | 1.639 | 23.5 | −5.33 |
| 7 | | 2.7707 | (ASP) | 0.496 | | | | |
| 8 | Lens 4 | 7.7072 | (ASP) | 0.643 | Plastic | 1.534 | 56.0 | 6.66 |
| 9 | | −6.4130 | (ASP) | −0.327 | | | | |
| 10 | Stop | Plano | | 0.800 | | | | |
| 11 | Prism | Plano | | 13.280 | Glass | 1.569 | 56.1 | — |
| 12 | | Plano | | 0.200 | | | | |
| 13 | Filter | Plano | | 0.210 | Glass | 1.517 | 64.2 | — |
| 14 | | Plano | | 1.233 | | | | |
| 15 | Image | Plano | | — | | | | |

Note:
Reference wavelength is 587.6 nm (d-line).
An effective radius of the stop S1 (Surface 10) is 2.209 mm.

TABLE 3B

| Aspheric Coefficients | | | | |
|---|---|---|---|---|
| Surface # | 2 | 3 | 4 | 5 |
| k= | −1.66386E+00 | 5.72770E+00 | 1.28251E−02 | −6.91815E+01 |
| A4= | −1.0315213E−03 | −3.4007262E−03 | −5.6507347E−02 | −1.3774657E−02 |
| A6= | 1.8890023E−04 | 4.0239330E−03 | 5.7706585E−02 | −2.5804281E−02 |
| A8= | 2.0831895E−05 | −1.2768161E−03 | −3.2225162E−02 | 3.1587667E−02 |
| A10= | −1.8061725E−05 | 2.3216628E−04 | 1.1369306E−02 | −1.6643073E−02 |
| A12= | 3.0749367E−06 | −2.4094318E−05 | −2.6380847E−03 | 4.8979812E−03 |
| A14= | −1.6706092E−07 | 1.3624971E−06 | 4.0470451E−04 | −8.4760479E−04 |
| A16= | 2.0288735E−10 | −3.4370831E−08 | −3.9819732E−05 | 8.4167425E−05 |
| A18= | — | — | 2.2897638E−06 | −4.2966727E−06 |
| A20= | — | — | −5.8706468E−08 | 8.1562235E−08 |
| Surface # | 6 | 7 | 8 | 9 |
| k= | 0.00000E+00 | −8.01088E+00 | −4.42275E+01 | 5.28709E+00 |
| A4= | −2.5088066E−02 | −5.5987107E−02 | −2.2277829E−02 | 5.0164247E−04 |
| A6= | −2.7548622E−02 | 4.0657248E−02 | 1.1776364E−04 | −3.6035700E−03 |
| A8= | 3.6207813E−02 | −1.9326595E−02 | 5.5423071E−03 | 4.4660210E−03 |
| A10= | −1.7940576E−02 | 7.7105789E−03 | −4.4491114E−03 | −2.9027464E−03 |
| A12= | 4.7782948E−03 | −2.5678979E−03 | 1.8806442E−03 | 1.1442227E−03 |
| A14= | −7.1261721E−04 | 6.2373890E−04 | −4.9070297E−04 | −2.7990283E−04 |
| A16= | 5.4338754E−05 | −9.8212084E−05 | 7.8925301E−05 | 4.1749680E−05 |
| A18= | −1.3685934E−06 | 8.8410538E−06 | −6.9755280E−06 | −3.3594421E−06 |
| A20= | −2.9767537E−08 | −3.4425171E−07 | 2.5394317E−07 | 1.0983395E−07 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 13.49 | ET34/T34 | 0.14 |
| Fno | 2.48 | SAG1R2/CT4 | −0.49 |
| HFOV [deg.] | 16.6 | (\|SAG2R1\| + \|SAG3R2\|)/(CT2 + CT3) | 1.29 |

TABLE 3C-continued

| Values of Conditional Expressions | | | |
|---|---|---|---|
| BL/TD | 4.17 | (R3 + R4)/(R3 − R4) | −0.52 |
| TL/f | 1.41 | (R5 + R6)/(R5 − R6) | 1.42 |
| ImgH [mm] | 4.06 | (R7 + R8)/(R7 − R8) | 0.09 |
| f1/f34 | −0.10 | \|R5/R6\| | 5.71 |
| R2/f1 | −1.70 | Y1R1/Y4R2 | 1.23 |
| R2/T34 | −18.68 | Y1R1/ImgH | 0.67 |
| T23 × 100/\|R4\| | 0.16 | CRA_D [deg.] | 17.6 |
| CT1/T23 | 34.29 | Vmin | 23.5 |
| T12/T34 | 1.27 | (Vi/Ni)min | 14.34 |
| TD/T12 | 5.84 | V4/V3 | 2.38 |
| (ET1 + ET4)/(CT1 + CT4) | 0.37 | N4 | 1.534 |

4th Embodiment

Figure 14:
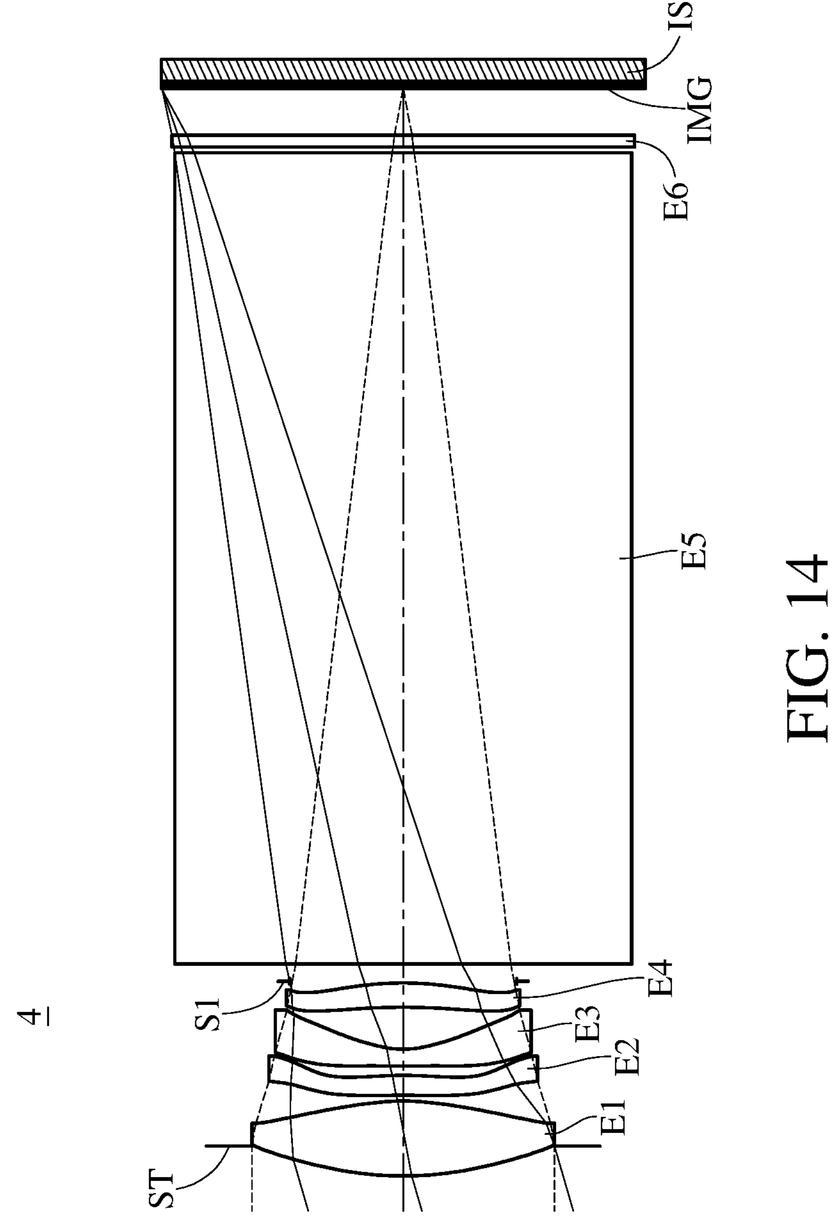
FIG. 14 is a schematic view of an image capturing unit according to the 4th embodiment of the present disclosure.
Figure 15:
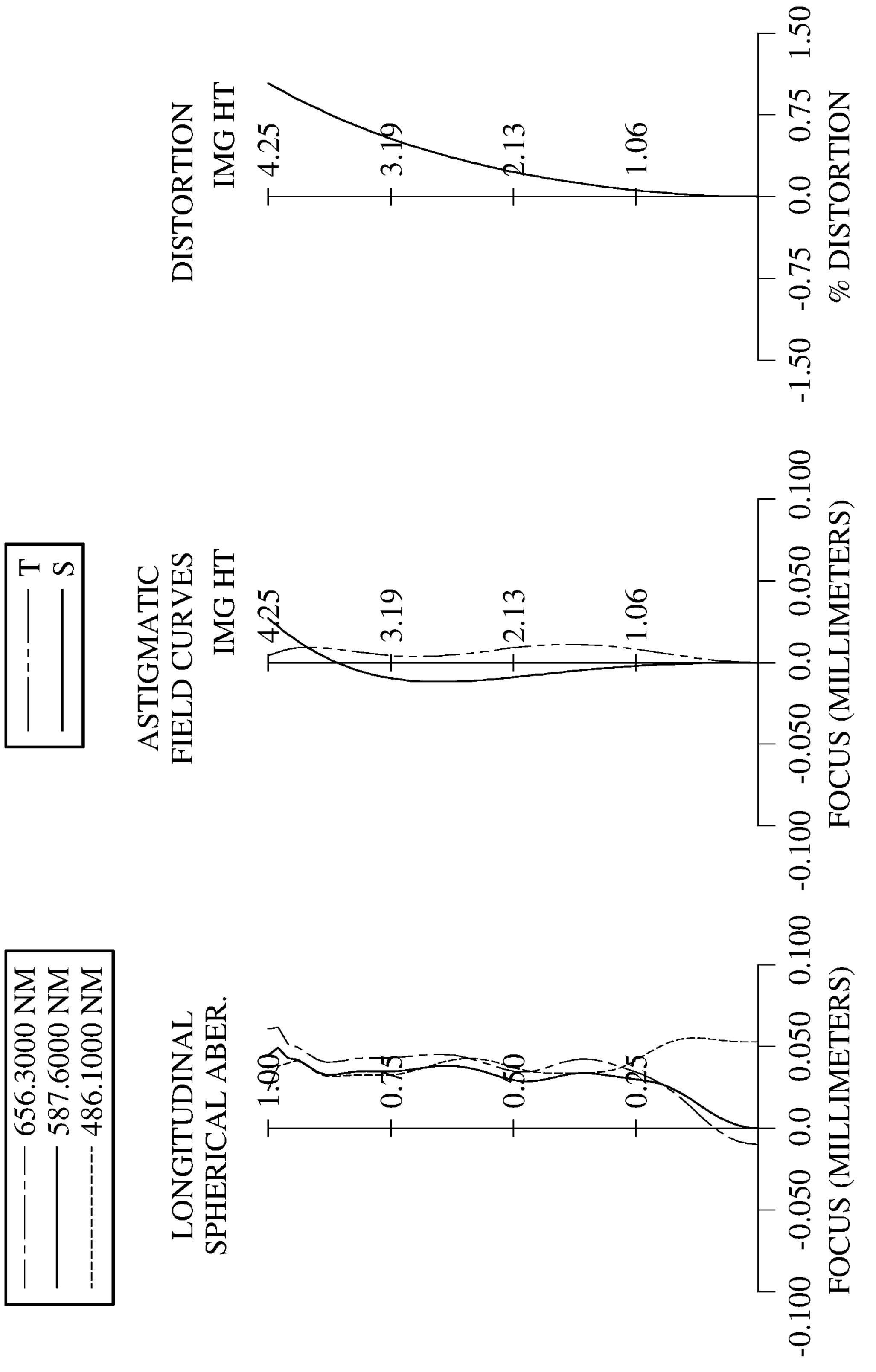
FIG. 15 shows spherical aberration curves, astigmatic field curves and a distortion curve of the image capturing unit according to the 4th embodiment.

FIG. 14 is a schematic view of an image capturing unit according to the 4th embodiment of the present disclosure. FIG. 15 shows, in order from left to right, spherical aberration curves, astigmatic field curves and a distortion curve of the image capturing unit according to the 4th embodiment. In FIG. 14, the image capturing unit 4 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has one inflection point.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has three inflection points. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has three inflection points.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The reflective element E5 is made of plastic material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 14. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 4th embodiment are shown in Table 4A and the aspheric surface data are shown in Table 4B below.

TABLE 4A

| 4th Embodiment<br>f = 14.58 mm, Fno = 2.73, HFOV = 16.0 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.524 | | | | |
| 2 | Lens 1 | 5.9392 | (ASP) | 1.321 | Plastic | 1.562 | 44.6 | 4.28 |
| 3 | | −3.7233 | (ASP) | 0.100 | | | | |
| 4 | Lens 2 | −13.5000 | (ASP) | 0.350 | Plastic | 1.614 | 25.6 | 19.53 |
| 5 | | −6.4118 | (ASP) | 0.162 | | | | |
| 6 | Lens 3 | 11.4981 | (ASP) | 0.300 | Plastic | 1.587 | 28.3 | −3.07 |
| 7 | | 1.5453 | (ASP) | 0.738 | | | | |
| 8 | Lens 4 | −13.1944 | (ASP) | 0.429 | Plastic | 1.534 | 56.0 | 18.76 |
| 9 | | −5.7612 | (ASP) | 0.032 | | | | |
| 10 | Stop | Plano | | 0.300 | | | | |
| 11 | Prism | Plano | | 14.300 | Plastic | 1.545 | 56.1 | — |
| 12 | | Plano | | 0.100 | | | | |
| 13 | Filter | Plano | | 0.210 | Glass | 1.517 | 64.2 | — |
| 14 | | Plano | | 0.822 | | | | |
| 15 | Image | Plano | | — | | | | |

Note:
Reference wavelength is 587.6 nm (d-line).
An effective radius of the stop S1 (Surface 10) is 2.002 mm.

TABLE 4B

| Aspheric Coefficients | | | | |
|---|---|---|---|---|
| Surface # | 2 | 3 | 4 | 5 |
| k= | −3.16635E+00 | −4.37777E+00 | −6.76230E+01 | 0.00000E+00 |
| A4= | −7.8439835E−05 | 6.1659652E−02 | 7.7269210E−02 | 7.4210135E−02 |
| A6= | 4.0093442E−04 | −5.4445194E−02 | −5.4008061E−02 | −5.7527305E−02 |
| A8= | −2.8408411E−04 | 3.0327914E−02 | 7.4454730E−03 | 3.8892116E−02 |
| A10= | −1.3562097E−05 | −1.1018514E−02 | 2.1808494E−02 | −5.3607132E−03 |
| A12= | 5.5562622E−05 | 2.6671572E−03 | −1.9356972E−02 | −7.2899565E−03 |
| A14= | −1.9500452E−05 | −4.2902703E−04 | 8.4497320E−03 | 5.1946365E−03 |
| A16= | 3.1808648E−06 | 4.4221926E−05 | −2.3004409E−03 | −1.7718681E−03 |
| A18= | −2.5935323E−07 | −2.6500020E−06 | 4.0859901E−04 | 3.6562715E−04 |
| A20= | 8.6116450E−09 | 7.0394021E−08 | −4.6129474E−05 | −4.6262905E−05 |
| A22= | — | — | 3.0048754E−06 | 3.3005208E−06 |
| A24= | — | — | −8.5890545E−08 | −1.0142497E−07 |
| Surface # | 6 | 7 | 8 | 9 |
| k= | 0.00000E+00 | −4.71611E+00 | 0.00000E+00 | −1.71816E+01 |
| A4= | −1.0959523E−01 | −8.8327140E−02 | −3.2282416E−03 | −6.6906822E−03 |
| A6= | 1.0103273E−01 | 1.1854496E−01 | −1.2515571E−02 | −5.0792911E−03 |
| A8= | −2.6890133E−02 | −7.0114804E−02 | 3.0817044E−02 | 1.4875648E−02 |
| A10= | −1.4702365E−02 | 1.7047232E−02 | −2.5113477E−02 | −1.1349022E−02 |
| A12= | 1.6295537E−02 | 1.9722740E−03 | 1.1282171E−02 | 4.7295189E−03 |
| A14= | −7.3703391E−03 | −2.5084734E−03 | −3.1085481E−03 | −1.1452077E−03 |
| A16= | 2.0664686E−03 | 7.1312642E−04 | 5.3277656E−04 | 1.6089399E−04 |
| A18= | −3.8574174E−04 | −9.3283166E−05 | −5.1916108E−05 | −1.1929893E−05 |
| A20= | 4.7022769E−05 | 4.7800221E−06 | 2.1472389E−06 | 3.3161866E−07 |
| A22= | −3.3974781E−06 | — | — | — |
| A24= | 1.1036734E−07 | — | — | — |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Conditional Expressions | | | |
|---|---|---|---|
| f [mm] | 14.58 | ET34/T34 | 0.11 |
| Fno | 2.73 | SAG1R2/CT4 | −0.91 |
| HFOV [deg.] | 16.0 | (\|SAG2R1\| + \|SAG3R2\|)/(CT2 + CT3) | 1.44 |
| BL/TD | 4.64 | (R3 + R4)/(R3 − R4) | 2.81 |
| TL/f | 1.31 | (R5 + R6)/(R5 − R6) | 1.31 |
| ImgH [mm] | 4.25 | (R7 + R8)/(R7 − R8) | 2.55 |
| f1/f34 | −1.08 | \|R5/R6\| | 7.44 |
| R2/f1 | −0.87 | Y1R1/Y4R2 | 1.33 |
| R2/T34 | −5.05 | Y1R1/ImgH | 0.63 |
| T23 × 100/\|R4\| | 2.53 | CRA_D [deg.] | 19.1 |
| CT1/T23 | 8.15 | Vmin | 25.6 |
| T12/T34 | 0.14 | (Vi/Ni)min | 15.86 |
| TD/T12 | 34.00 | V4/V3 | 1.98 |
| (ET1 + ET4)/(CT1 + CT4) | 0.37 | N4 | 1.534 |

5th Embodiment

Figure 16:
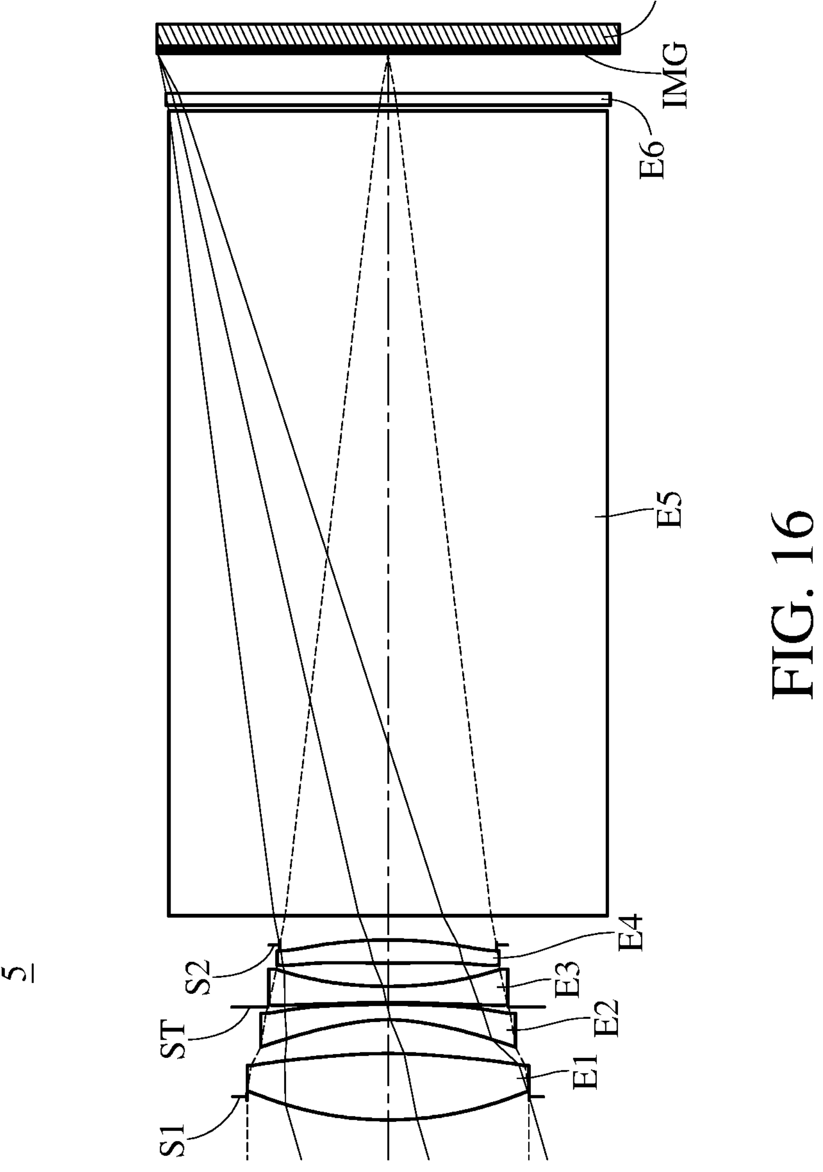
FIG. 16 is a schematic view of an image capturing unit according to the 5th embodiment of the present disclosure.
Figure 17:
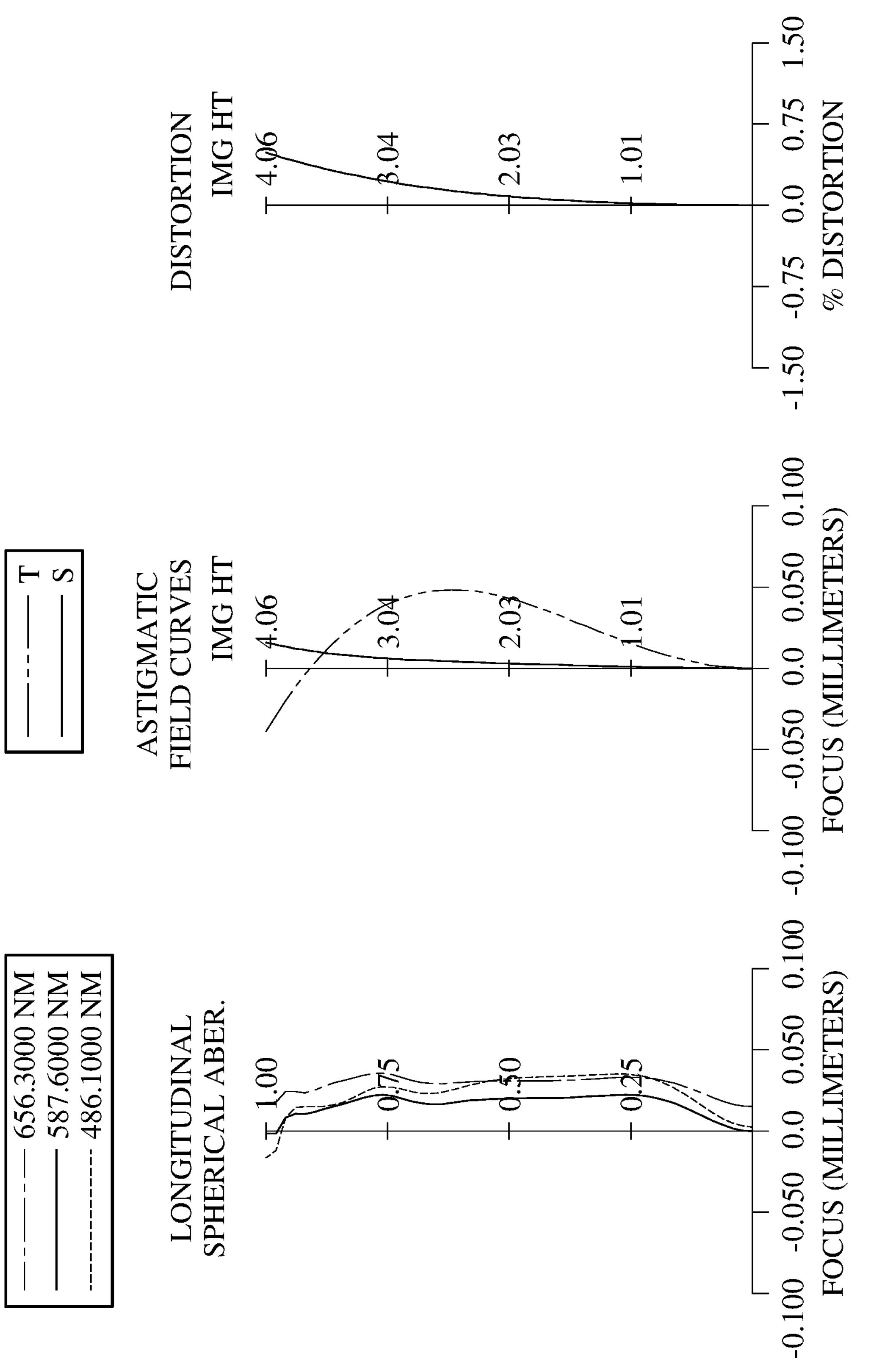
FIG. 17 shows spherical aberration curves, astigmatic field curves and a distortion curve of the image capturing unit according to the 5th embodiment.

FIG. 16 is a schematic view of an image capturing unit according to the 5th embodiment of the present disclosure. FIG. 17 shows, in order from left to right, spherical aberration curves, astigmatic field curves and a distortion curve of the image capturing unit according to the 5th embodiment. In FIG. 16, the image capturing unit 5 includes the photographing system lens assembly (its reference numeral is omitted) of the present disclosure and an image sensor IS. The photographing system lens assembly includes, in order from an object side to an image side along an optical axis, a stop S1, a first lens element E1, a second lens element E2, an aperture stop ST, a third lens element E3, a fourth lens element E4, a stop S2, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has three inflection points.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The reflective element E5 is made of plastic material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 16. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 5th embodiment are shown in Table 5A and the aspheric surface data are shown in Table 5B below.

TABLE 5A

| 5th Embodiment<br>f = 13.90 mm, Fno = 2.80, HFOV = 16.2 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Stop | Plano | | −0.412 | | | | |
| 2 | Lens 1 | 6.0741 | (ASP) | 1.169 | Glass | 1.806 | 40.7 | 4.80 |
| 3 | | −9.7181 | (ASP) | 0.597 | | | | |
| 4 | Lens 2 | −2.8207 | (ASP) | 0.270 | Plastic | 1.566 | 37.4 | −6.84 |
| 5 | | −10.7324 | (ASP) | −0.050 | | | | |
| 6 | Ape. Stop | Plano | | 0.080 | | | | |
| 7 | Lens 3 | −60.0268 | (ASP) | 0.286 | Plastic | 1.639 | 23.5 | −8.51 |
| 8 | | 5.9838 | (ASP) | 0.409 | | | | |
| 9 | Lens 4 | 19.9184 | (ASP) | 0.409 | Plastic | 1.544 | 56.0 | 10.82 |
| 10 | | −8.2996 | (ASP) | −0.088 | | | | |
| 11 | Stop | Plano | | 0.513 | | | | |
| 12 | Prism | Plano | | 14.180 | Plastic | 1.545 | 56.1 | — |
| 13 | | Plano | | 0.100 | | | | |
| 14 | Filter | Plano | | 0.210 | Glass | 1.517 | 64.2 | — |
| 15 | | Plano | | 0.706 | | | | |
| 16 | Image | Plano | | — | | | | |

Note:
Reference wavelength is 587.6 nm (d-line).
An effective radius of the stop S1 (Surface 1) is 2.483 mm.
An effective radius of the stop S2 (Surface 11) is 1.908 mm.

TABLE 5B

| Aspheric Coefficients | | | | |
|---|---|---|---|---|
| Surface # | 2 | 3 | 4 | 5 |
| k= | −1.03170E+00 | 2.79505E+00 | −1.13526E+01 | 0.00000E+00 |
| A4= | 1.2712886E−04 | 6.5869991E−03 | 5.5432185E−02 | 5.6011064E−02 |
| A6= | 7.9597310E−04 | 1.7045325E−03 | −6.8979549E−02 | −2.2540950E−02 |
| A8= | −4.2747457E−04 | −2.7927149E−03 | 3.7094063E−02 | −6.0112690E−02 |
| A10= | 1.0071956E−04 | 1.3792234E−03 | −8.9051728E−03 | 9.2970990E−02 |
| A12= | −9.4580508E−06 | −3.6607107E−04 | −1.7583639E−04 | −6.3133043E−02 |
| A14= | −5.0142196E−07 | 5.5334936E−05 | 6.7383681E−04 | 2.4779679E−02 |
| A16= | 1.6573905E−07 | −4.4938574E−06 | −1.7897836E−04 | −5.9580872E−03 |
| A18= | −9.4723767E−09 | 1.5233852E−07 | 2.2322783E−05 | 8.6667411E−04 |
| A20= | — | — | −1.3441968E−06 | −7.0076214E−05 |
| A22= | — | — | 2.9089365E−08 | 2.4177775E−06 |
| Surface # | 7 | 8 | 9 | 10 |
| k= | 0.00000E+00 | 1.48360E−01 | 0.00000E+00 | 0.00000E+00 |
| A4= | −7.5356487E−02 | −6.0097462E−02 | −1.7526599E−02 | 2.9620605E−03 |
| A6= | 1.4552970E−01 | 8.5431726E−02 | −1.1700565E−02 | −1.4413474E−02 |
| A8= | −1.5050348E−01 | −4.7617383E−02 | 3.1611544E−02 | 2.2055010E−02 |
| A10= | 1.0013553E−01 | 2.6933888E−03 | −3.6008118E−02 | −2.1002172E−02 |
| A12= | −4.1814682E−02 | 1.1834679E−02 | 2.4043424E−02 | 1.2878685E−02 |
| A14= | 9.0346562E−03 | −7.8137472E−03 | −9.9479906E−03 | −5.0015807E−03 |
| A16= | 8.9450106E−05 | 2.5390600E−03 | 2.5081153E−03 | 1.1927649E−03 |

TABLE 5B-continued

| Aspheric Coefficients | | | | |
|---|---|---|---|---|
| A18= | −5.7813160E−04 | −4.6078811E−04 | −3.5023870E−04 | −1.5855362E−04 |
| A20= | 1.4451083E−04 | 4.3263677E−05 | 2.0627032E−05 | 8.9467372E−06 |
| A22= | −1.5700625E−05 | −1.5572209E−06 | — | — |
| A24= | 6.6349217E−07 | — | — | — |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 13.90 | ET34/T34 | 0.18 |
| Fno | 2.80 | SAG1R2/CT4 | −0.52 |
| HFOV [deg.] | 16.2 | (\|SAG2R1\| + \|SAG3R2\|)/(CT2 + CT3) | 1.41 |
| BL/TD | 4.93 | (R3 + R4)/(R3 − R4) | −1.71 |
| TL/f | 1.35 | (R5 + R6)/(R5 − R6) | 0.82 |
| ImgH [mm] | 4.06 | (R7 + R8)/(R7 − R8) | 0.41 |
| f1/f34 | −0.09 | \|R5/R6\| | 10.03 |
| R2/f1 | −2.03 | Y1R1/Y4R2 | 1.29 |
| R2/T34 | −23.76 | Y1R1/ImgH | 0.61 |
| T23 × 100/\|R4\| | 0.28 | CRA_D [deg.] | 19.9 |
| CT1/T23 | 38.97 | Vmin | 23.5 |
| T12/T34 | 1.46 | (Vi/Ni)min | 14.34 |
| TD/T12 | 5.31 | V4/V3 | 2.38 |
| (ET1 + ET4)/(CT1 + CT4) | 0.44 | N4 | 1.544 |

6th Embodiment

Figure 18:
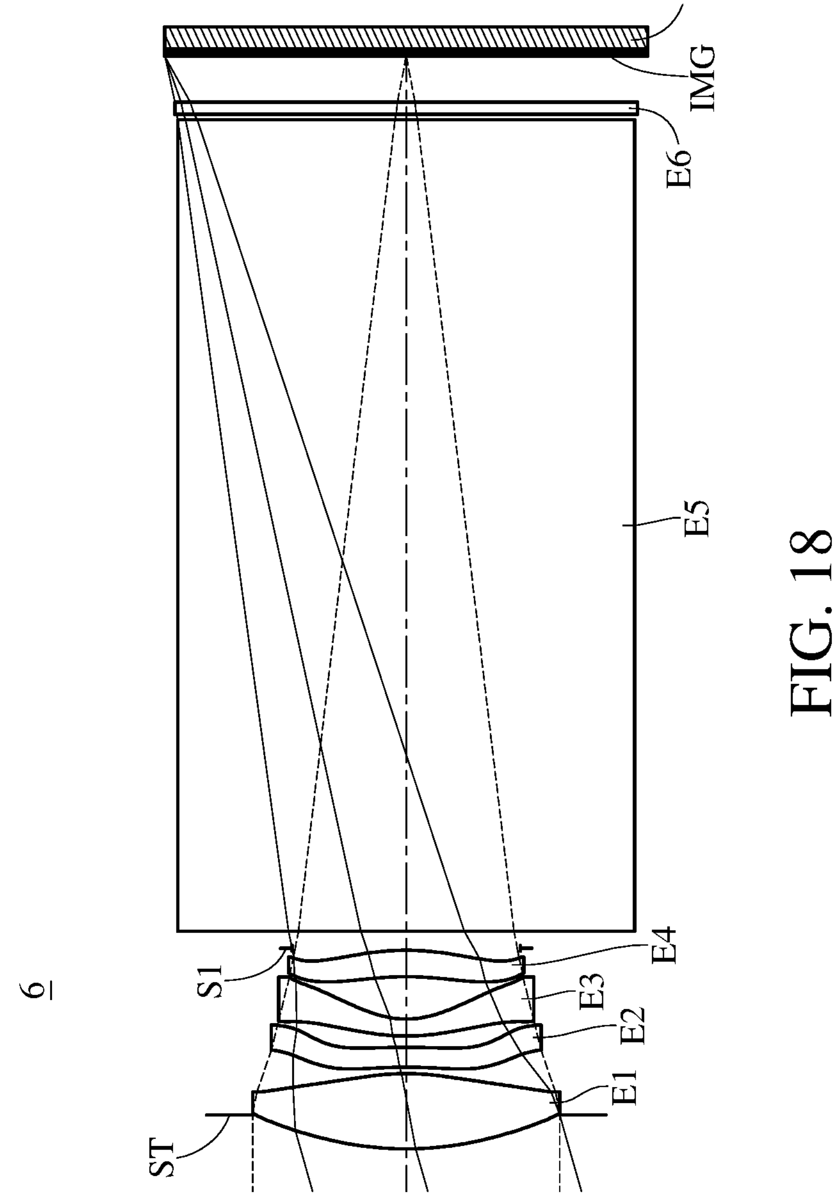
FIG. 18 is a schematic view of an image capturing unit according to the 6th embodiment of the present disclosure.
Figure 19:
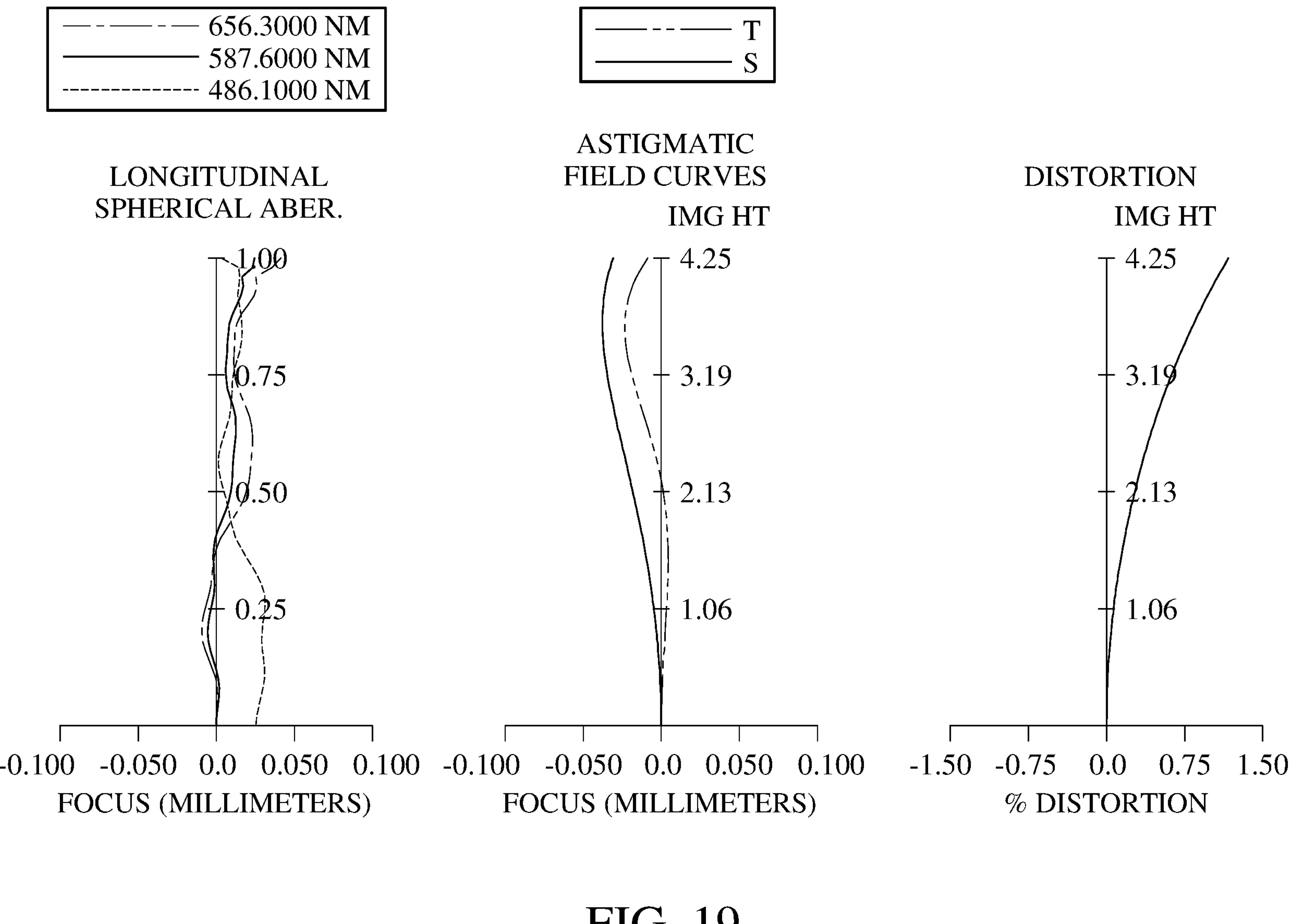
FIG. 19 shows spherical aberration curves, astigmatic field curves and a distortion curve of the image capturing unit according to the 6th embodiment.

FIG. 18 is a schematic view of an image capturing unit according to the 6th embodiment of the present disclosure. FIG. 19 shows, in order from left to right, spherical aberration curves, astigmatic field curves and a distortion curve of the image capturing unit according to the 6th embodiment. In FIG. 18, the image capturing unit 6 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has three inflection points.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The reflective element E5 is made of plastic material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 18. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 6th embodiment are shown in Table 6A and the aspheric surface data are shown in Table 6B below.

TABLE 6A

| 6th Embodiment f = 14.77 mm, Fno = 2.73, HFOV = 15.9 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.597 | | | | |
| 2 | Lens 1 | 5.6772 | (ASP) | 1.327 | Plastic | 1.562 | 44.6 | 4.57 |
| 3 | | −4.2998 | (ASP) | 0.112 | | | | |
| 4 | Lens 2 | −9.8000 | (ASP) | 0.350 | Plastic | 1.614 | 25.6 | −92.72 |
| 5 | | −12.0000 | (ASP) | 0.200 | | | | |
| 6 | Lens 3 | 3.9964 | (ASP) | 0.300 | Plastic | 1.587 | 28.3 | −4.85 |
| 7 | | 1.6173 | (ASP) | 0.745 | | | | |
| 8 | Lens 4 | −5.2230 | (ASP) | 0.466 | Plastic | 1.534 | 56.0 | 42.48 |
| 9 | | −4.3778 | (ASP) | 0.034 | | | | |
| 10 | Stop | Plano | | 0.300 | | | | |
| 11 | Prism | Plano | | 14.300 | Plastic | 1.545 | 56.1 | — |
| 12 | | Plano | | 0.100 | | | | |
| 13 | Filter | Plano | | 0.210 | Glass | 1.517 | 64.2 | — |
| 14 | | Plano | | 0.814 | | | | |
| 15 | Image | Plano | | — | | | | |

Note:
Reference wavelength is 587.6 nm (d-line).
An effective radius of the stop S1 (Surface 10) is 2.012 mm.

TABLE 6B

| Aspheric Coefficients | | | | |
|---|---|---|---|---|
| Surface # | 2 | 3 | 4 | 5 |
| k= | −2.38270E+00 | −4.36059E+00 | −3.70318E+01 | 0.00000E+00 |
| A4= | 2.0082119E−03 | 6.0471695E−03 | −2.4590270E−02 | 3.2112217E−02 |
| A6= | −1.9460750E−03 | 2.2312871E−02 | 8.1569090E−02 | −1.1089874E−02 |
| A8= | 1.4340240E−03 | −1.8509935E−02 | −6.8874252E−02 | 1.8740521E−02 |
| A10= | −7.6288589E−04 | 7.4521011E−03 | 4.3306213E−02 | −6.8995953E−03 |
| A12= | 2.5215178E−04 | −1.8078057E−03 | −2.1048315E−02 | −2.7821245E−04 |
| A14= | −5.0411575E−05 | 2.7582579E−04 | 7.5220799E−03 | 5.4387791E−04 |
| A16= | 5.9898681E−06 | −2.5901724E−05 | −1.8992196E−03 | 1.5619776E−05 |
| A18= | −3.9123470E−07 | 1.3663343E−06 | 3.2592822E−04 | −6.7796882E−05 |
| A20= | 1.0882761E−08 | −3.0858430E−08 | −3.5990938E−05 | 1.7891450E−05 |
| A22= | — | — | 2.3027001E−06 | −1.9368124E−06 |
| A24= | — | — | −6.4862202E−08 | 7.8028672E−08 |
| Surface # | 6 | 7 | 8 | 9 |
| k= | 0.00000E+00 | −3.77463E+00 | 0.00000E+00 | −1.77127E+01 |
| A4= | 5.5837291E−02 | 9.0660318E−02 | 3.3195545E−02 | −9.5244035E−03 |
| A6= | −1.8522208E−01 | −1.9842279E−01 | −1.0147560E−02 | 7.8661246E−03 |
| A8= | 2.0880377E−01 | 2.2226993E−01 | −2.0890235E−03 | −7.0598788E−03 |
| A10= | −1.3475995E−01 | −1.4799668E−01 | 1.2719413E−02 | 8.5281534E−03 |
| A12= | 5.5604679E−02 | 6.1060733E−02 | −1.0461480E−02 | −5.8575218E−03 |
| A14= | −1.5812815E−02 | −1.5913658E−02 | 4.1210891E−03 | 2.3238229E−03 |
| A16= | 3.2992365E−03 | 2.5633240E−03 | −8.7922033E−04 | −5.2444147E−04 |
| A18= | −5.2250637E−04 | −2.3293701E−04 | 9.8535970E−05 | 6.2594603E−05 |
| A20= | 6.0405581E−05 | 9.1005829E−06 | −4.5984488E−06 | −3.0855279E−06 |
| A22= | −4.4159463E−06 | — | — | — |
| A24= | 1.4742256E−07 | — | — | — |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 14.77 | ET34/T34 | 0.10 |
| Fno | 2.73 | SAG1R2/CT4 | −0.70 |
| HFOV [deg.] | 15.9 | (\|SAG2R1\| + \|SAG3R2\|)/(CT2 + CT3) | 1.60 |
| BL/TD | 4.50 | (R3 + R4)/(R3 − R4) | −9.91 |
| TL/f | 1.30 | (R5 + R6)/(R5 − R6) | 2.36 |
| ImgH [mm] | 4.25 | (R7 + R8)/(R7 − R8) | 11.36 |
| f1/f34 | −0.79 | \|R5/R6\| | 2.47 |
| R2/f1 | −0.94 | Y1R1/Y4R2 | 1.34 |
| R2/T34 | −5.77 | Y1R1/ImgH | 0.64 |

TABLE 6C-continued

| Values of Conditional Expressions | | | |
|---|---|---|---|
| T23 × 100/\|R4\| | 1.67 | CRA_D [deg.] | 19.0 |
| CT1/T23 | 6.64 | Vmin | 25.6 |
| T12/T34 | 0.15 | (Vi/Ni)min | 15.86 |
| TD/T12 | 31.25 | V4/V3 | 1.98 |
| (ET1 + ET4)/(CT1 + CT4) | 0.36 | N4 | 1.534 |

7th Embodiment

Figure 20:
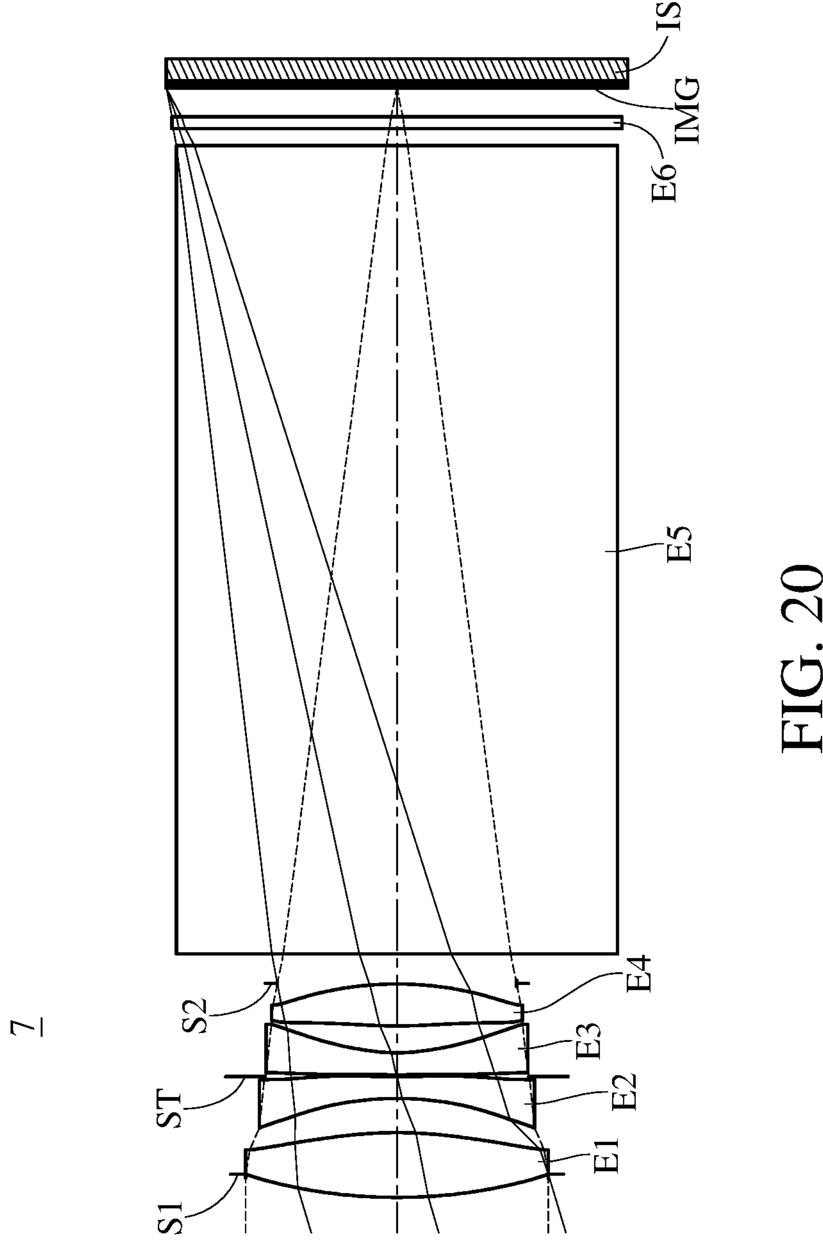
FIG. 20 is a schematic view of an image capturing unit according to the 7th embodiment of the present disclosure.
Figure 21:
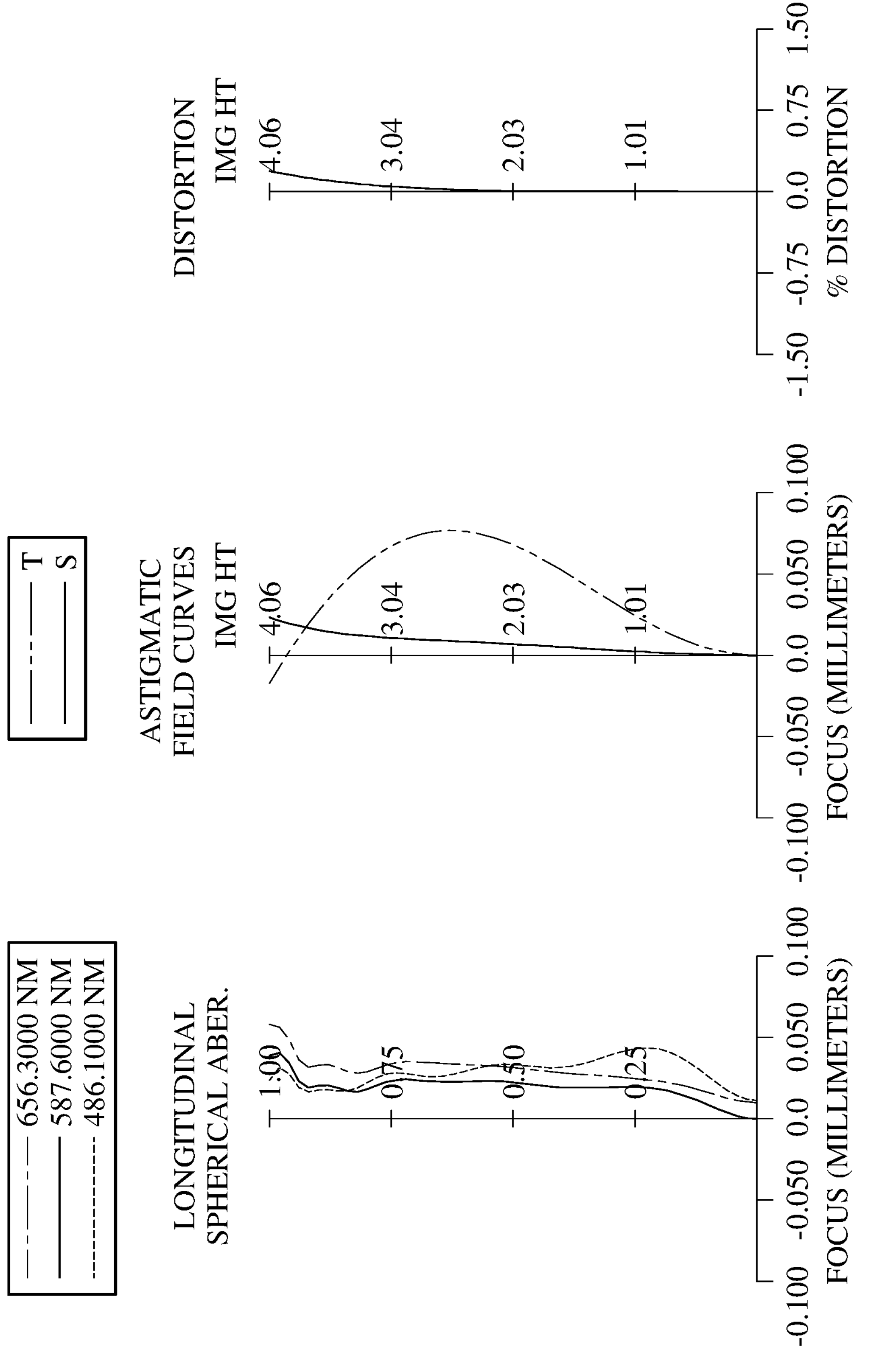
FIG. 21 shows spherical aberration curves, astigmatic field curves and a distortion curve of the image capturing unit according to the 7th embodiment.

FIG. 20 is a schematic view of an image capturing unit according to the 7th embodiment of the present disclosure. FIG. 21 shows, in order from left to right, spherical aberration curves, astigmatic field curves and a distortion curve of the image capturing unit according to the 7th embodiment. In FIG. 20, the image capturing unit 7 includes the photographing system lens assembly (its reference numeral is omitted) of the present disclosure and an image sensor IS. The photographing system lens assembly includes, in order from an object side to an image side along an optical axis, a stop S1, a first lens element E1, a second lens element E2, an aperture stop ST, a third lens element E3, a fourth lens element E4, a stop S2, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The image-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has five inflection points. The image-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point.

The reflective element E5 is made of plastic material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 20. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 7th embodiment are shown in Table 7A and the aspheric surface data are shown in Table 7B below.

TABLE 7A

| 7th Embodiment<br>f = 13.59 mm, Fno = 2.55, HFOV = 16.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Stop | Plano | | −0.410 | | | | |
| 2 | Lens 1 | 8.9986 | (ASP) | 1.141 | Glass | 1.806 | 40.7 | 5.25 |
| 3 | | −7.5350 | (ASP) | 0.602 | | | | |
| 4 | Lens 2 | −6.0540 | (ASP) | 0.384 | Plastic | 1.544 | 56.0 | −7.85 |
| 5 | | 14.8172 | (ASP) | 0.002 | | | | |
| 6 | Ape. Stop | Plano | | 0.030 | | | | |
| 7 | Lens 3 | 11.4744 | (ASP) | 0.388 | Plastic | 1.639 | 23.5 | −5.84 |
| 8 | | 2.7786 | (ASP) | 0.474 | | | | |
| 9 | Lens 4 | 8.2797 | (ASP) | 0.738 | Plastic | 1.534 | 56.0 | 6.74 |
| 10 | | −6.1824 | (ASP) | 0.013 | | | | |
| 11 | Stop | Plano | | 0.515 | | | | |
| 12 | Prism | Plano | | 14.240 | Plastic | 1.545 | 56.1 | — |
| 13 | | Plano | | 0.300 | | | | |
| 14 | Filter | Plano | | 0.210 | Glass | 1.517 | 64.2 | — |
| 15 | | Plano | | 0.506 | | | | |
| 16 | Image | Plano | | — | | | | |

Note:

Reference wavelength is 587.6 nm (d-line).

An effective radius of the stop S1 (Surface 1) is 2.666 mm.

An effective radius of the stop S2 (Surface 11) is 2.105 mm.

TABLE 7B

| Aspheric Coefficients | | | | |
|---|---|---|---|---|
| Surface # | 2 | 3 | 4 | 5 |
| k= | 2.07768E−01 | 2.51563E+00 | −1.92393E+00 | −1.10036E+01 |
| A4= | −1.0252882E−03 | 2.4907168E−03 | −1.3528280E−02 | −6.1750144E−02 |
| A6= | 4.1994592E−04 | 2.6601919E−03 | 1.7548121E−02 | 1.0976264E−01 |
| A8= | −3.0540800E−05 | −1.2668207E−03 | −1.9680518E−02 | −1.4294611E−01 |
| A10= | −2.2649943E−05 | 3.0019906E−04 | 1.3553550E−02 | 1.1271399E−01 |
| A12= | 6.7794273E−06 | −3.9368444E−05 | −6.1211195E−03 | −5.6552362E−02 |
| A14= | −7.4171483E−07 | 2.7516611E−06 | 1.9332763E−03 | 1.8828999E−02 |
| A16= | 3.1399375E−08 | −7.8231074E−08 | −4.3330719E−04 | −4.2252397E−03 |
| A18= | — | — | 6.7383652E−05 | 6.3228056E−04 |
| A20= | — | — | −6.8753460E−06 | −6.0372866E−05 |
| A22= | — | — | 4.1183637E−07 | 3.3126814E−06 |
| A24= | — | — | −1.0941382E−08 | −7.8946378E−08 |
| Surface # | 7 | 8 | 9 | 10 |
| k= | 0.00000E+00 | −5.09057E+00 | −7.79833E+00 | 4.23848E+00 |
| A4= | −1.0510462E−01 | −8.1292164E−02 | −2.6542900E−02 | 3.5269431E−03 |
| A6= | 1.4914892E−01 | 8.2930014E−02 | −2.6751516E−03 | −9.0620052E−03 |
| A8= | −1.4044620E−01 | −4.2455959E−02 | 1.8534165E−02 | 1.3233594E−02 |
| A10= | 9.0642414E−02 | 1.0826180E−02 | −1.6407633E−02 | −1.0740684E−02 |
| A12= | −3.9379377E−02 | 4.2514203E−04 | 6.9831336E−03 | 5.3777769E−03 |
| A14= | 1.1372843E−02 | −1.3326084E−03 | −1.0980099E−03 | −1.6747468E−03 |
| A16= | −2.1491047E−03 | 4.5056067E−04 | −2.8499336E−04 | 3.1517834E−04 |
| A18= | 2.5560898E−04 | −7.2283674E−05 | 1.7236738E−04 | −3.2627755E−05 |
| A20= | −1.7392961E−05 | 5.6001140E−06 | −3.4495713E−05 | 1.4240685E−06 |
| A22= | 5.1678708E−07 | −1.5945280E−07 | 3.2188075E−06 | — |
| A24= | — | — | −1.1645454E−07 | — |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 13.59 | ET34/T34 | 0.16 |
| Fno | 2.55 | SAG1R2/CT4 | −0.41 |
| HFOV [deg.] | 16.6 | (\|SAG2R1\| + \|SAG3R2\|)/(CT2 + CT3) | 1.32 |
| BL/TD | 4.20 | (R3 + R4)/(R3 − R4) | −0.42 |
| TL/f | 1.44 | (R5 + R6)/(R5 − R6) | 1.64 |
| ImgH [mm] | 4.06 | (R7 + R8)/(R7 − R8) | 0.15 |
| f1/f34 | −0.03 | \|R5/R6\| | 4.13 |
| R2/f1 | −1.44 | Y1R1/Y4R2 | 1.22 |
| R2/T34 | −15.90 | Y1R1/ImgH | 0.66 |
| T23 × 100/\|R4\| | 0.22 | CRA_D [deg.] | 19.0 |
| CT1/T23 | 35.66 | Vmin | 23.5 |
| T12/T34 | 1.27 | (Vi/Ni)min | 14.34 |
| TD/T12 | 6.24 | V4/V3 | 2.38 |
| (ET1 + ET4)/(CT1 + CT4) | 0.37 | N4 | 1.534 |

8th Embodiment

Figure 22:
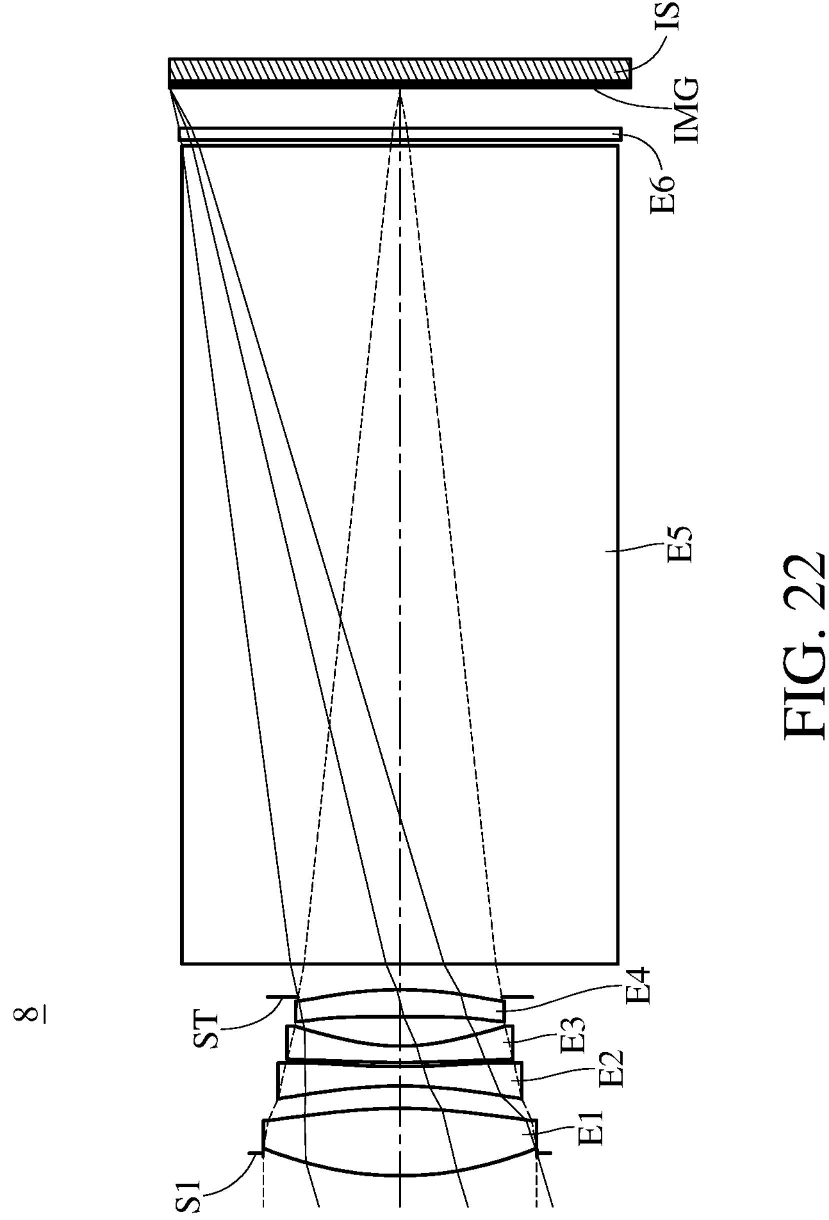
FIG. 22 is a schematic view of an image capturing unit according to the 8th embodiment of the present disclosure.
Figure 23:
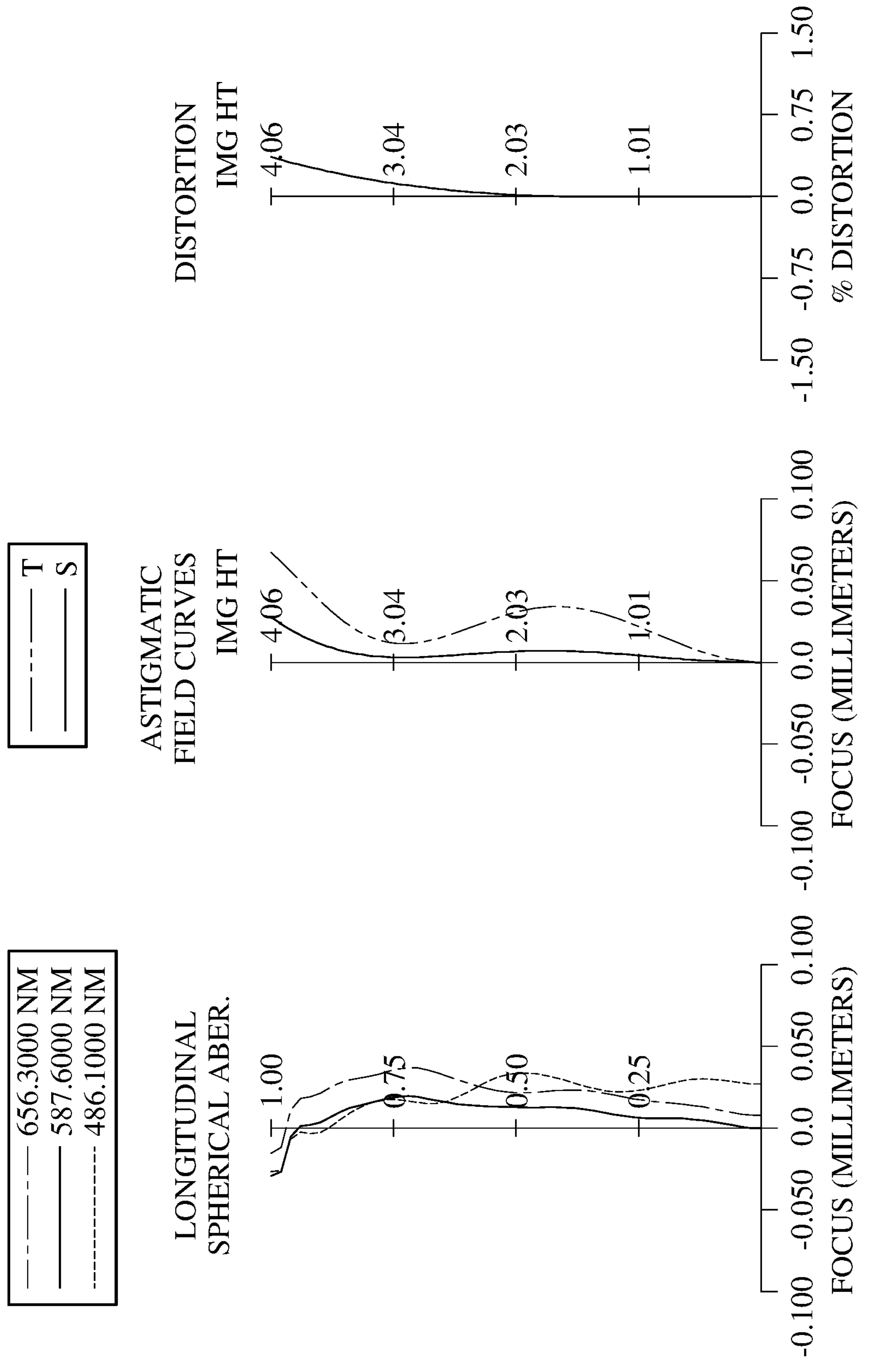
FIG. 23 shows spherical aberration curves, astigmatic field curves and a distortion curve of the image capturing unit according to the 8th embodiment.

FIG. 22 is a schematic view of an image capturing unit according to the 8th embodiment of the present disclosure. FIG. 23 shows, in order from left to right, spherical aberration curves, astigmatic field curves and a distortion curve of the image capturing unit according to the 8th embodiment. In FIG. 22, the image capturing unit 8 includes the photographing system lens assembly (its reference numeral is omitted) of the present disclosure and an image sensor IS. The photographing system lens assembly includes, in order from an object side to an image side along an optical axis, a stop S1, a first lens element E1, a second lens element E2, a third lens element E3, a fourth lens element E4, an aperture stop ST, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The image-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has five inflection points.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 22. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 8th embodiment are shown in Table 8A and the aspheric surface data are shown in Table 8B below.

TABLE 8A

| 8th Embodiment<br>f = 13.49 mm, Fno = 2.80, HFOV = 16.7 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Stop | Plano | | −0.400 | | | | |
| 2 | Lens 1 | 5.9833 | (ASP) | 1.187 | Glass | 1.806 | 40.7 | 4.42 |
| 3 | | −8.0264 | (ASP) | 0.396 | | | | |
| 4 | Lens 2 | −5.6013 | (ASP) | 0.340 | Plastic | 1.544 | 56.0 | −8.64 |
| 5 | | 29.9160 | (ASP) | 0.071 | | | | |
| 6 | Lens 3 | 12.4927 | (ASP) | 0.290 | Plastic | 1.669 | 19.5 | −6.85 |
| 7 | | 3.3200 | (ASP) | 0.518 | | | | |
| 8 | Lens 4 | −112.6412 | (ASP) | 0.475 | Plastic | 1.534 | 56.0 | 14.21 |
| 9 | | −7.1246 | (ASP) | −0.128 | | | | |
| 10 | Ape. Stop | Plano | | 0.582 | | | | |
| 11 | Prism | Plano | | 14.420 | Glass | 1.697 | 55.5 | — |
| 12 | | Plano | | 0.100 | | | | |
| 13 | Filter | Plano | | 0.210 | Glass | 1.517 | 64.2 | — |
| 14 | | Plano | | 0.706 | | | | |
| 15 | Image | Plano | | — | | | | |

Note:
Reference wavelength is 587.6 nm (d-line).
An effective radius of the stop S1 (Surface 1) is 2.410 mm.

TABLE 8B

| Aspheric Coefficients | | | | |
|---|---|---|---|---|
| Surface # | 2 | 3 | 4 | 5 |
| k= | −1.34761E+00 | 9.25294E−01 | −2.55612E+01 | 0.00000E+00 |
| A4= | 3.2966278E−04 | 1.4167576E−02 | 6.6160055E−02 | 7.3581705E−02 |
| A6= | 6.4353907E−04 | −5.2965335E−03 | −9.5631186E−02 | −7.0790750E−02 |
| A8= | −4.2702657E−04 | 7.0570671E−04 | 6.8008694E−02 | −3.9790576E−02 |
| A10= | 8.0195051E−05 | 5.2995988E−04 | −2.7122954E−02 | 1.1726310E−01 |
| A12= | 2.1266018E−05 | −3.1406987E−04 | 5.2362405E−03 | −9.2738847E−02 |
| A14= | −1.3667041E−05 | 7.6305048E−05 | 2.5715343E−04 | 3.7275344E−02 |
| A16= | 2.7674286E−06 | −9.6530403E−06 | −4.1887044E−04 | −7.8346845E−03 |
| A18= | −2.5719487E−07 | 6.0855673E−07 | 1.1038187E−04 | 5.8743804E−04 |
| A20= | 9.2741741E−09 | −1.4370101E−08 | −1.4871845E−05 | 7.9644765E−05 |
| A22= | — | — | 1.0560425E−06 | −1.8989847E−05 |
| A24= | — | — | −3.1198167E−08 | 1.0844770E−06 |
| Surface # | 6 | 7 | 8 | 9 |
| k= | 0.00000E+00 | −4.03128E+00 | 0.00000E+00 | −3.66778E+00 |
| A4= | −5.1836040E−02 | −6.5189817E−02 | −8.4197537E−03 | 3.0616495E−05 |
| A6= | 1.3201692E−01 | 1.3514419E−01 | 1.2728407E−02 | 7.2411889E−03 |
| A8= | −2.3512998E−01 | −1.8863539E−01 | −1.9905595E−02 | −1.5377053E−02 |
| A10= | 2.4962113E−01 | 1.7881526E−01 | 8.3430814E−03 | 1.2959763E−02 |
| A12= | −1.6148345E−01 | −1.1777215E−01 | 4.1743373E−03 | −5.2903075E−03 |
| A14= | 6.5428705E−02 | 5.4794074E−02 | −5.6732141E−03 | 8.2287501E−04 |
| A16= | −1.6711258E−02 | −1.8148670E−02 | 2.3646449E−03 | 1.1859335E−04 |
| A18= | 2.6284305E−03 | 4.2124542E−03 | −4.4937421E−04 | −5.7680311E−05 |

TABLE 8B-continued

| Aspheric Coefficients | | | | |
|---|---|---|---|---|
| A20= | −2.3769167E−04 | −6.4715303E−04 | 3.2943010E−05 | 5.5384412E−06 |
| A22= | 1.0555780E−05 | 5.7994892E−05 | — | — |
| A24= | −1.5251409E−07 | −2.2258797E−06 | — | — |

In the 8th embodiment, the equation of the aspheric surface profiles of the aforementioned lens elements is the same as the equation of the 1st embodiment. Also, the definitions of these parameters shown in Table 8C below are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

| Values of Conditional Expressions | | | |
|---|---|---|---|
| f [mm] | 13.49 | ET34/T34 | 0.15 |
| Fno | 2.80 | SAG1R2/CT4 | −0.45 |
| HFOV [deg.] | 16.7 | (\|SAG2R1\| + \|SAG3R2\|)/(CT2 + CT3) | 0.92 |
| BL/TD | 4.85 | (R3 + R4)/(R3 − R4) | −0.68 |
| TL/f | 1.42 | (R5 + R6)/(R5 − R6) | 1.72 |
| ImgH [mm] | 4.06 | (R7 + R8)/(R7 − R8) | 1.14 |
| f1/f34 | −0.30 | \|R5/R6\| | 3.76 |
| R2/f1 | −1.82 | Y1R1/Y4R2 | 1.33 |
| R2/T34 | −15.49 | Y1R1/ImgH | 0.59 |
| T23 × 100/\|R4\| | 0.24 | CRA_D [deg.] | 23.0 |
| CT1/T23 | 16.72 | Vmin | 19.5 |
| T12/T34 | 0.76 | (Vi/Ni)min | 11.68 |
| TD/T12 | 8.28 | V4/V3 | 2.87 |
| (ET1 + ET4)/(CT1 + CT4) | 0.51 | N4 | 1.534 |

9th Embodiment

Figure 24:
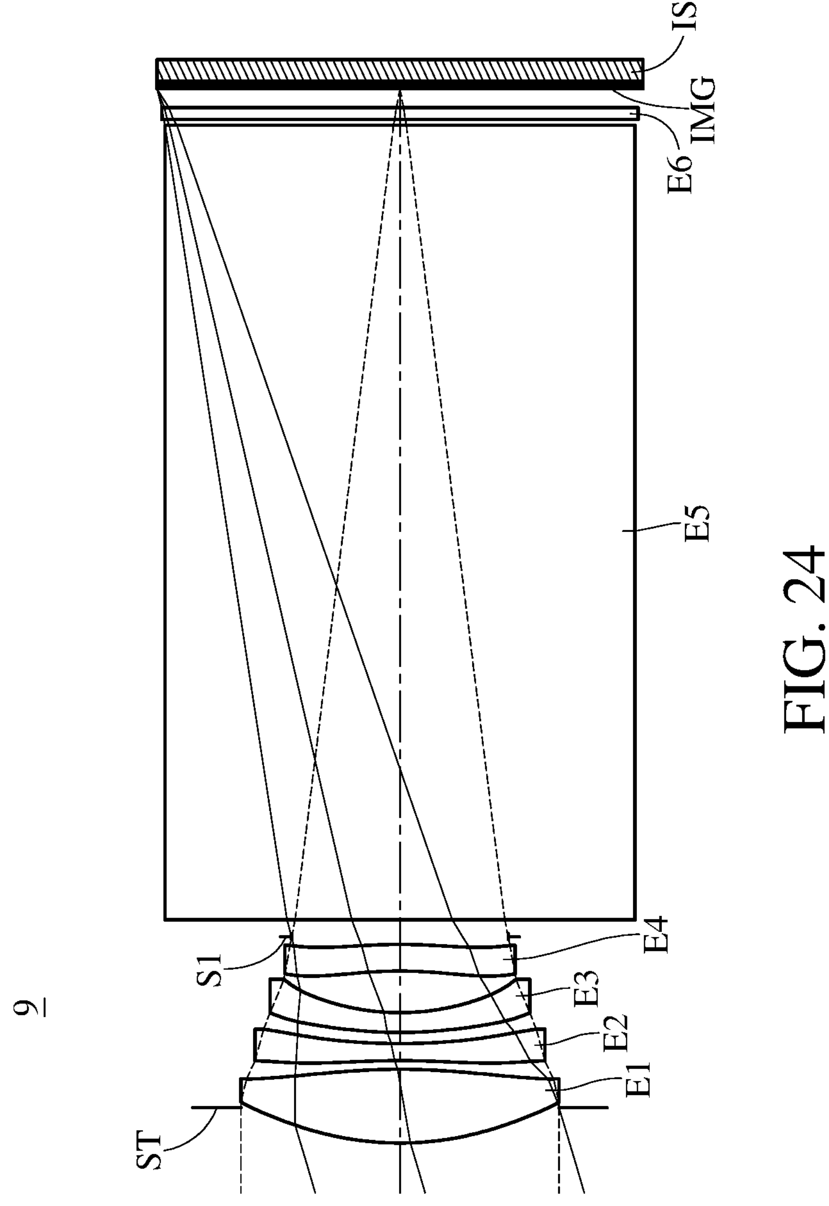
FIG. 24 is a schematic view of an image capturing unit according to the 9th embodiment of the present disclosure.
Figure 25:
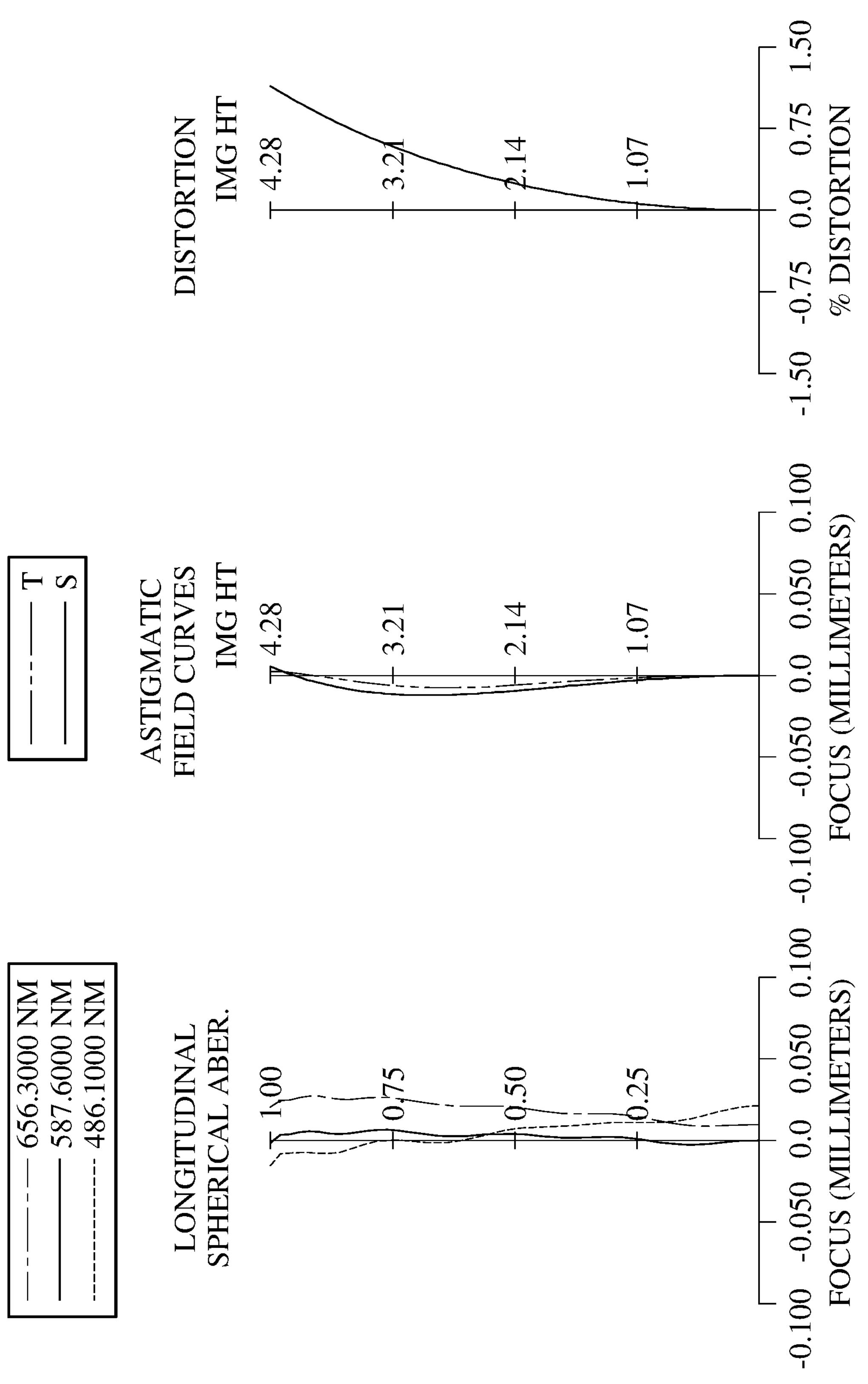
FIG. 25 shows spherical aberration curves, astigmatic field curves and a distortion curve of the image capturing unit according to the 9th embodiment.

FIG. 24 is a schematic view of an image capturing unit according to the 9th embodiment of the present disclosure. FIG. 25 shows, in order from left to right, spherical aberration curves, astigmatic field curves and a distortion curve of the image capturing unit according to the 9th embodiment. In FIG. 24, the image capturing unit 9 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The image-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 24. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 9th embodiment are shown in Table 9A and the aspheric surface data are shown in Table 9B below.

TABLE 9A

| 9th Embodiment f = 14.24 mm, Fno = 2.54, HFOV = 16.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.624 | | | | |
| 2 | Lens 1 | 5.3405 | (ASP) | 1.300 | Glass | 1.806 | 40.7 | 4.58 |
| 3 | | −10.6328 | (ASP) | 0.153 | | | | |
| 4 | Lens 2 | −11.4452 | (ASP) | 0.300 | Plastic | 1.587 | 28.3 | −10.38 |
| 5 | | 13.1604 | (ASP) | 0.194 | | | | |
| 6 | Lens 3 | 7.1898 | (ASP) | 0.350 | Plastic | 1.669 | 19.5 | −13.35 |
| 7 | | 3.9053 | (ASP) | 0.734 | | | | |
| 8 | Lens 4 | −7.2361 | (ASP) | 0.469 | Plastic | 1.544 | 56.0 | −62.09 |
| 9 | | −9.4189 | (ASP) | 0.136 | | | | |
| 10 | Stop | Plano | | 0.300 | | | | |
| 11 | Prism | Plano | | 14.000 | Glass | 1.603 | 60.6 | — |
| 12 | | Plano | | 0.100 | | | | |
| 13 | Filter | Plano | | 0.210 | Glass | 1.517 | 64.2 | — |
| 14 | | Plano | | 0.336 | | | | |
| 15 | Image | Plano | | — | | | | |

Note:
Reference wavelength is 587.6 nm (d-line).
An effective radius of the stop S1 (Surface 10) is 1.912 mm.

TABLE 9B

| Aspheric Coefficients | | | | |
|---|---|---|---|---|
| Surface # | 2 | 3 | 4 | 5 |
| k= | −1.66042E+00 | 2.57207E+00 | −4.71008E+01 | 1.07015E+01 |
| A4= | 8.7086079E−04 | 8.0862753E−03 | 2.2530007E−02 | 2.8232284E−02 |
| A6= | −1.8321636E−04 | −2.9578154E−03 | −1.9091030E−02 | −4.5137745E−02 |
| A8= | 6.9753282E−05 | 9.4239256E−04 | 1.1370441E−02 | 3.6789468E−02 |
| A10= | −3.8309868E−05 | −1.7195407E−04 | −4.1681412E−03 | −1.6799848E−02 |
| A12= | 9.2730745E−06 | 1.8461528E−05 | 9.9805382E−04 | 4.4685469E−03 |
| A14= | −1.0021832E−06 | −1.1732748E−06 | −1.5750018E−04 | −6.6650181E−04 |
| A16= | 4.1733117E−08 | 3.7855450E−08 | 1.5581848E−05 | 4.1854842E−05 |
| A18= | — | — | −8.6103570E−07 | 1.9527553E−06 |
| A20= | — | — | 1.9871841E−08 | −4.5091634E−07 |
| A22= | — | — | — | 1.9476471E−08 |
| Surface # | 6 | 7 | 8 | 9 |
| k= | 1.36395E+00 | −6.07218E−01 | −9.41011E+01 | −9.90000E+01 |
| A4= | 1.2137066E−02 | 2.8914525E−03 | −1.5467342E−02 | −5.3045537E−04 |
| A6= | −4.8058838E−02 | −2.8884924E−02 | 1.5431577E−02 | 3.3113549E−03 |
| A8= | 5.1569870E−02 | 3.8045036E−02 | −6.2464618E−03 | 2.4527484E−03 |
| A10= | −2.9194248E−02 | −2.4830450E−02 | 2.1585330E−03 | −3.3523462E−03 |
| A12= | 9.7777436E−03 | 9.5230906E−03 | −7.0702776E−04 | 1.9312391E−03 |
| A14= | −2.0003182E−03 | −2.2396536E−03 | 1.9086149E−04 | −6.5702272E−04 |
| A16= | 2.4632960E−04 | 3.2273478E−04 | −3.3602465E−05 | 1.3449171E−04 |
| A18= | −1.6806174E−05 | −2.6515943E−05 | 3.2502883E−06 | −1.5326566E−05 |
| A20= | 4.8778896E−07 | 9.6012891E−07 | −1.3215777E−07 | 7.4562842E−07 |

In the 9th embodiment, the equation of the aspheric surface profiles of the aforementioned lens elements is the same as the equation of the 1st embodiment. Also, the definitions of these parameters shown in Table 9C below are the same as those stated in the 1st embodiment with corresponding values for the 9th embodiment, so an explanation in this regard will not be provided again.

Moreover, these parameters can be calculated from Table 9A and Table 9B as the following values and satisfy the following conditions:

TABLE 9C

| Values of Conditional Expressions | | | |
|---|---|---|---|
| f [mm] | 14.24 | ET34/T34 | 0.13 |
| Fno | 2.54 | SAG1R2/CT4 | −0.36 |

TABLE 9C-continued

| Values of Conditional Expressions | | | |
|---|---|---|---|
| HFOV [deg.] | 16.5 | (\|SAG2R1\| + \|SAG3R2\|)/(CT2 + CT3) | 0.92 |
| BL/TD | 4.31 | (R3 + R4)/(R3 − R4) | −0.07 |
| TL/f | 1.30 | (R5 + R6)/(R5 − R6) | 3.38 |
| ImgH [mm] | 4.28 | (R7 + R8)/(R7 − R8) | −7.63 |
| f1/f34 | −0.41 | \|R5/R6\| | 1.84 |
| R2/f1 | −2.32 | Y1R1/Y4R2 | 1.45 |
| R2/T34 | −14.49 | Y1R1/ImgH | 0.65 |
| T23 × 100/\|R4\| | 1.47 | CRA_D [deg.] | 21.0 |
| CT1/T23 | 6.70 | Vmin | 19.5 |
| T12/T34 | 0.21 | (Vi/Ni)min | 11.68 |
| TD/T12 | 22.88 | V4/V3 | 2.87 |
| (ET1 + ET4)/(CT1 + CT4) | 0.51 | N4 | 1.544 |

10th Embodiment

Figure 26:
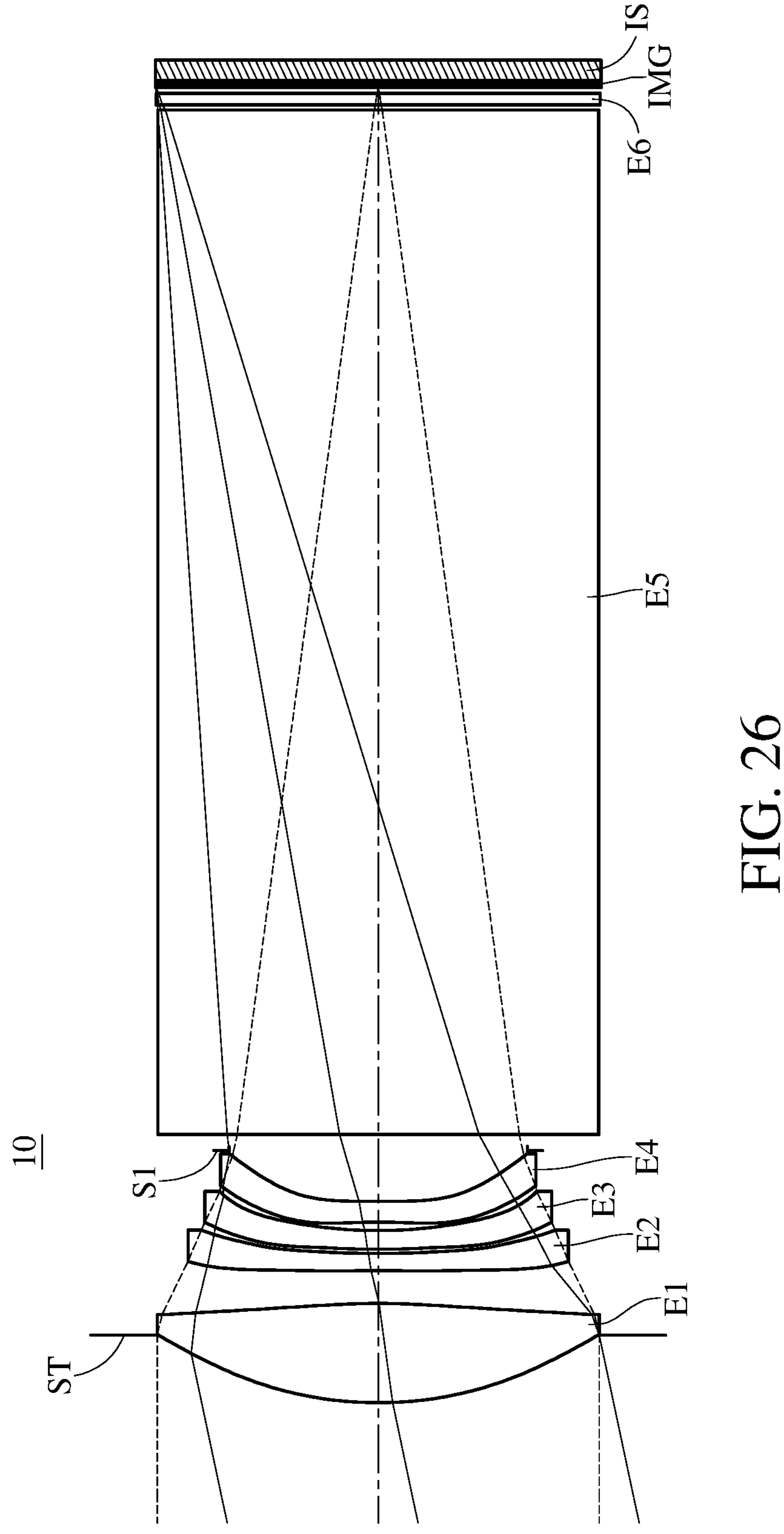
FIG. 26 is a schematic view of an image capturing unit according to the 10th embodiment of the present disclosure.
Figure 27:
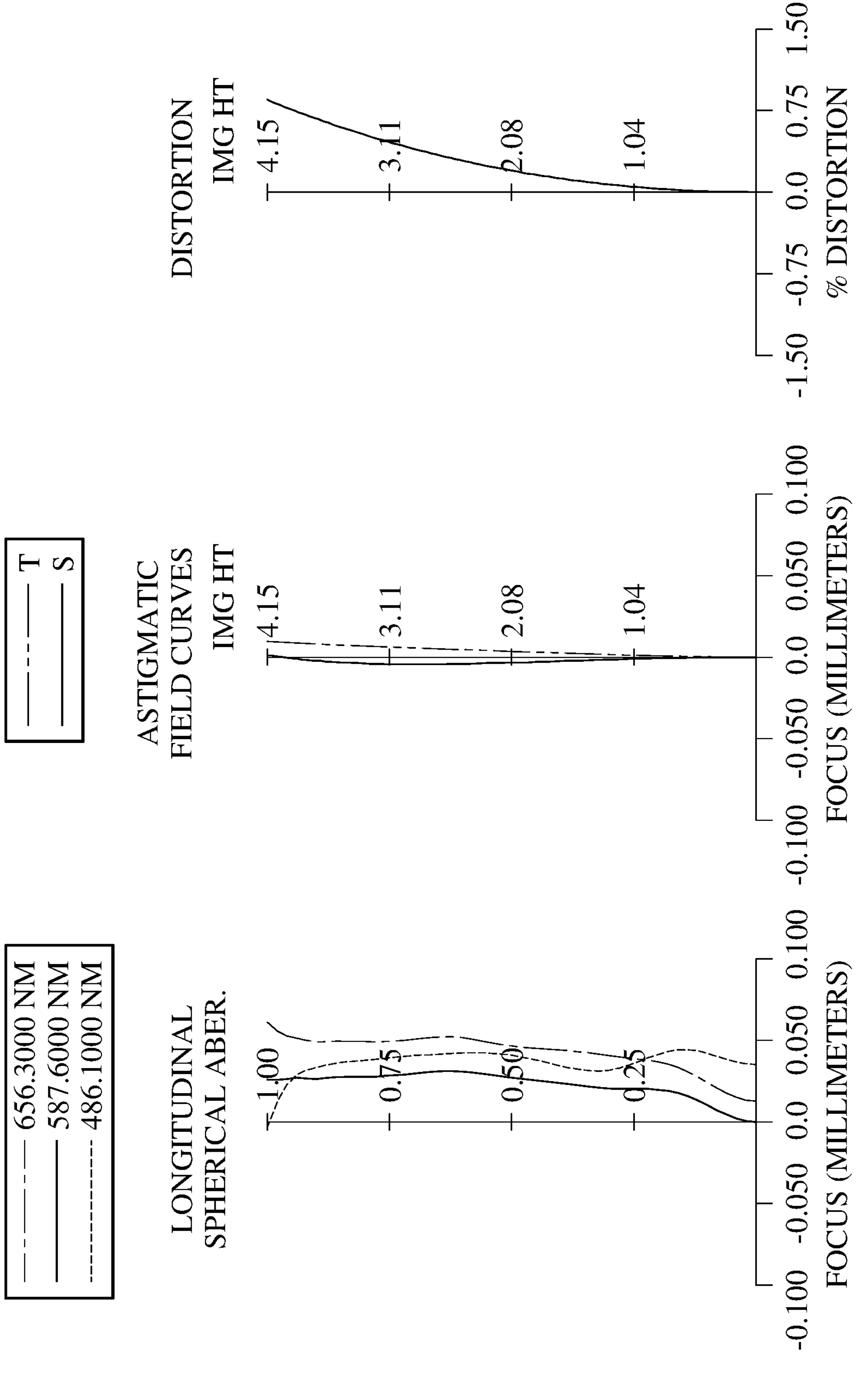
FIG. 27 shows spherical aberration curves, astigmatic field curves and a distortion curve of the image capturing unit according to the 10th embodiment.

FIG. 26 is a schematic view of an image capturing unit according to the 10th embodiment of the present disclosure. FIG. 27 shows, in order from left to right, spherical aberration curves, astigmatic field curves and a distortion curve of the image capturing unit according to the 10th embodiment. In FIG. 26, the image capturing unit 10 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The image-side surface of the first lens element E1 has three inflection points.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has three inflection points. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has three inflection points.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The reflective element E5 is made of glass material and located between the fourth lens element E4 and the image surface IMG, and will not affect the focal length of the photographing system lens assembly. The reflective element E5 is a prism which can provide optical path folding function. For the purpose of illustration, the optical path folding caused by the reflective element E5 is omitted in FIG. 26. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 10th embodiment are shown in Table 10A and the aspheric surface data are shown in Table 10B below.

TABLE 10A

| 10th Embodiment<br>f = 19.34 mm, Fno = 2.35, HFOV = 12.0 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −1.260 | | | | |
| 2 | Lens 1 | 7.0228 | (ASP) | 1.850 | Glass | 1.744 | 44.7 | 6.29 |
| 3 | | −12.4474 | (ASP) | 0.611 | | | | |
| 4 | Lens 2 | −20.7768 | (ASP) | 0.320 | Plastic | 1.669 | 19.5 | −16.51 |
| 5 | | 23.7399 | (ASP) | 0.077 | | | | |
| 6 | Lens 3 | 15.1865 | (ASP) | 0.350 | Plastic | 1.669 | 19.5 | −41.03 |
| 7 | | 9.6871 | (ASP) | 0.156 | | | | |
| 8 | Lens 4 | −9.9717 | (ASP) | 0.386 | Plastic | 1.544 | 56.0 | −16.30 |
| 9 | | 81.1885 | (ASP) | 0.950 | | | | |
| 10 | Stop | Plano | | 0.300 | | | | |
| 11 | Prism | Plano | | 19.084 | Glass | 1.603 | 60.6 | — |
| 12 | | Plano | | 0.100 | | | | |
| 13 | Filter | Plano | | 0.210 | Glass | 1.517 | 64.2 | — |
| 14 | | Plano | | 0.115 | | | | |
| 15 | Image | Plano | | — | | | | |

Note:

Reference wavelength is 587.6 nm (d-line).

An effective radius of the stop S1 (Surface 10) is 2.780 mm.

TABLE 10B

| Aspheric Coefficients | | | | |
|---|---|---|---|---|
| Surface # | 2 | 3 | 4 | 5 |
| k= | −1.15051E+00 | 5.34666E+00 | −5.95872E+01 | 4.44045E+01 |
| A4= | 5.6144605E−04 | 8.5272872E−03 | 2.6401990E−02 | 1.5169544E−02 |
| A6= | 4.2200183E−05 | −1.6140726E−03 | −1.1732207E−02 | −1.4399265E−02 |
| A8= | −1.2827875E−05 | 2.1945485E−04 | 2.7403533E−03 | 5.1120714E−03 |
| A10= | 1.2557392E−06 | −1.8334740E−05 | −3.7037073E−04 | −6.6200378E−04 |
| A12= | −4.8125377E−08 | 9.1589385E−07 | 2.8975174E−05 | −3.9261079E−05 |
| A14= | −2.9406646E−10 | −2.5388841E−08 | −1.1022345E−06 | 2.3467299E−05 |
| A16= | 4.0409154E−11 | 3.0790101E−10 | −2.3389170E−09 | −3.2064075E−06 |
| A18= | — | — | 1.7052562E−09 | 2.1880933E−07 |
| A20= | — | — | −4.2602359E−11 | −7.6192394E−09 |
| A22= | — | — | — | 1.0670184E−10 |
| Surface # | 6 | 7 | 8 | 9 |
| k= | 1.00124E+01 | 2.59295E+00 | −8.65687E+01 | 9.90000E+01 |
| A4= | 4.7017084E−03 | 1.4044062E−02 | 2.4813054E−02 | 2.7747011E−02 |
| A6= | −1.4629903E−02 | −1.2468603E−02 | −4.4340681E−04 | −1.9547907E−03 |
| A8= | 7.6013469E−03 | 5.6590638E−03 | 1.8356623E−04 | 1.5107255E−03 |
| A10= | −1.7753482E−03 | −1.6183279E−03 | −5.2803345E−04 | −1.0338611E−03 |
| A12= | 2.1999860E−04 | 3.1066871E−04 | 2.0499422E−04 | 3.1139638E−04 |
| A14= | −1.3836233E−05 | −3.8885101E−05 | −3.7687505E−05 | −5.2079543E−05 |
| A16= | 2.5218724E−07 | 2.9912506E−06 | 3.7747607E−06 | 5.0796682E−06 |
| A18= | 1.5469153E−08 | −1.2583763E−07 | −1.9829176E−07 | −2.7172444E−07 |
| A20= | −6.5540787E−10 | 2.1554333E−09 | 4.2713538E−09 | 6.1732169E−09 |

In the 10th embodiment, the equation of the aspheric surface profiles of the aforementioned lens elements is the same as the equation of the 1st embodiment. Also, the definitions of these parameters shown in Table 10C below are the same as those stated in the 1st embodiment with corresponding values for the 10th embodiment, so an explanation in this regard will not be provided again.

Moreover, these parameters can be calculated from Table 10A and Table 10B as the following values and satisfy the following conditions:

TABLE 10C

| Values of Conditional Expressions | | | |
|---|---|---|---|
| f [mm] | 19.34 | ET34/T34 | 0.70 |
| Fno | 2.35 | SAG1R2/CT4 | −0.54 |
| HFOV [deg.] | 12.0 | (\|SAG2R1\| + \|SAG3R2\|)/(CT2 + CT3) | 1.35 |
| BL/TD | 5.54 | (R3 + R4)/(R3 − R4) | −0.07 |
| TL/f | 1.27 | (R5 + R6)/(R5 − R6) | 4.52 |
| ImgH [mm] | 4.15 | (R7 + R8)/(R7 − R8) | −0.78 |
| f1/f34 | −0.54 | \|R5/R6\| | 1.57 |
| R2/f1 | −1.98 | Y1R1/Y4R2 | 1.48 |
| R2/T34 | −79.79 | Y1R1/ImgH | 0.99 |
| T23 × 100/\|R4\| | 0.32 | CRA_D [deg.] | 16.0 |
| CT1/T23 | 24.03 | Vmin | 19.5 |
| T12/T34 | 3.92 | (Vi/Ni)min | 11.68 |
| TD/T12 | 6.14 | V4/V3 | 2.87 |
| (ET1 + ET4)/(CT1 + CT4) | 0.43 | N4 | 1.544 |

11th Embodiment

Figure 28:
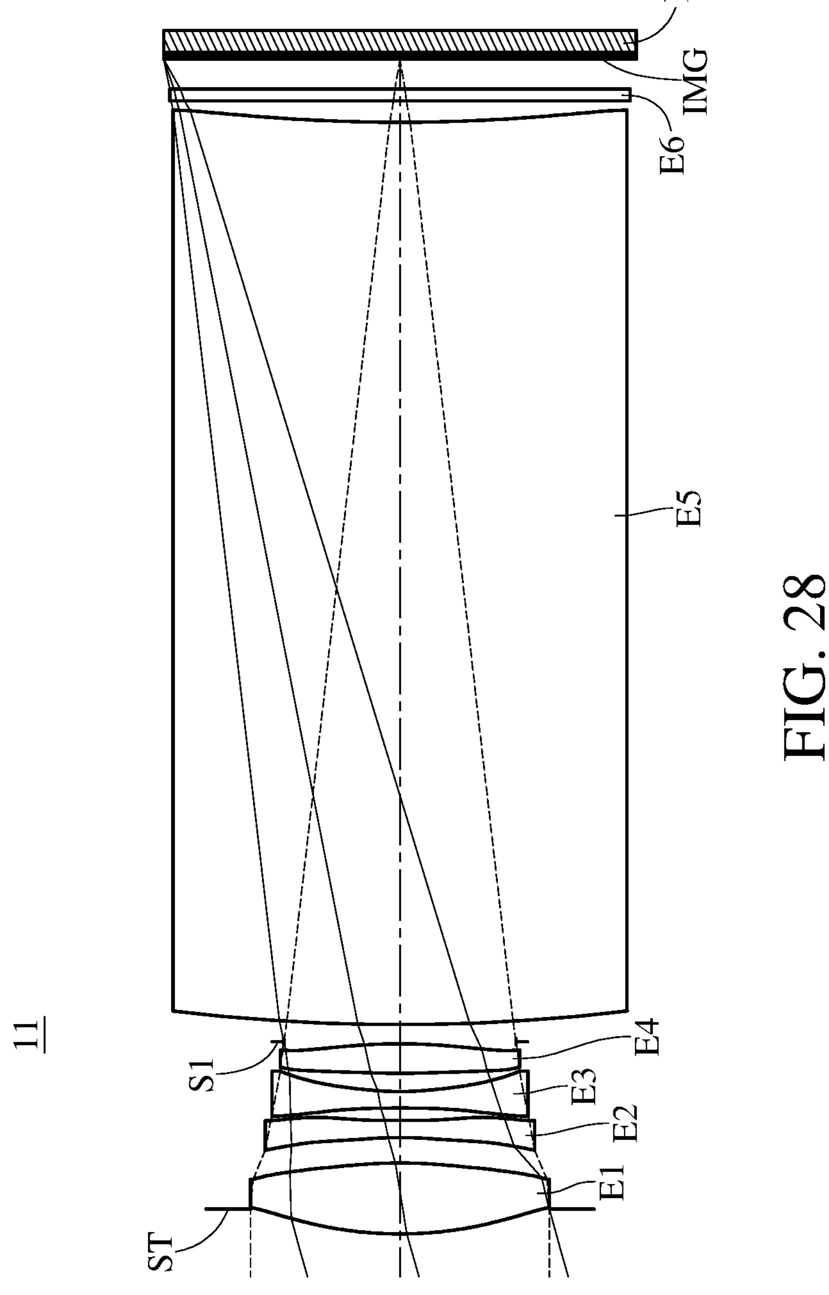
FIG. 28 is a schematic view of an image capturing unit according to the 11th embodiment of the present disclosure.
Figure 29:
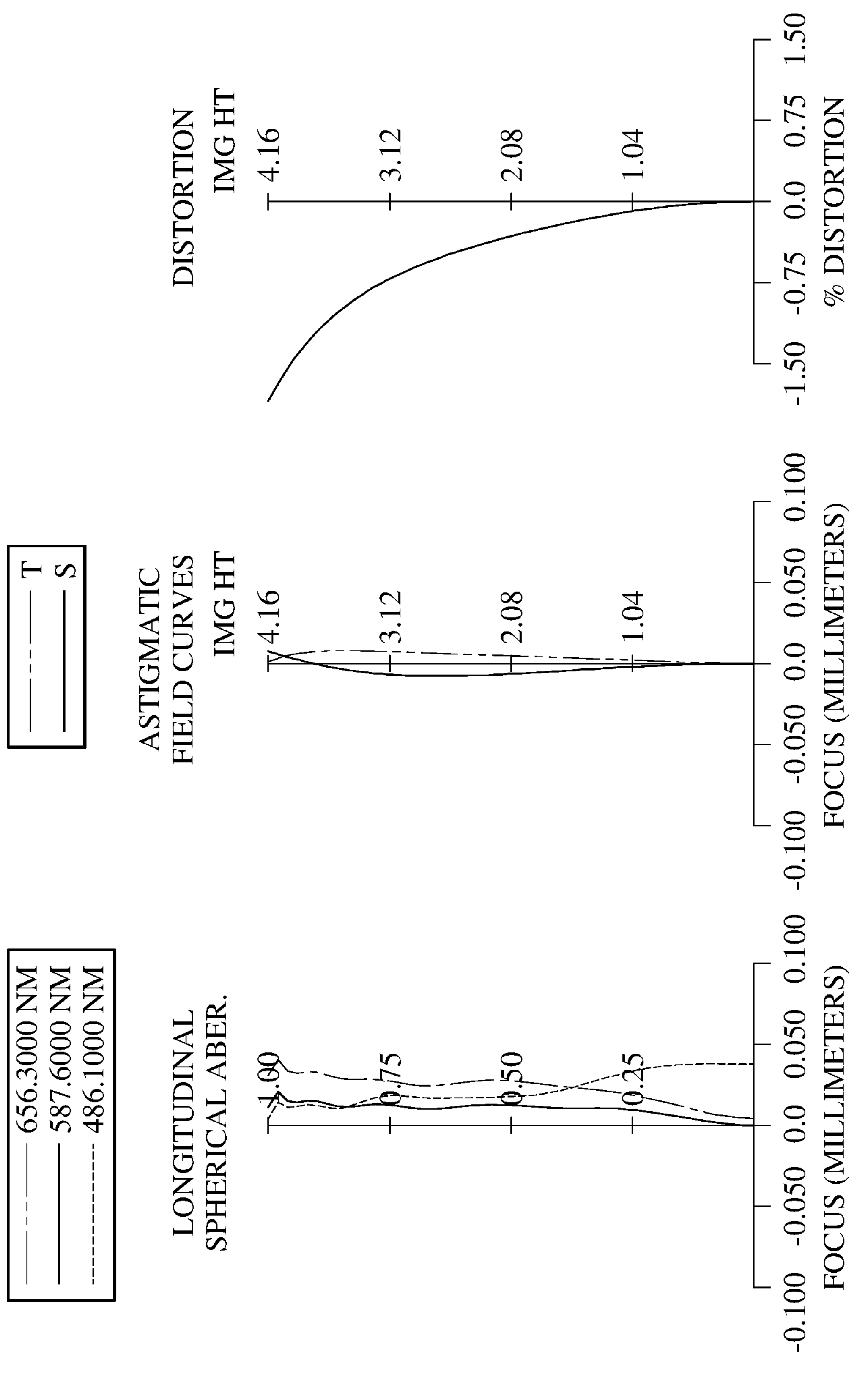
FIG. 29 shows spherical aberration curves, astigmatic field curves and a distortion curve of the image capturing unit according to the 11th embodiment.

FIG. 28 is a schematic view of an image capturing unit according to the 11th embodiment of the present disclosure. FIG. 29 shows, in order from left to right, spherical aberration curves, astigmatic field curves and a distortion curve of the image capturing unit according to the 11th embodiment. In FIG. 28, the image capturing unit 11 includes the photographing system lens assembly (its reference numeral is omitted) of the present disclosure and an image sensor IS. The photographing system lens assembly includes, in order from an object side to an image side along an optical axis, an aperture stop ST, a first lens element E1, a second lens element E2, a third lens element E3, a fourth lens element E4, a stop S1, a reflective element E5, a filter E6 and an image surface IMG. The photographing system lens assembly includes four single and non-cemented lens elements (E1, E2, E3 and E4) with no additional lens element disposed between each of the adjacent four lens elements. In addition, there is an air gap in a paraxial region between each of all adjacent lens elements among the first lens element E1 through the fourth lens element E4.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has three inflection points. The image-side surface of the second lens element E2 has two inflection points.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The reflective element E5 with positive refractive power has an object-side surface being convex in a paraxial region thereof and an image-side surface being concave in a paraxial region thereof. The reflective element E5 is made of plastic material and has the object-side surface being spherical and the image-side surface being aspheric. The reflective element E5 is located between the fourth lens element E4 and the image surface IMG. The reflective element E5 is a prism which can provide optical path folding function. For the purpose of illustration, the optical path folding caused by the reflective element E5 is omitted in FIG. 28. Moreover, the configuration of the reflective element E5 in this embodiment can be similar to, for example, one of the configurations as shown in FIG. 3 to FIG. 9, which can be referred to foregoing descriptions corresponding to FIG. 3 to FIG. 9, and the details in this regard will not be provided again.

The filter E6 is made of glass material and located between the fourth lens element E4 and the image surface IMG, and will not affect the focal length of the photographing system lens assembly. The image sensor IS is disposed on or near the image surface IMG of the photographing system lens assembly.

The detailed optical data of the 11th embodiment are shown in Table 11A and the aspheric surface data are shown in Table 11B below.

TABLE 11A

| 11th Embodiment<br>f = 15.26 mm, Fno = 2.90, HFOV = 15.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.441 | | | | |
| 2 | Lens 1 | 6.6065 | (ASP) | 1.250 | Glass | 1.749 | 35.0 | 5.15 |
| 3 | | −8.5286 | (ASP) | 0.448 | | | | |
| 4 | Lens 2 | −6.5992 | (ASP) | 0.300 | Plastic | 1.587 | 28.3 | −9.39 |
| 5 | | 34.1627 | (ASP) | 0.220 | | | | |
| 6 | Lens 3 | −30.5135 | (ASP) | 0.290 | Plastic | 1.639 | 23.5 | −5.97 |
| 7 | | 4.3741 | (ASP) | 0.322 | | | | |
| 8 | Lens 4 | 12.5000 | (ASP) | 0.520 | Plastic | 1.566 | 37.4 | 10.14 |
| 9 | | −10.4485 | (ASP) | 0.040 | | | | |
| 10 | Stop | Plano | | 0.300 | | | | |
| 11 | Prism | 33.3333 | (SPH) | 15.900 | Plastic | 1.545 | 56.1 | 2064.74 |
| 12 | | 28.5714 | (ASP) | 0.376 | | | | |
| 13 | Filter | Plano | | 0.210 | Glass | 1.517 | 64.2 | — |
| 14 | | Plano | | 0.523 | | | | |
| 15 | Image | Plano | | — | | | | |

Note:
Reference wavelength is 587.6 nm (d-line).
An effective radius of the stop S1 (Surface 10) is 2.044 mm.

TABLE 11B

| Aspheric Coefficients | | | | | |
|---|---|---|---|---|---|
| Surface # | 2 | 3 | 4 | 5 | 6 |
| k= | −2.23593E+00 | 2.60517E+00 | −4.43440E+01 | 0.00000E+00 | 0.00000E+00 |
| A4= | −5.0447018E−04 | 3.3734800E−03 | 4.8272615E−03 | 2.6669357E−02 | −2.3628347E−02 |
| A6= | 5.7833844E−04 | 6.3669533E−03 | 3.0353694E−02 | −5.7241762E−04 | 1.6321275E−02 |
| A8= | −1.2244163E−04 | −4.4126079E−03 | −3.6937927E−02 | −1.2318481E−02 | −9.0823911E−03 |
| A10= | −1.0870022E−05 | 1.5363720E−03 | 2.2215830E−02 | 3.3115498E−03 | 1.7741260E−03 |
| A12= | 8.6575782E−06 | −3.3583205E−04 | −8.9537013E−03 | 2.1982566E−03 | 1.8857121E−03 |
| A14= | −1.7469044E−06 | 4.7624731E−05 | 2.6111999E−03 | −1.8722585E−03 | −1.7150420E−03 |
| A16= | 1.6530189E−07 | −4.2716176E−06 | −5.5383005E−04 | 6.6069338E−04 | 6.8263691E−04 |
| A18= | −7.0654504E−09 | 2.2065419E−07 | 8.2998932E−05 | −1.3667620E−04 | −1.5715987E−04 |
| A20= | 6.8788236E−11 | −5.0175025E−09 | −8.2897177E−06 | 1.7202073E−05 | 2.1521425E−05 |
| A22= | — | — | 4.9304183E−07 | −1.2247322E−06 | −1.6308014E−06 |
| A24= | — | — | −1.3166395E−08 | 3.8010350E−08 | 5.2836517E−08 |
| Surface # | 7 | 8 | 9 | 12 | — |
| k= | −4.70641E+00 | 0.00000E+00 | −9.36895E+00 | 0.00000E+00 | — |
| A4= | −5.5012654E−02 | −2.9636457E−02 | −3.3504694E−03 | −2.2718915E−04 | — |
| A6= | 4.9682124E−02 | 2.0126902E−02 | 3.0156045E−03 | 1.9346689E−05 | — |
| A8= | −3.3321537E−02 | −6.2351824E−03 | 1.9940955E−03 | −1.5602335E−06 | — |
| A10= | 1.7267957E−02 | −2.5301493E−03 | −3.6127657E−03 | 4.0594186E−08 | — |
| A12= | −5.8470928E−03 | 3.5056860E−03 | 2.3512861E−03 | −1.5298984E−09 | — |
| A14= | 1.1459633E−03 | −1.5930991E−03 | −8.4483483E−04 | — | — |
| A16= | −1.0664394E−04 | 3.7932099E−04 | 1.7710250E−04 | — | — |
| A18= | 9.7540043E−07 | −4.7020244E−05 | −2.0212191E−05 | — | — |
| A20= | 3.6491952E−07 | 2.3902770E−06 | 9.6834472E−07 | — | — |

In the 11th embodiment, the equation of the aspheric surface profiles of the aforementioned lens elements and prism is the same as the equation of the 1st embodiment. Also, the definitions of these parameters shown in Table 11C below are the same as those stated in the 1st embodiment with corresponding values for the 11th embodiment, so an explanation in this regard will not be provided again.

Moreover, these parameters can be calculated from Table 11A and Table 11B as the following values and satisfy the following conditions:

TABLE 11C

| Values of Conditional Expressions | | | |
|---|---|---|---|
| f [mm] | 15.26 | ET34/T34 | 0.22 |
| Fno | 2.90 | SAG1R2/CT4 | −0.55 |
| HFOV [deg.] | 15.5 | (\|SAG2R1\| + \|SAG3R2\|)/(CT2 + CT3) | 0.98 |
| BL/TD | 5.18 | (R3 + R4)/(R3 − R4) | −0.68 |
| TL/f | 1.36 | (R5 + R6)/(R5 − R6) | 0.75 |
| ImgH [mm] | 4.16 | (R7 + R8)/(R7 − R8) | 0.09 |
| f1/f34 | −0.31 | \|R5/R6\| | 6.98 |
| R2/f1 | −1.66 | Y1R1/Y4R2 | 1.27 |
| R2/T34 | −26.49 | Y1R1/ImgH | 0.63 |
| T23 × 100/\|R4\| | 0.64 | CRA_D [deg.] | 18.8 |
| CT1/T23 | 5.68 | Vmin | 23.5 |
| T12/T34 | 1.39 | (Vi/Ni)min | 14.34 |
| TD/T12 | 7.48 | V4/V3 | 1.59 |
| (ET1 + ET4)/(CT1 + CT4) | 0.45 | N4 | 1.566 |

12th Embodiment

Figure 30:
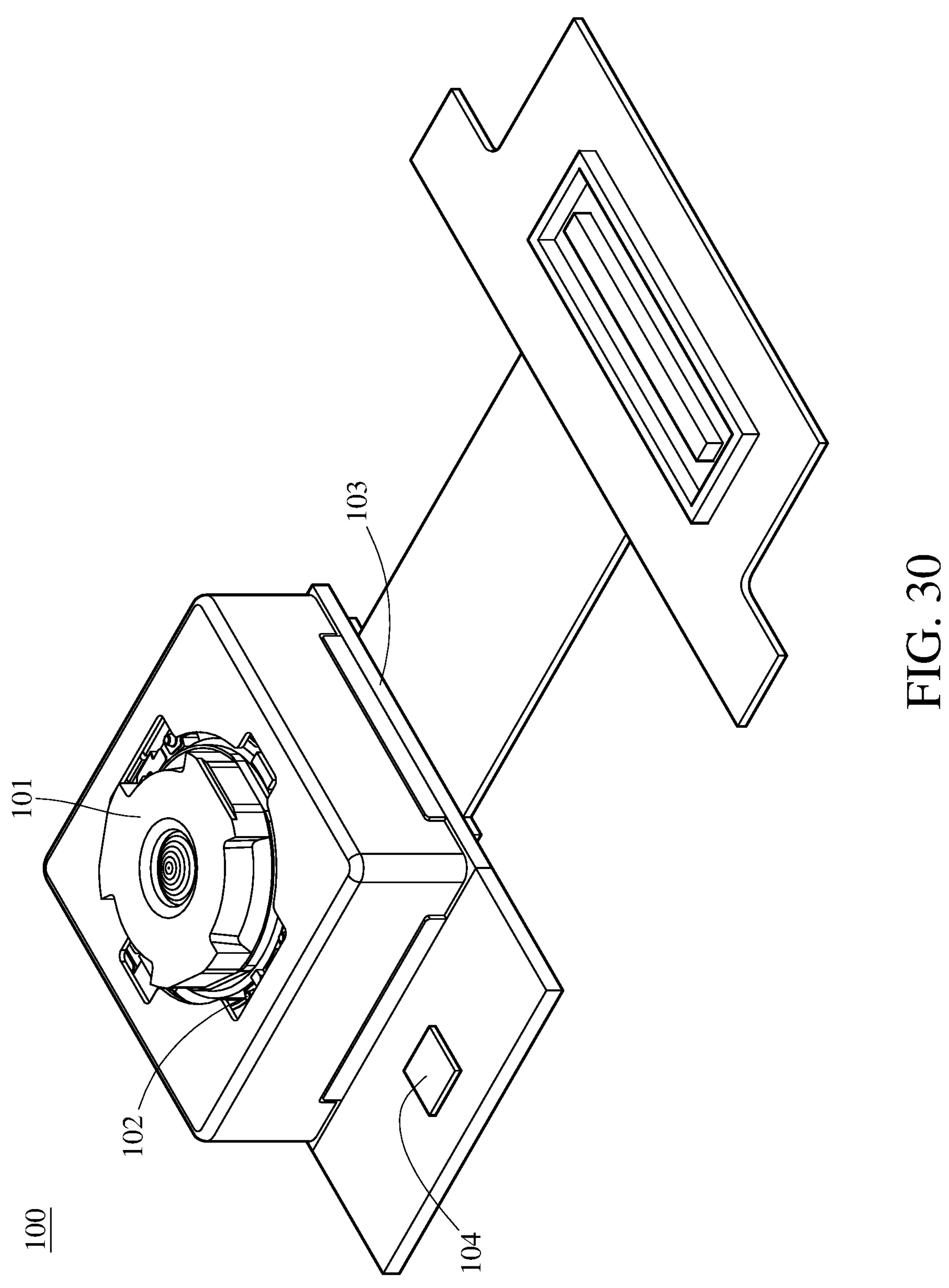
FIG. 30 is a perspective view of an image capturing unit according to the 12th embodiment of the present disclosure.

FIG. 30 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the photographing system lens assembly as disclosed in the 1st embodiment, a barrel and a holder member (their reference numerals are omitted) for holding the photographing system lens assembly. However, the lens unit 101 may alternatively be provided with the photographing system lens assembly as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photographing system lens assembly to provide higher image quality.

The image stabilizer 104, such as an accelerometer, a gyro sensor and a Hall Effect sensor, is configured to work with the driving device 102 to provide optical image stabilization (01S). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

13th Embodiment

Figure 31:
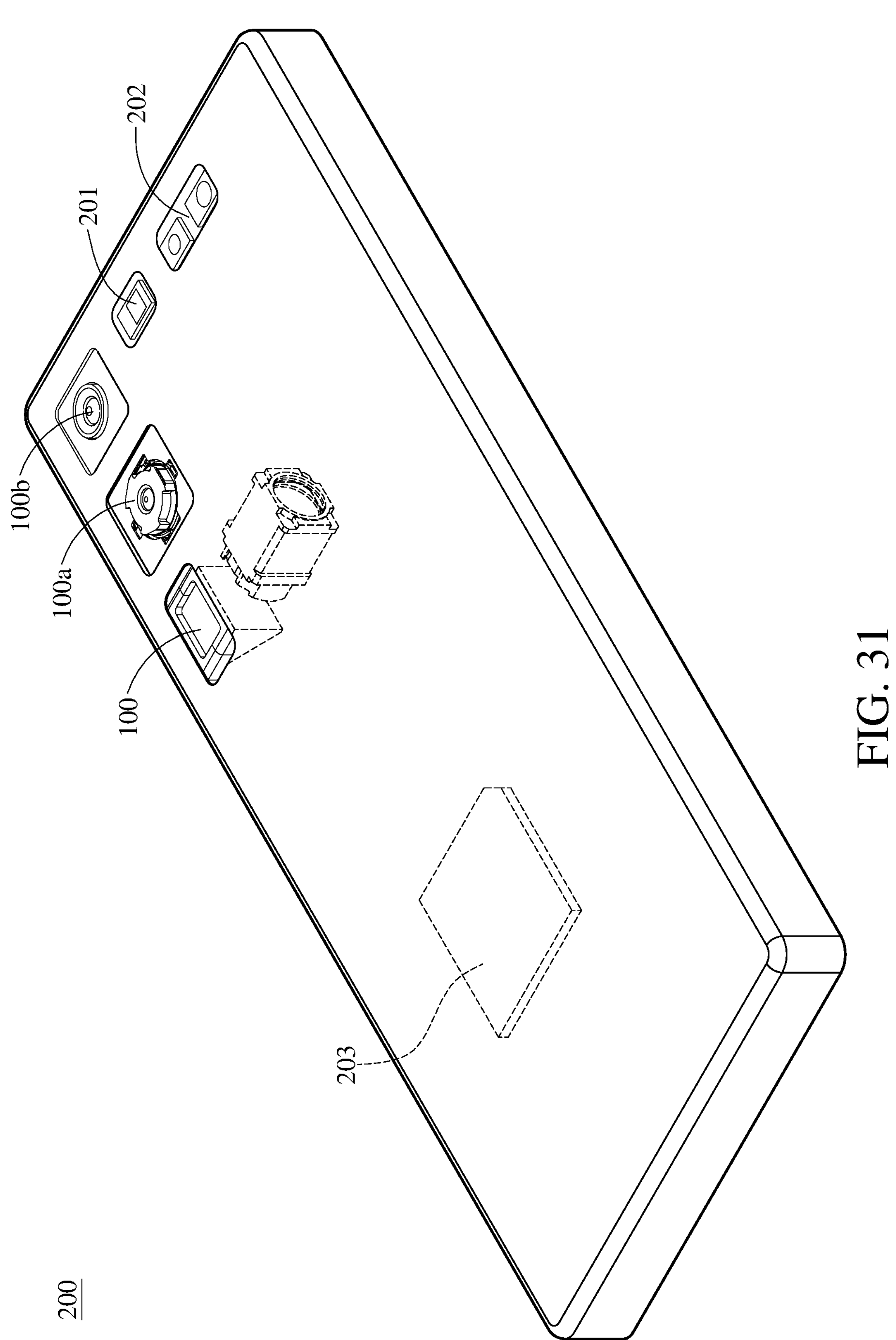
FIG. 31 is one perspective view of an electronic device according to the 13th embodiment of the present disclosure.
Figure 32:
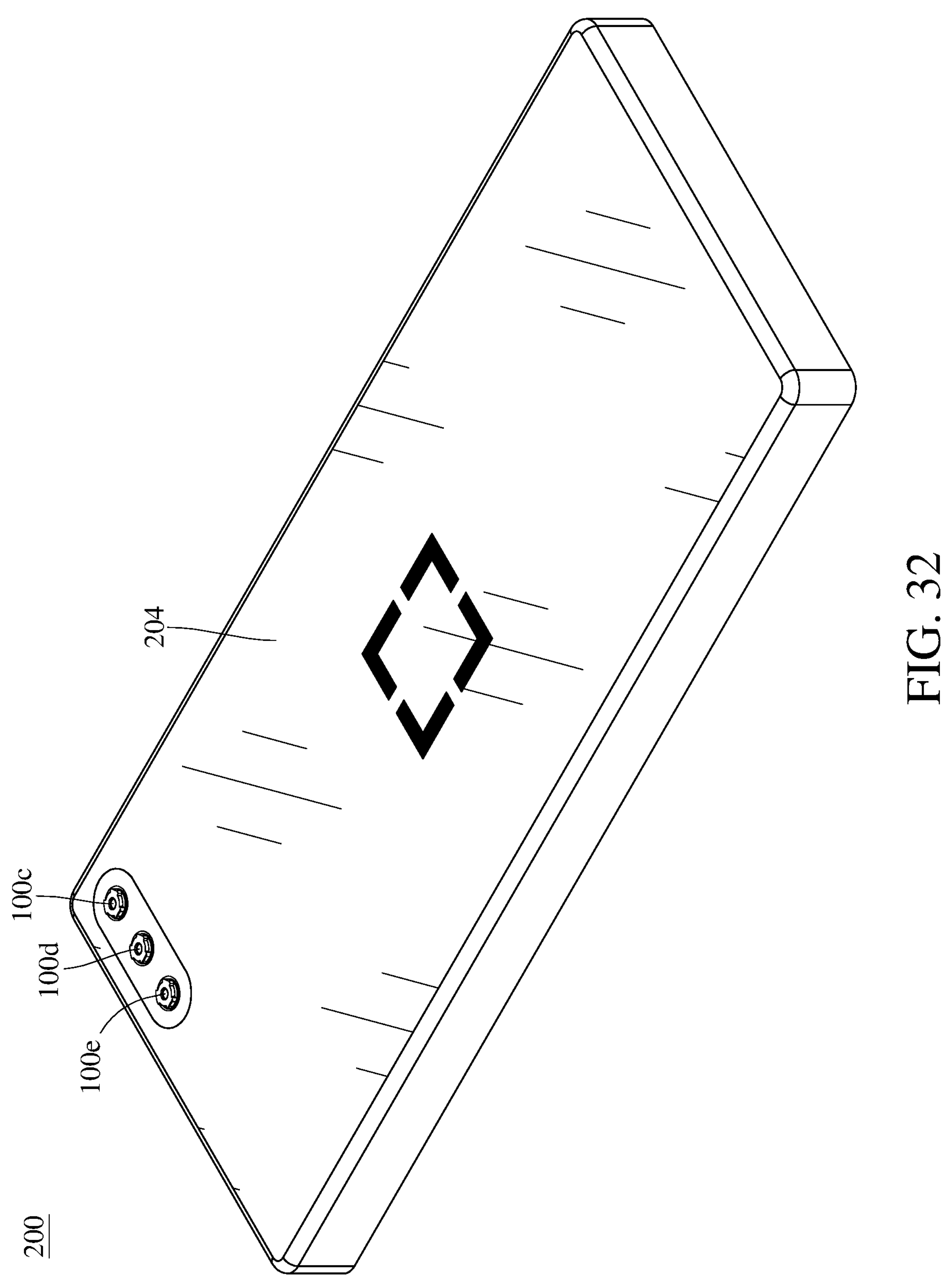
FIG. 32 is another perspective view of the electronic device in FIG. 31.
Figure 33:
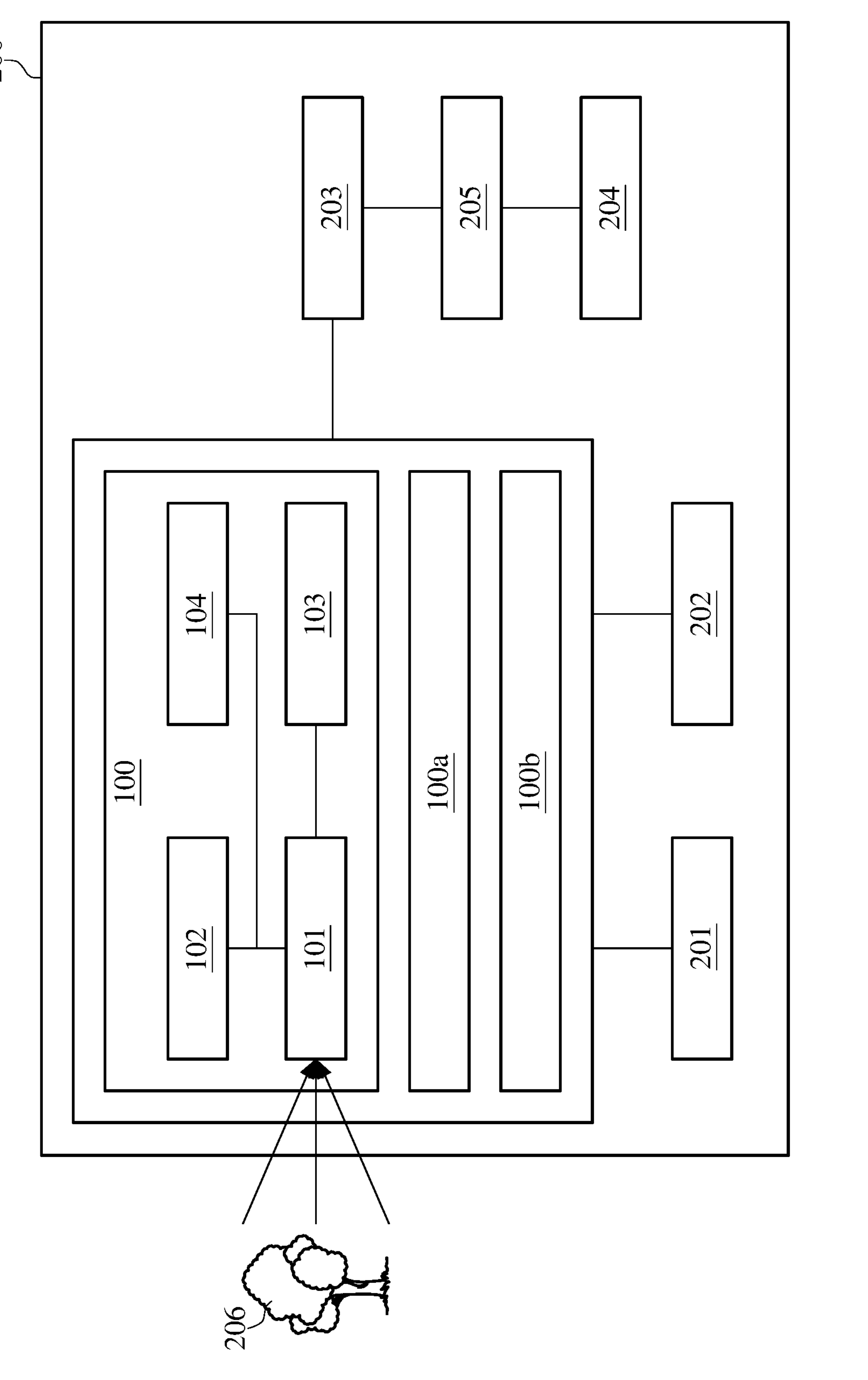
FIG. 33 is a block diagram of the electronic device in FIG. 31.

FIG. 31 is one perspective view of an electronic device according to the 13th embodiment of the present disclosure. FIG. 32 is another perspective view of the electronic device in FIG. 31. FIG. 33 is a block diagram of the electronic device in FIG. 31.

In this embodiment, an electronic device 200 is a smartphone including the image capturing unit 100 as disclosed in the 12th embodiment, an image capturing unit **100*a*, an image capturing unit 100*b*, an image capturing unit 100*c*, an image capturing unit 100*d*, an image capturing unit 100*e*, a flash module 201, a focus assist module 202, an image signal processor 203, a display module 204 and an image software processor 205. The image capturing unit 100, the image capturing unit 100*a* and the image capturing unit 100*b* are disposed on the same side of the electronic device 200 and each of the image capturing units 100, 100*a* and 100*b* has a single focal point. The focus assist module 202 can be a laser rangefinder or a ToF (time of flight) module, but the present disclosure is not limited thereto. The image capturing unit 100*c*, the image capturing unit 100*d*, the image capturing unit 100*e* and the display module 204 are disposed on the opposite side of the electronic device 200, and the display module 204 can be a user interface, such that the image capturing units 100*c*, 100*d* and 100*d* can be front-facing cameras of the electronic device 200 for taking selfies, but the present disclosure is not limited thereto. Furthermore, each of the image capturing units 100*a*, 100*b*, 100*c*, 100*d* and 100*e* can include the photographing system lens assembly of the present disclosure and can have a configuration similar to that of the image capturing unit 100. In detail, each of the image capturing units 100*a*, 100*b*, 100*c*, 100*d* and 100*e* can include a lens unit, a driving device, an image sensor and an image stabilizer, and can also include a reflective element for folding optical path. In addition, each lens unit of the image capturing units 100*a*, 100*b*, 100*c*, 100*d* and 100*e*** can include the photographing system lens assembly of the present disclosure, a barrel and a holder member for holding the photographing system lens assembly.

The image capturing unit 100 is a telephoto image capturing unit with optical path folding function, the image capturing unit **100*a* is a wide-angle image capturing unit, the image capturing unit 100*b* is an ultra-wide-angle image capturing unit, the image capturing unit 100*c* is a wide-angle image capturing unit, the image capturing unit 100*d* is an ultra-wide-angle image capturing unit, and the image capturing unit 100*e* is a ToF image capturing unit. In this embodiment, the image capturing units 100, 100*a* and 100*b* have different fields of view, such that the electronic device 200 can have various magnification ratios so as to meet the requirement of optical zoom functionality. In addition, the image capturing unit 100*e* can determine depth information of the imaged object. Moreover, the light-folding configuration of the image capturing unit 100 can be similar to, for example, one of the configurations as shown in FIG. 40 to FIG. 48, which can be referred to foregoing descriptions corresponding to FIG. 40 to FIG. 48, and the details in this regard will not be provided again. In this embodiment, the electronic device 200 includes multiple image capturing units 100, 100***a*, 100*b*, 100*c*, 100*d* and 100*e*, but the present disclosure is not limited to the number and arrangement of image capturing units.

When a user captures images of an object 206, the light rays converge in the image capturing unit 100, the image capturing unit 100*a* or the image capturing unit 100*b* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*c*, 100*d* or 100*e* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

14th Embodiment

Figure 34:
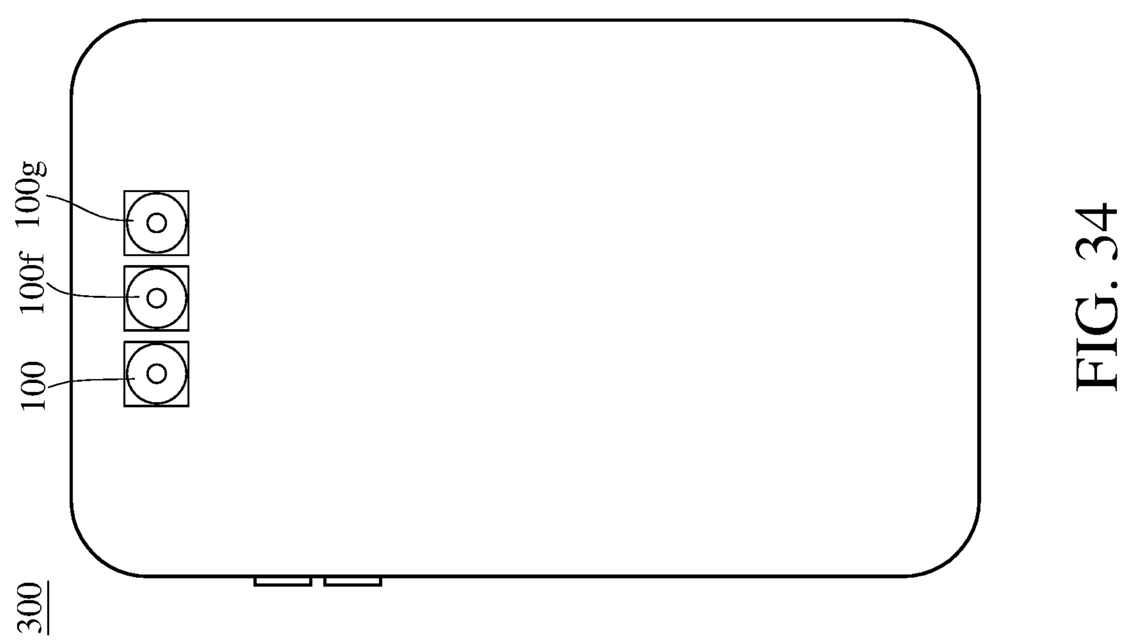
FIG. 34 is one perspective view of an electronic device according to the 14th embodiment of the present disclosure.
Figure 35:
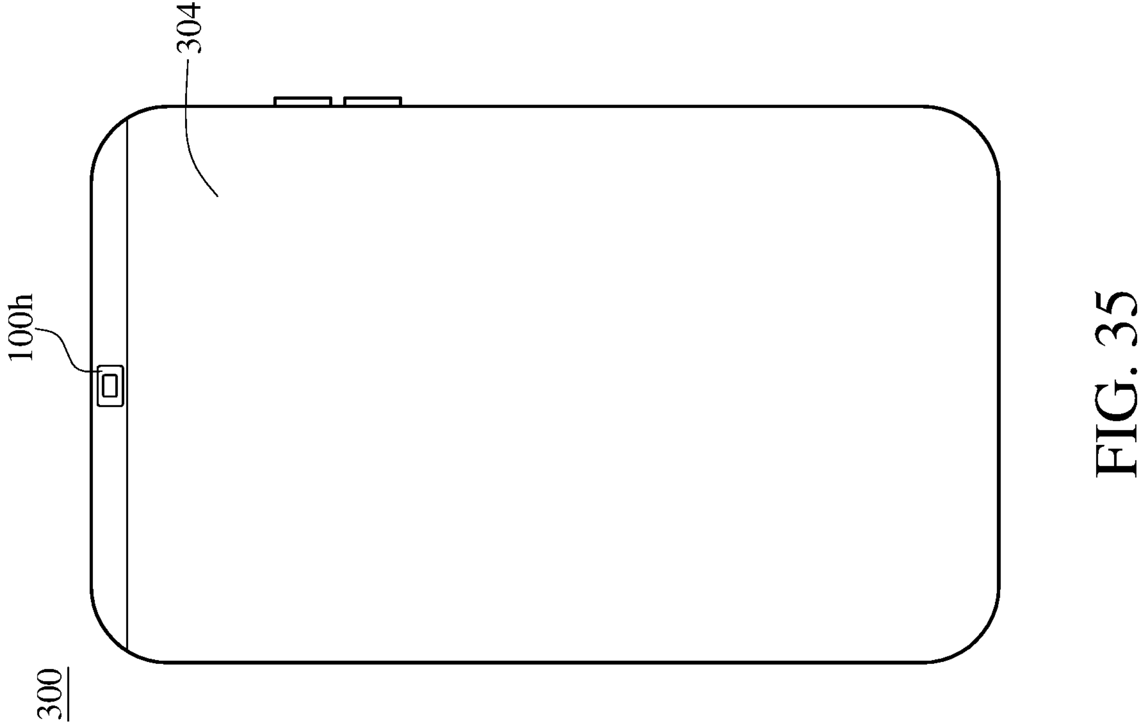
FIG. 35 is another perspective view of the electronic device in FIG. 34.

FIG. 34 is one perspective view of an electronic device according to the 14th embodiment of the present disclosure, and FIG. 35 is another perspective view of the electronic device in FIG. 34.

In this embodiment, an electronic device 300 is a smartphone including the image capturing unit 100 as disclosed in the 12th embodiment, an image capturing unit 100*f*, an image capturing unit 100*g*, an image capturing unit 100*h* and a display module 304. As shown in FIG. 34, the image capturing unit 100, the image capturing unit 100*f* and the image capturing unit 100*g* are disposed on the same side of the electronic device 300 and each of the image capturing units 100, 100*f* and 100*g* has a single focal point. As shown in FIG. 35, the image capturing unit 100*h* and the display module 304 are disposed on the opposite side of the electronic device 300, such that the image capturing unit 100*h* can be a front-facing camera of the electronic device 300 for taking selfies, but the present disclosure is not limited thereto. Furthermore, each of the image capturing units 100*f*, 100*g* and 100*h* can include the photographing system lens assembly of the present disclosure and can have a configuration similar to that of the image capturing unit 100. In detail, each of the image capturing units 100*f*, 100*g* and 100*h* can include a lens unit, a driving device, an image sensor and an image stabilizer. In addition, each lens unit of the image capturing units 100*f*, 100*g* and 100*h* can include the photographing system lens assembly of the present disclosure, a barrel and a holder member for holding the photographing system lens assembly.

The image capturing unit 100 is a telephoto image capturing unit, the image capturing unit 100*f* is a wide-angle image capturing unit, the image capturing unit 100*g* is an ultra-wide-angle image capturing unit, and the image capturing unit 100*h* is a wide-angle image capturing unit. In this embodiment, the image capturing units 100, 100*f* and 100*g* have different fields of view, such that the electronic device 300 can have various magnification ratios so as to meet the requirement of optical zoom functionality. Moreover, as shown in FIG. 35, the image capturing unit 100*h* can have a non-circular opening, and the barrel or lens elements in the image capturing unit 100*h* can have trimmed edges at their outermost positions so as to coordinate with the shape of the non-circular opening. Therefore, it is favorable for reducing the size of the image capturing unit 100*h* so as to increase the ratio of the area of the display module 304 relative to that of the electronic device 300, and reduce the thickness of the electronic device 300, thereby achieving compactness. In this embodiment, the electronic device 300 includes multiple image capturing units 100, 100*f*, 100*g* and 100*h*, but the present disclosure is not limited to the number and arrangement of image capturing units.

15th Embodiment

Figure 36:
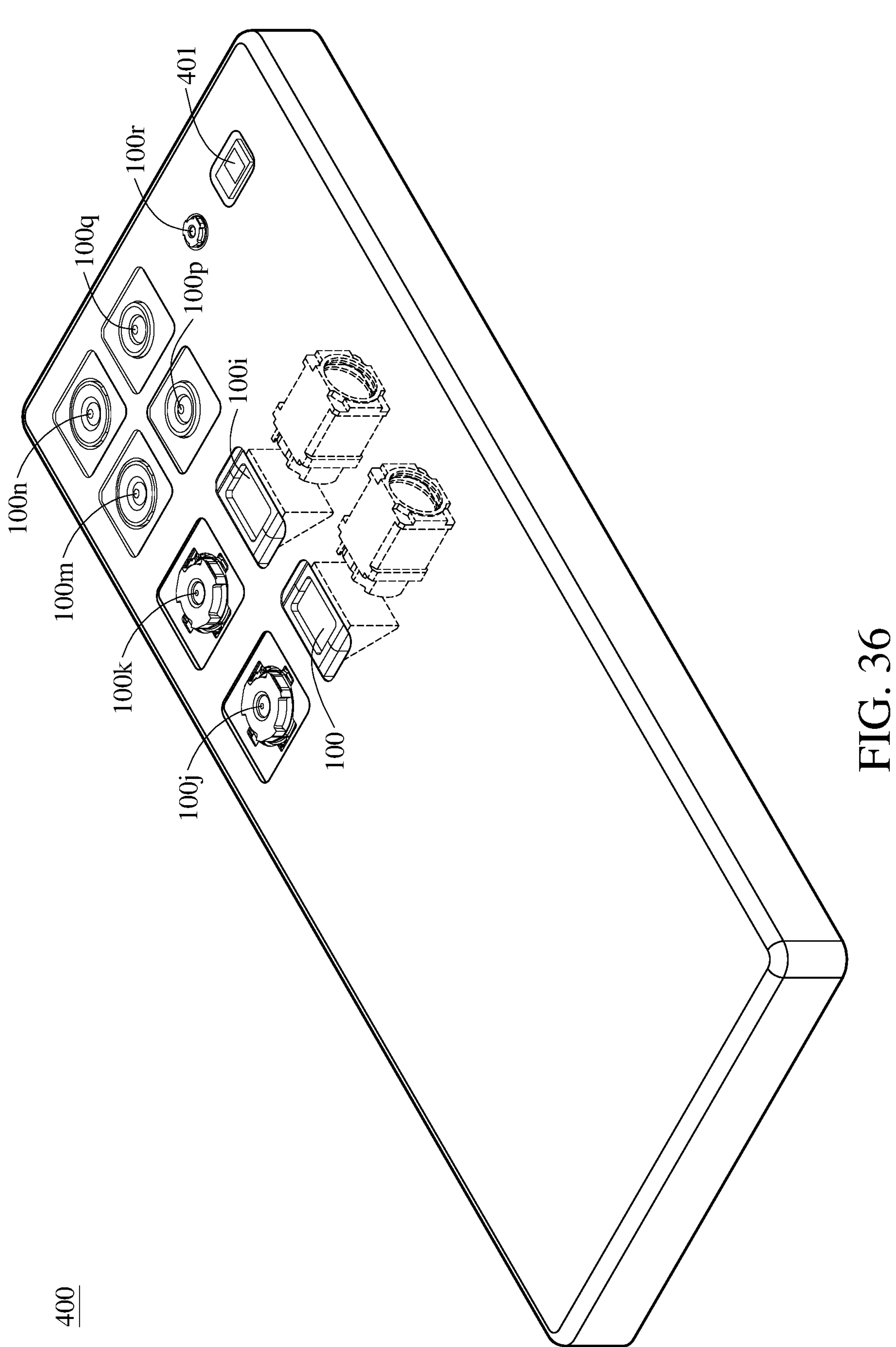
FIG. 36 is one perspective view of an electronic device according to the 15th embodiment of the present disclosure.

FIG. 36 is one perspective view of an electronic device according to the 15th embodiment of the present disclosure.

In this embodiment, an electronic device 400 is a smartphone including the image capturing unit 100 as disclosed in the 12th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the photographing system lens assembly of the present disclosure and can have a configuration similar to that of the image capturing unit 100, and the details in this regard will not be provided again.

The image capturing unit 100 is a telephoto image capturing unit with optical path folding function, the image capturing unit 100*i* is a telephoto image capturing unit with optical path folding function, the image capturing unit 100*j* is a wide-angle image capturing unit, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*p*, 100*q*, and 100*r* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100 and 100*i* can be similar to, for example, one of the structures shown in FIG. 40 to FIG. 48, which can be referred to foregoing descriptions corresponding to FIG. 40 to FIG. 48, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the photographing system lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-11C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing system lens assembly comprising four lens elements, the four lens elements being, in order from an object side to an image side along an optical path, a first lens element, a second lens element, a third lens element and a fourth lens element, and each of the four lens elements having an object-side surface facing toward the object side and an image-side surface facing toward the image side;

wherein a total number of lens elements in the photographing system lens assembly is four, an air gap is in a paraxial region between each of all adjacent lens elements of the photographing system lens assembly, the first lens element has positive refractive power, the object-side surface of the first lens element is convex in a paraxial region thereof, the image-side surface of the first lens element is convex in a paraxial region thereof, the object-side surface of the second lens element is concave in a paraxial region thereof, and the third lens element has negative refractive power;

wherein an axial distance between the image-side surface of the fourth lens element and an image surface is BL, an axial distance between the object-side surface of the first lens element and the image-side surface of the fourth lens element is TD, a focal length of the first lens element is f1, a curvature radius of the image-side surface of the first lens element is R2, a curvature radius of the object-side surface of the third lens element is R5, a curvature radius of the image-side surface of the third lens element is R6, an Abbe number of the first lens element is V1, an Abbe number of the second lens element is V2, an Abbe number of the third lens element is V3, an Abbe number of the fourth lens element is V4, an Abbe number of the i-th lens element is Vi, a refractive index of the first lens element is N1, a refractive index of the second lens element is N2, a refractive index of the third lens element is N3, a refractive index of the fourth lens element is N4, a refractive index of the i-th lens element is Ni, a minimum value of Vi/Ni is (Vi/Ni)min, and the following conditions are satisfied:

$$2.20<BL/TD<10.00;$$

$$-20.00<R2/f1<-0.01;$$

$$1.25<|R5/R6|<100.00;$$

$$7.00<(Vi/Ni)min<20.00, \text{ wherein } i=1, 2, 3 \text{ or } 4; \text{ and}$$

$$1.420<N4<1.710.$$

2. The photographing system lens assembly of claim 1, wherein a chief ray angle of a maximum field of view on the image surface of the photographing system lens assembly is CRA_D, half of the maximum field of view of the photographing system lens assembly is HFOV, and the following conditions are satisfied:

$$5.0 \text{ degrees}<CRA\_D<35.0 \text{ degrees; and}$$

$$8.0 \text{ degrees}<\text{HFOV}<20.0 \text{ degrees}.$$

3. The photographing system lens assembly of claim 1, wherein a minimum value among Abbe numbers of all lens elements of the photographing system lens assembly is Vmin, and the following condition is satisfied:

$$6.0<Vmin<29.0.$$

4. The photographing system lens assembly of claim 1, wherein a maximum effective radius of the object-side surface of the first lens element is Y1R1, a maximum effective radius of the image-side surface of the fourth lens element is Y4R2, and the following condition is satisfied:

$$1.10<Y1R1/Y4R2<1.60.$$

5. The photographing system lens assembly of claim 1, wherein a displacement in parallel with an optical axis from an axial vertex of the image-side surface of the first lens element to a maximum effective radius position of the image-side surface of the first lens element is SAG1R2, a central thickness of the fourth lens element is CT4, and the following condition is satisfied:

$$-2.50<SAG1R2/CT4<-0.10.$$

6. The photographing system lens assembly of claim 1, wherein the axial distance between the object-side surface of the first lens element and the image-side surface of the fourth lens element is TD, an axial distance between the first lens element and the second lens element is T12, and the following condition is satisfied:

$$2.00<TD/T12<80.00.$$

7. The photographing system lens assembly of claim 1, further comprising at least one reflective element disposed between the fourth lens element and the image surface.

8. The photographing system lens assembly of claim 7, wherein the at least one reflective element comprises a prism, and the optical path is deflected at least two times by the prism.

* * * * *